(12) United States Patent
Lunardi et al.

(10) Patent No.: US 12,526,676 B2
(45) Date of Patent: Jan. 13, 2026

(54) CONFIGURING AND/OR DETECTING MEASUREMENT REPORT TRIGGERING EVENTS BASED ON UNBALANCED REFERENCE SIGNALS AND RELATED COMMUNICATION DEVICES AND NETWORK NODES

(71) Applicant: Telefonaktiebolaget LM Ericsson (publ), Stockholm (SE)

(72) Inventors: Luca Lunardi, Genoa (IT); Pablo Soldati, Solna (SE); Pradeepa Ramachandra, Linköping (SE); Angelo Centonza, Torrenueva Costa (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 392 days.

(21) Appl. No.: 18/018,753

(22) PCT Filed: Aug. 4, 2021

(86) PCT No.: PCT/SE2021/050771
§ 371 (c)(1),
(2) Date: Jan. 30, 2023

(87) PCT Pub. No.: WO2022/031208
PCT Pub. Date: Feb. 10, 2022

(65) Prior Publication Data
US 2024/0015549 A1    Jan. 11, 2024

Related U.S. Application Data

(60) Provisional application No. 63/062,223, filed on Aug. 6, 2020.

(51) Int. Cl.
H04W 24/10 (2009.01)
H04L 5/00 (2006.01)

(52) U.S. Cl.
CPC ........... *H04W 24/10* (2013.01); *H04L 5/0048* (2013.01)

(58) Field of Classification Search
CPC .................... H04W 24/10; H04L 5/0048
See application file for complete search history.

(56) References Cited

U.S. PATENT DOCUMENTS

2015/0264592 A1 * 9/2015 Novlan ............... H04L 27/2601
                                                              370/252
2020/0022010 A1    1/2020 Kim et al.

OTHER PUBLICATIONS

International Search Report and Written Opinion of the International Searching Authority, PCT/SE2021/050771, mailed Nov. 23, 2021, 13 pages.

(Continued)

*Primary Examiner* — Chuong A Ngo
(74) *Attorney, Agent, or Firm* — Sage Patent Group

(57) ABSTRACT

A communication device can operate in a wireless communication network. The communication device can detect a measurement report triggering event based on a measurement of a first reference signal received by the communication device and based on a measurement of a second reference signal received by the communication device. The first and second reference signals can be different. The communication device can further transmit a measurement report to the wireless communication network responsive to detecting the measurement report triggering event. The measurement report includes at least one of the measurement of the first reference signal and/or the measurement of the second reference signal.

10 Claims, 64 Drawing Sheets

(56) References Cited

OTHER PUBLICATIONS

Ericsson, 3GPP TS RAN WG2 #107, R2-1909331, "Triggering of Conditional Handover in NR," Prague, Czech Republic, Aug. 26-30, 2019, 7 pages.
3GPP TS 38.401 v15.4.0 (Dec. 2018), 3rd Generation Partnership Project; Technical Specification Group Radio Access Network; NG-RAN; Architecture description (Release 15), 40 pages.
3GPP TS 38.331 v16.0.0 (Mar. 2020), 3rd Generation Partnership Project; Technical Specification Group Radio Access Network; NR; Radio Resource Control (RRC) protocol specification (Release 16), 835 pages.

* cited by examiner

```
-- ASN1START
-- TAG-SSB-INDEX-START

SSB-Index ::=                          INTEGER (0..maxNrofSSBs-1)

-- TAG-SSB-INDEX-STOP
-- ASN1STOP
```

FIG. 3

```
-- ASN1START
-- TAG-SSB-MTC-START

SSB-MTC ::=                       SEQUENCE {
    periodicityAndOffset              CHOICE {
        sf5                               INTEGER (0..4),
        sf10                              INTEGER (0..9),
        sf20                              INTEGER (0..19),
        sf40                              INTEGER (0..39),
        sf80                              INTEGER (0..79),
        sf160                             INTEGER (0..159)
    },
    duration                          ENUMERATED { sf1, sf2, sf3, sf4, sf5 }
}

SSB-MTC2 ::=                      SEQUENCE {
    pci-List                          SEQUENCE (SIZE (1..maxNrofPCIsPerSMTC)) OF PhysCellId
OPTIONAL,    -- Need M
    periodicity                       ENUMERATED {sf5, sf10, sf20, sf40, sf80, spare3,
spare2, spare1}
}

SSB-MTC2-LP-r16 ::=               SEQUENCE {
    pci-List                          SEQUENCE (SIZE (1..maxNrofPCIsPerSMTC)) OF PhysCellId
OPTIONAL,    -- Need R
    periodicity                       ENUMERATED {sf10, sf20, sf40, sf80, sf160, spare2,
spare2, spare1}
}

SSB-MTC3-r16 ::=                  SEQUENCE {
        ssb-MTC-Periodicity-r16           ENUMERATED {ms5, ms10, ms20, ms40, ms80, ms160, ms320,
ms640, ms1280},
        ssb-MTC-TimingOffset-r16          INTEGER (0..127),
        ssb-MTC-Duration-r16              ENUMERATED {sf1, sf2, sf3, sf4, sf5},
        ssb-MTC-pci-List-r16              SEQUENCE (SIZE (0..63)) OF PhysCellId,
        ssb-ToMeasure-r16                 SetupRelease { SSB-ToMeasure }
OPTIONAL    -- Need M
    }

-- TAG-SSB-MTC-STOP
-- ASN1STOP
```

FIG. 4

| SSB-MTC field descriptions |
|---|
| *duration* |
| Duration of the measurement window in which to receive SS/PBCH blocks. It is given in number of subframes (see TS 38.213, clause 4.1). |
| *periodicityAndOffset* |
| Periodicity and offset of the measurement window in which to receive SS/PBCH blocks, see 5.5.2.10. Periodicity and offset are given in number of subframes. |

FIG. 5

| SSB-MTC2 field descriptions |
|---|
| *pci-List* |
| PCIs that are known to follow this SMTC. |

FIG. 6

| SSB-MTC3 field descriptions |
|---|
| *ssb-MTC-Duration* |
| SMTC window duration. |
| *ssb-MTC-pci-List* |
| List of physical cell IDs to be measured. |
| *ssb-MTC-Periodity* |
| SMTC window periodicity. |
| *ssb-MTC-Timingoffset* |
| SMTC window timing offset. |

FIG. 7

```
-- ASN1START
-- TAG-SSB-POSITIONQCL-RELATIONSHIP-START

SSB-PositionQCL-Relationship-r16 ::=   ENUMERATED {n1,n2,n4,n8}

-- TAG-SSB-POSITIONQCL-RELATIONSHIP-STOP
-- ASN1STOP
```

FIG. 8

```
-- ASN1START
-- TAG-SSB-TOMEASURE-START

SSB-ToMeasure ::=                CHOICE {
    shortBitmap                      BIT STRING (SIZE (4)),
    mediumBitmap                     BIT STRING (SIZE (8)),
    longBitmap                       BIT STRING (SIZE (64))
}

-- TAG-SSB-TOMEASURE-STOP
-- ASN1STOP
```

FIG. 9

| SSB-ToMeasure field descriptions |
| --- |
| *longBitmap* <br> Bitmap when maximum number of SS/PBCH blocks per half frame equals to 64 as defined in TS 38.213, clause 4.1. |
| *mediumBitmap* <br> Bitmap when maximum number of SS/PBCH blocks per half frame equals to 8 as defined in TS 38.213, clause 4.1. |
| *shortBitmap* <br> Bitmap when maximum number of SS/PBCH blocks per half frame equals to 4 as defined in TS 38.213, clause 4.1. |

FIG. 10

```
-- ASN1START
-- TAG-NZP-CSI-RS-RESOURCE-START

NZP-CSI-RS-Resource ::=            SEQUENCE {
    nzp-CSI-RS-ResourceId           NZP-CSI-RS-ResourceId,
    resourceMapping                 CSI-RS-ResourceMapping,
    powerControlOffset              INTEGER (-8..15),
    powerControlOffsetSS            ENUMERATED{db-3, db0, db3, db6}    OPTIONAL,   -- Need R
    scramblingID                    ScramblingId,
    periodicityAndOffset            CSI-ResourcePeriodicityAndOffset   OPTIONAL,   -- Cond
PeriodicOrSemiPersistent
    qcl-InfoPeriodicCSI-RS          TCI-StateId            OPTIONAL,   -- Cond Periodic
    ...
}

-- TAG-NZP-CSI-RS-RESOURCE-STOP
-- ASN1STOP
```

FIG. 11

| NZP-CSI-RS-Resource field descriptions |
|---|
| *periodicityAndOffset* |
| Periodicity and slot offset s/1 corresponds to a periodicity of 1 slot, s/2 to a periodicity of two slots, and so on. The corresponding offset is also given in number of slots (see TS 38.214, clause 5.2.2.3.1). Network always configures the UE with a value for this field for periodic and semi-persistent NZP-CSI-RS-Resource (as indicated in *CSI-ResourceConfig*). |
| *powerControlOffset* |
| Power offset of PDSCH RE to NZP CSI-RS RE. Value in dB (see TS 38.214, clauses 5.2.2.3.1 and 4.1). |
| *powerControlOffsetSS* |
| Power offset of NZP CSI-RS RE to SSS RE. Value in dB (see TS 38.214, clause 5.2.2.3.1). |
| *qcl-InfoPeriodicCSI-RS* |
| For a target periodic CSI-RS, contains a reference to one *TCI-State* in TCI-States for providing the QCL source and QCL type. For periodic CSI-RS, the source can be SSB or another periodic-CSI-RS. Refers to the *TCI-State* which has this value for *tci-StateId* and is defined in *tci-StatesToAddModList* in the *PDSCH-Config* included in the *BWP-Downlink* corresponding to the serving cell and to the DL BWP to which the resource belongs to (see TS 38.214, clause 5.2.2.3.1). |
| *resourceMapping* |
| OFDM symbol location(s) in a slot and subcarrier occupancy in a PRB of the CSI-RS resource. |
| *scramblingID* |
| Scrambling ID (see TS 38.214, clause 5.2.2.3.1). |

FIG. 12

| Conditional Presence | Explanation |
|---|---|
| Periodic | The field is optionally present, Need M, for periodic *NZP-CSI-RS-Resources* (as indicated in *CSI-ResourceConfig*). The field is absent otherwise. |
| PeriodicOrSemiPersistent | The field is optionally present, Need M, for periodic and semi-persistent *NZP-CSI-RS-Resources* (as indicated in *CSI-ResourceConfig*). The field is absent otherwise. |

FIG. 13

```
-- ASN1START
-- TAG-NZP-CSI-RS-RESOURCEID-START

NZP-CSI-RS-ResourceId ::=            INTEGER (0..maxNrofNZP-CSI-RS-Resources-1)

-- TAG-NZP-CSI-RS-RESOURCEID-STOP
-- ASN1STOP
```

FIG. 14

```
-- ASN1START
-- TAG-NZP-CSI-RS-RESOURCESET-START
NZP-CSI-RS-ResourceSet ::=      SEQUENCE {
    nzp-CSI-ResourceSetId           NZP-CSI-RS-ResourceSetId,
    nzp-CSI-RS-Resources            SEQUENCE (SIZE (1..maxNrofNZP-CSI-RS-ResourcesPerSet))
                                      OF NZP-CSI-RS-ResourceId,
    repetition                      ENUMERATED { on, off }       OPTIONAL,   -- Need S
    aperiodicTriggeringOffset       INTEGER(0..6)                OPTIONAL,   -- Need S
    trs-Info                        ENUMERATED {true}            OPTIONAL,   -- Need R
    ...,
    [[
    aperiodicTriggeringOffsetExt-r16  INTEGER(0..31)             OPTIONAL    -- Need S
    ]]
}

-- TAG-NZP-CSI-RS-RESOURCESET-STOP
-- ASN1STOP
```

FIG. 15

| NZP-CSI-RS-ResourceSet field descriptions |
|---|
| aperiodicTriggeringOffset, aperiodicTriggeringOffsetExt<br>Offset X between the slot containing the DCI that triggers a set of aperiodic NZP CSI-RS resources and the slot in which the CSI-RS resource set is transmitted. For *aperiodicTriggeringOffset*, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For *aperiodicTriggeringOffsetExt*, the value indicates the number of slots. The network configures only one of the fields. When neither field is included, the UE applies the value 0. |
| nzp-CSI-RS-Resources<br>NZP-CSI-RS-Resources associated with this NZP-CSI-RS resource set (see TS 38.214, clause 5.2). For CSI, there are at most 8 NZP CSI RS resources per resource set. |
| repetition<br>Indicates whether repetition is on/off. If the field is set to *off* or if the field is absent, the UE may not assume that the NZP-CSI-RS resources within the resource set are transmitted with the same downlink spatial domain transmission filter (see TS 38.21, clauses 5.2.2.3.1 and 5.1.6.1.2). Can only be configured for CSI-RS resource sets which are associated with *CSI-ReportConfig* with report of L1 RSRP or "no report". |
| trs-Info<br>Indicates that the antenna port for all NZP-CSI-RS resources in the CSI-RS resource set is same. If the field is absent or released the UE applies the value *false* (see TS 38.214, clause 5.2.2.3.1). |

FIG. 16

```
-- ASN1START
-- TAG-NZP-CSI-RS-RESOURCESETID-START

NZP-CSI-RS-ResourceSetId ::=         INTEGER (0..maxNrofNZP-CSI-RS-ResourceSets-1)

-- TAG-NZP-CSI-RS-RESOURCESETID-STOP
-- ASN1STOP
```

FIG. 17

```
-- ASN1START
-- TAG-CSI-RS-RESOURCECONFIGMOBILITY-START

CSI-RS-ResourceConfigMobility ::=    SEQUENCE {
    subcarrierSpacing                 SubcarrierSpacing,
    csi-RS-CellList-Mobility          SEQUENCE (SIZE (1..maxNrofCSI-RS-CellsRRM)) OF CSI-RS-
CellMobility,
    ...,
    [[
    refServCellIndex                  ServCellIndex       OPTIONAL    -- Need S
    ]]

}

CSI-RS-CellMobility ::=              SEQUENCE {
    cellId                            PhysCellId,
    csi-rs-MeasurementBW              SEQUENCE {
        nrofPRBs                      ENUMERATED { size24, size48, size96, size192, size264},
        startPRB                      INTEGER(0..2169)
    },
    density                           ENUMERATED {d1,d3}          OPTIONAL,   -- Need R
    csi-rs-ResourceList-Mobility      SEQUENCE (SIZE (1..maxNrofCSI-RS-ResourcesRRM)) OF
CSI-RS-Resource-Mobility
}

CSI-RS-Resource-Mobility ::=         SEQUENCE {
    csi-RS-Index                      CSI-RS-Index,
    slotConfig                        CHOICE {
        ms4                           INTEGER (0..31),
        ms5                           INTEGER (0..39),
        ms10                          INTEGER (0..79),
        ms20                          INTEGER (0..159),
        ms40                          INTEGER (0..319)
    },
    associatedSSB                     SEQUENCE {
        ssb-Index                     SSB-Index,
        isQuasiColocated              BOOLEAN
    }
OPTIONAL,  -- Need R
    frequencyDomainAllocation         CHOICE {
        row1                          BIT STRING (SIZE (4)),
        row2                          BIT STRING (SIZE (12))
    },
    firstOFDMSymbolInTimeDomain       INTEGER (0..13),
    sequenceGenerationConfig          INTEGER (0..1023),
    ...
}

CSI-RS-Index ::=                     INTEGER (0..maxNrofCSI-RS-ResourcesRRM-1)

-- TAG-CSI-RS-RESOURCECONFIGMOBILITY-STOP
-- ASN1STOP
```

FIG. 18

| CSI-RS-CellMobility field descriptions |
|---|
| csi-rs-ResourceList-Mobility<br>List of CSI-RS resources for mobility. The maximum number of CSI-RS resources that can be configured per measObjectNR depends on the configuration of associatedSSB (see TS 38.214 [19], clause 5.1.6.1.3). |
| density<br>Frequency domain density for the 1-port CSI-RS for L3 mobility. See TS 38.211 [16], clause 7.4.1. |
| nrofPRBs<br>Allowed size of the measurement BW in PRBs. See TS 38.211 [16], clause 7.4.1. |
| startPRB<br>Starting PRB index of the measurement bandwidth. See TS 38.211 [16], clause 7.4.1. |

FIG. 19

| CSI-RS-ResourceConfigMobility field descriptions |
|---|
| csi-RS-CellList-Mobility<br>List of cells for CSI-RS based RRM measurements. |
| refServCellIndex<br>Indicates the serving cell providing the timing reference for CSI-RS resources without associatedSSB. The field may be present only if there is at least one CSI-RS resource configured without associatedSSB. If this field is absent, the UE shall use the timing of the PCell for measurements on the CSI-RS resources without associatedSSB. The CSI-RS resources and the serving cell indicated by refServCellIndex for timing reference should be located in the same band. |
| subcarrierSpacing<br>Subcarrier spacing of CSI-RS. Only the values 15, 30 kHz or 60 kHz (FR1), and 60 or 120 kHz (FR2) are applicable. |

FIG. 20

```
NR-RS-Type ::=                                      ENUMERATED {ssb, csi-rs}
```

FIG. 21

```
-- ASN1START
-- TAG-MEASOBJECTNR-START

MeasObjectNR ::=                    SEQUENCE {
    ssbFrequency             ARFCN-ValueNR        OPTIONAL,  -- Cond SSBorAssociatedSSB
    ssbSubcarrierSpacing     SubcarrierSpacing    OPTIONAL,  -- Cond SSBorAssociatedSSB
    smtc1                    SSB-MTC              OPTIONAL,  -- Cond SSBorAssociatedSSB
    smtc2                    SSB-MTC2             OPTIONAL,  -- Cond IntraFreqConnected
    refFreqCSI-RS            ARFCN-ValueNR        OPTIONAL,  -- Cond CSI-RS
    referenceSignalConfig            ReferenceSignalConfig,
    absThreshSS-BlocksConsolidation  ThresholdNR          OPTIONAL,  -- Need R
    absThreshCSI-RS-Consolidation    ThresholdNR          OPTIONAL,  -- Need R
    nrofSS-BlocksToAverage   INTEGER (2..maxNrofSS-BlocksToAverage)   OPTIONAL,  -- Need R
    nrofCSI-RS-ResourcesToAverage    INTEGER (2..maxNrofCSI-RS-ResourcesToAverage)
        OPTIONAL,   -- Need R
    quantityConfigIndex      INTEGER (1..maxNrofQuantityConfig),
    offsetMO                 Q-OffsetRangeList,
    cellsToRemoveList        PCI-List             OPTIONAL,  -- Need N
    cellsToAddModList        CellsToAddModList    OPTIONAL,  -- Need N
    blackCellsToRemoveList   PCI-RangeIndexList   OPTIONAL,  -- Need N
    blackCellsToAddModList   SEQUENCE (SIZE (1..maxNrofPCI-Ranges)) OF
        PCI-RangeElement     OPTIONAL,   -- Need N
    whiteCellsToRemoveList   PCI-RangeIndexList   OPTIONAL,  -- Need N
    whiteCellsToAddModList   SEQUENCE (SIZE (1..maxNrofPCI-Ranges)) OF
        PCI-RangeElement     OPTIONAL,   -- Need N
    ...,
    [[
    freqBandIndicatorNR      FreqBandIndicatorNR  OPTIONAL,  -- Need R
    measCycleSCell   ENUMERATED {sf160, sf256, sf320, sf512, sf640, sf1024, sf1280} OPTIONAL
        -- Need R
    ]],
    [[
    smtc3list-r16            SSB-MTC3List-r16     OPTIONAL,  -- Cond FFS
    rmtc-Config-r16          SetupRelease {RMTC-Config-r16}  OPTIONAL,  -- Need M
    ssb-PositionQCL-Common-r16    SSB-PositionQCL-Relationship-r16    OPTIONAL,  -- Need M
    ssb-PositionQCL-CellsToAddModList-r16    SSB-PositionQCL-CellsToAddModList-r16
        OPTIONAL,   -- Need N
    ssb-PositionQCL-CellsToRemoveList-r16    PCI-List    OPTIONAL,  -- Need N
    t312-r16                 SetupRelease { T312-r16 }    OPTIONAL,  -- Need M
    ]]
}

SSB-MTC3List-r16 ::=         SEQUENCE (SIZE(1..4)) OF SSB-MTC3-r16

T312-r16 ::=        ENUMERATED { ms0, ms50, ms100, ms200, ms300, ms400, ms500, ms1000}

ReferenceSignalConfig::=             SEQUENCE {
    ssb-ConfigMobility       SSB-ConfigMobility   OPTIONAL,  -- Need M
    csi-rs-ResourceConfigMobility   SetupRelease { CSI-RS-ResourceConfigMobility }
        OPTIONAL    -- Need M
}
```

FIG. 22

```
SSB-ConfigMobility::=            SEQUENCE {
    ssb-ToMeasure                SetupRelease { SSB-ToMeasure }   OPTIONAL,   -- Need M
    deriveSSB-IndexFromCell      BOOLEAN,
    ss-RSSI-Measurement          SS-RSSI-Measurement              OPTIONAL,   -- Need M
    ...
}

Q-OffsetRangeList ::=            SEQUENCE {
    rsrpOffsetSSB                Q-OffsetRange                    DEFAULT dB0,
    rsrqOffsetSSB                Q-OffsetRange                    DEFAULT dB0,
    sinrOffsetSSB                Q-OffsetRange                    DEFAULT dB0,
    rsrpOffsetCSI-RS             Q-OffsetRange                    DEFAULT dB0,
    rsrqOffsetCSI-RS             Q-OffsetRange                    DEFAULT dB0,
    sinrOffsetCSI-RS             Q-OffsetRange                    DEFAULT dB0
}

ThresholdNR ::=                  SEQUENCE{
    thresholdRSRP                RSRP-Range    OPTIONAL,    -- Need R
    thresholdRSRQ                RSRQ-Range    OPTIONAL,    -- Need R
    thresholdSINR                SINR-Range    OPTIONAL     -- Need R
}

CellsToAddModList ::=            SEQUENCE (SIZE (1..maxNrofCellMeas)) OF CellsToAddMod CellsToAddMod ::=                SEQUENCE {
    physCellId                   PhysCellId,
    cellIndividualOffset         Q-OffsetRangeList
}

RMTC-Config-r16 ::=              SEQUENCE {
    rmtc-Periodicity-r16         ENUMERATED {ms40, ms80, ms160, ms320, ms640},
    rmtc-SubframeOffset-r16      INTEGER(0..639)                  OPTIONAL,   -- Need M
    measDuration-r16             ENUMERATED {sym1, sym14, sym28, sym42, sym70},
    rmtc-MeasARFCN-r16           ARFCN-ValueNR,
    ...
}

SSB-PositionQCL-CellsToAddModList-r16 ::= SEQUENCE (SIZE (1..maxNrofCellMeas)) OF SSB-
PositionQCL-CellsToAdd-r16

SSB-PositionQCL-CellsToAdd-r16 ::= SEQUENCE {
    physCellId-r16               PhysCellId,
    ssb-PositionQCL-r16          SSB-PositionQCL-Relationship-r16
}

-- TAG-MEASOBJECTNR-STOP
-- ASN1STOP
```

FIG. 22 (Cont.)

| CellsToAddMod field descriptions |
|---|
| *cellIndividualOffset* |
| Cell individual offsets applicable to a specific cell. |
| *physCellId* |
| Physical cell identity of a cell in the cell list. |

FIG. 23

| *MeasObjectNR* field descriptions |
|---|
| *absThreshCSI-RS-Consolidation*<br>Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2. |
| *absThreshSS-BlocksConsolidation*<br>Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2. |
| *blackCellsToAddModList*<br>List of cells to add/modify in the black list of cells. It applies only to SSB resources. |
| *blackCellsToRemoveList*<br>List of cells to remove from the black list of cells. |
| *cellsToAddModList*<br>List of cells to add/modify in the cell list. |
| *cellsToRemoveList*<br>List of cells to remove from the cell list. |
| *freqBandIndicatorNR*<br>The frequency band in which the SSB and/or CSI-RS indicated in this *MeasObjectNR* are located and according to which the UE shall perform the RRM measurements. This field is always provided when the network configures measurements with this *MeasObjectNR*. |
| *measCycleSCell*<br>The parameter is used only when an SCell is configured on the frequency indicated by the measObjectNR and is in deactivated state, see TS 38.133 [14]. gNB configures the parameter whenever an SCell is configured on the frequency indicated by the *measObjectNR*, but the field may also be signalled when an SCell is not configured. Value *sf160* corresponds to 160 sub-frames, value *sf256* corresponds to 256 sub-frames and so on. |
| *nrofCSInrofCSI-RS-ResourcesToAverage*<br>Indicates the maximum number of measurement results per beam based on CSI-RS resources to be averaged. The same value applies for each detected cell associated with this *MeasObjectNR*. |
| *nrofSS-BlocksToAverage*<br>Indicates the maximum number of measurement results per beam based on SS/PBCH blocks to be averaged. The same value applies for each detected cell associated with this *MeasObject*. |
| *offsetMO*<br>Offset values applicable to all measured cells with reference signal(s) indicated in this *MeasObjectNR*. |
| *quantityConfigIndex*<br>Indicates the *n-th* element of *quantityConfigNR-List* provided in *MeasConfig*. |
| *referenceSignalConfig*<br>RS configuration for SS/PBCH block and CSI-RS. |
| *refFreqCSI-RS*<br>Point A which is used for mapping of CSI-RS to physical resources according to TS 38.211 [16] clause 7.4.1.5.3. |
| *smtc1*<br>Primary measurement timing configuration. (see clause 5.5.2.10). |
| *smtc2*<br>Secondary measurement timing configuration for SS corresponding to this *MeasObjectNR* with PCI listed in *pci-List*. For these SS, the periodicity is indicated by *periodicity* in *smtc2* and the timing offset is equal to the offset indicated in *periodicityAndOffset* modulo *periodicity*. *periodicity* in smtc2 can only be set to a value strictly shorter than the periodicity indicated by *periodicityAndOffset* in *smtc1* (e.g. if *periodicityAndOffset* indicates sf10, *periodicity* can only be set of sf5, if *periodicityAndOffset* indicates sf5, *smtc2* cannot be configured). |
| *smtc3list-v16xy*<br>Measurement timing configuration list for SS corresponding to IAB-MT. |
| *ssbFrequency*<br>Indicates the frequency of the SS associated to this *MeasObjectNR*. |
| *ssbSubcarrierSpacing*<br>Subcarrier spacing of SSB. Only the values 15 kHz or 30 kHz (FR1), and 120 kHz or 240 kHz (FR2) are applicable. |
| *t312*<br>The value of timer T312. Value ms0 represents 0 ms, ms50 represents 50 ms and so on. |
| *whiteCellsToAddModList*<br>List of cells to add/modify in the white list of cells. It applies only to SSB resources. |
| *whiteCellsToRemoveList*<br>List of cells to remove from the white list of cells. |

FIG. 24

| RMTC-Config field descriptions |
|---|
| *measDuration*<br>Number of consecutive symbols for which the Physical Layer reports samples of RSSI (see TS 38.215 [9]). Value *sym1* corresponds to one symbol, *sym14* corresponds to 14 symbols, and so on. |
| *rmtc-MeasARFCN*<br>Indicates the center frequency of the measured bandwidth (see TS 38.xx, clause X.X). |
| *rmtc-Periodicity*<br>Indicates the RSSI measurement timing configuration (RMTC) periodicity for this frequency (see TS 38.215 [9]). |
| *rmtc-SubframeOffset*<br>Indicates the RSSI measurement timing configuration (RMTC) subframe offset for this frequency (see TS 38.215 [9]). |

FIG. 25

| ReferenceSignalConfig field descriptions |
|---|
| *csi-rs-ResourceConfigMobility*<br>CSI-RS resources to be used for CSI-RS based RRM measurements. |
| *ssb-ConfigMobility*<br>SSB configuration for mobility (nominal SSBs, timing configuration). |

FIG. 26

| SSB-ConfigMobility field descriptions |
|---|
| *deriveSSB-IndexFromCell*<br>If this field is set to *true*, UE assumes SFN and frame boundary alignment across cells on the same frequency carrier as specified in TS 38.133 [14]. Hence, if the UE is configured with a serving cell for which (*absoluteFrequencySSB*, *subcarrierSpacing*) in *ServingCellConfigCommon* is equal to (*ssbFrequency*, *ssbSubcarrierSpacing*) in this *MeasObjectNR*, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency. |
| *ssb-ToMeasure*<br>The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardless of the value of this field, SS/PBCH blocks outside of the applicable *smtc* are not to be measured. See TS 38.215 [9] clause 5.1.1. |

FIG. 27

| Conditional Presence | Explanation |
|---|---|
| CSI-RS | This field is mandatory present if *csi-rs-ResourceConfigMobility* is configured, otherwise, it is absent. |
| SSBorAssociatedSSB | This field is mandatory present if *ssb-ConfigMobility* is configured or *associatedSSB* is configured in at least one cell. Otherwise, it is absent, Need R. |
| IntraFreqConnected | This field is optionally present, Need R if the UE is configured with a serving cell for which (*absoluteFrequencySSB*, subcarrierSpacing) in ServingCellConfigCommon is equal to (*ssbFrequency*, ssbSubcarrierSpacing) in this *MeasObjectNR*, otherwise, it is absent. |

FIG. 28

```
-- ASN1START
-- TAG-MEASRESULTS-START

MeasResults ::=                         SEQUENCE {
    measId                                  MeasId,
    measResultServingMOList                 MeasResultServMOList,
    measResultNeighCells                    CHOICE {
        measResultListNR                        MeasResultListNR,
        ...,
        measResultListEUTRA                     MeasResultListEUTRA,
        measResultListUTRA-FDD-r16              MeasResultListUTRA-FDD-r16
    }
OPTIONAL,
    ...,
    [[
    measResultServFreqListEUTRA-SCG         MeasResultServFreqListEUTRA-SCG     OPTIONAL,
    measResultServFreqListNR-SCG            MeasResultServFreqListNR-SCG        OPTIONAL,
    measResultSFTD-EUTRA                    MeasResultSFTD-EUTRA                OPTIONAL,
    measResultSFTD-NR                       MeasResultCellSFTD-NR               OPTIONAL
    ]],
    [[
    measResultCellListSFTD-NR               MeasResultCellListSFTD-NR           OPTIONAL
    ]],
    [[
    measResultForRSSI-r16                   MeasResultForRSSI-r16               OPTIONAL,
    locationInfo-r16                        LocationInfo-r16                    OPTIONAL,
    ul-PDCP-DelayValueResultList-r16        UL-PDCP-DelayValueResultList-r16    OPTIONAL,
    measResultsSL-r16                       MeasResultsSL-r16                   OPTIONAL,
    measResultCLI-r16                       MeasResultCLI-r16                   OPTIONAL
    ]]

}

MeasResultServMOList ::=                SEQUENCE (SIZE (1..maxNrofServingCells)) OF
MeasResultServMO MeasResultServMO ::=                    SEQUENCE {
    servCellId                              ServCellIndex,
    measResultServingCell                   MeasResultNR,
    measResultBestNeighCell                 MeasResultNR                        OPTIONAL,
    ...
}

MeasResultListNR ::=                    SEQUENCE (SIZE (1..maxCellReport)) OF MeasResultNR MeasResultNR ::=                        SEQUENCE {
    physCellId                              PhysCellId                          OPTIONAL,
    measResult                              SEQUENCE {
        cellResults                             SEQUENCE{
            resultsSSB-Cell                         MeasQuantityResults             OPTIONAL,
            resultsCSI-RS-Cell                      MeasQuantityResults             OPTIONAL
        },
        rsIndexResults                          SEQUENCE{
            resultsSSB-Indexes                      ResultsPerSSB-IndexList         OPTIONAL,
            resultsCSI-RS-Indexes                   ResultsPerCSI-RS-IndexList      OPTIONAL
        }
OPTIONAL
    },
    ...,
    [[
    cgi-Info                                CGI-InfoNR
OPTIONAL
    ]]
}

MeasResultListEUTRA ::=                 SEQUENCE (SIZE (1..maxCellReport)) OF MeasResultEUTRA MeasResultEUTRA ::=                     SEQUENCE {
    eutra-PhysCellId                        PhysCellId,
    measResult                              MeasQuantityResultsEUTRA, cgi-Info                                CGI-InfoEUTRA                       OPTIONAL,
    ...
}
```

FIG. 29

```
MultiBandInfoListEUTRA ::=      SEQUENCE (SIZE (1..maxMultiBands)) OF FreqBandIndicatorEUTRA MeasQuantityResults ::=         SEQUENCE {
    rsrp            RSRP-Range          OPTIONAL,
    rsrq            RSRQ-Range          OPTIONAL,
    sinr            SINR-Range          OPTIONAL
}

MeasQuantityResultsEUTRA ::=    SEQUENCE {
    rsrp            RSRP-RangeEUTRA     OPTIONAL,
    rsrq            RSRQ-RangeEUTRA     OPTIONAL,
    sinr            SINR-RangeEUTRA     OPTIONAL
}

ResultsPerSSB-IndexList::=       SEQUENCE (SIZE (1..maxNrofIndexesToReport2)) OF
ResultsPerSSB-Index ResultsPerSSB-Index ::=         SEQUENCE {
    ssb-Index                   SSB-Index,
    ssb-Results                 MeasQuantityResults
OPTIONAL
}

ResultsPerCSI-RS-IndexList::=    SEQUENCE (SIZE (1..maxNrofIndexesToReport2)) OF
ResultsPerCSI-RS-Index ResultsPerCSI-RS-Index ::=      SEQUENCE {
    csi-RS-Index                CSI-RS-Index,
    csi-RS-Results              MeasQuantityResults     OPTIONAL
}
MeasResultServFreqListEUTRA-SCG ::= SEQUENCE (SIZE (1..maxNrofServingCellsEUTRA)) OF
MeasResult2EUTRA MeasResultServFreqListNR-SCG ::= SEQUENCE (SIZE (1..maxNrofServingCells)) OF MeasResult2NR MeasResultListUTRA-FDD-r16 ::=   SEQUENCE (SIZE (1..maxCellReport)) OF MeasResultUTRA-
FDD-r16

MeasResultUTRA-FDD-r16 ::=      SEQUENCE {
    physCellId-r16              PhysCellIdUTRA-FDD-r16,
    measResult-r16              SEQUENCE {
        utra-FDD-RSCP-r16           INTEGER (-5..91)        OPTIONAL,
        utra-FDD-EcN0-r16           INTEGER (0..49)         OPTIONAL
    }
}

MeasResultForRSSI-r16 ::=       SEQUENCE {
    rssi-Result-r16             ENUMERATED{ffs},
    channelOccupancy-r16        INTEGER (0..100)
}
```

FIG. 29 (Cont.)

```
-- ASN1START
-- TAG-SERVINGCELLCONFIG-START

ServingCellConfig ::=              SEQUENCE {
    tdd-UL-DL-ConfigurationDedicated   TDD-UL-DL-ConfigDedicated    OPTIONAL,   -- Cond TDD
    initialDownlinkBWP                 BWP-DownlinkDedicated        OPTIONAL,   -- Need M
    downlinkBWP-ToReleaseList          SEQUENCE (SIZE (1..maxNrofBWPs)) OF BWP-Id
OPTIONAL,   -- Need N
    downlinkBWP-ToAddModList           SEQUENCE (SIZE (1..maxNrofBWPs)) OF BWP-Downlink
OPTIONAL,   -- Need N
    firstActiveDownlinkBWP-Id          BWP-Id
OPTIONAL,   -- Cond SyncAndCellAdd
    bwp-InactivityTimer                ENUMERATED {ms2, ms3, ms4, ms5, ms6, ms8, ms10, ms20,
ms30,ms40,ms50,ms60, ms80,ms100, ms200,ms300, ms500,ms750, ms1280, ms1920, ms2560, spare10,
spare9, spare8,spare7, spare6, spare5, spare4, spare3, spare2, spare1 } OPTIONAL,  --Need R defaultDownlinkBWP-Id              BWP-Id                       OPTIONAL,   -- Need S
    uplinkConfig                       UplinkConfig                 OPTIONAL,   -- Need M
    supplementaryUplink                UplinkConfig                 OPTIONAL,   -- Need M
    pdcch-ServingCellConfig            SetupRelease { PDCCH-ServingCellConfig }
OPTIONAL,   -- Need M
    pdsch-ServingCellConfig            SetupRelease { PDSCH-ServingCellConfig }
OPTIONAL,   -- Need M
    csi-MeasConfig                     SetupRelease { CSI-MeasConfig }
OPTIONAL,   -- Need M
    sCellDeactivationTimer             ENUMERATED {ms20, ms40, ms80, ms160, ms200, ms240,
                                                   ms320, ms400, ms480, ms520, ms640, ms720,
                                                   ms840, ms1280, spare2,spare1}
OPTIONAL,   -- Cond ServingCellWithoutPUCCH
    crossCarrierSchedulingConfig       CrossCarrierSchedulingConfig OPTIONAL,   -- Need M
    tag-Id                             TAG-Id,
    dummy                              ENUMERATED {enabled}         OPTIONAL,   -- Need R
    pathlossReferenceLinking           ENUMERATED {spCell, sCell}   OPTIONAL,   -- Cond SCellOnly
    servingCellMO                      MeasObjectId                 OPTIONAL,   -- Cond MeasObject
    ...,
    [[
    lte-CRS-ToMatchAround              SetupRelease { RateMatchPatternLTE-CRS } OPTIONAL,  -- Need M
    rateMatchPatternToAddModList       SEQUENCE (SIZE (1..maxNrofRateMatchPatterns)) OF
RateMatchPattern    OPTIONAL,   -- Need N
    rateMatchPatternToReleaseList      SEQUENCE (SIZE (1..maxNrofRateMatchPatterns)) OF
RateMatchPatternId  OPTIONAL,   -- Need N
    downlinkChannelBW-PerSCS-List      SEQUENCE (SIZE (1..maxSCSs)) OF SCS-SpecificCarrier
OPTIONAL    -- Need S
    ]],
    [[
    supplementaryUplinkRelease         ENUMERATED {true}            OPTIONAL,   -- Need N
    tdd-UL-DL-ConfigurationDedicated-iab-mt-v16xy  TDD-UL-DL-ConfigDedicated-IAB-MT-v16xy
OPTIONAL,   -- Need FFS
    firstWithinActiveTimeBWP-Id-r16    BWP-Id OPTIONAL,  -- Cond MultipleNonDormantBWP
    firstOutsideActiveTimeBWP-Id-r16   BWP-Id OPTIONAL,  -- Cond MultipleNonDormantBWP-WUS
    ca-SlotOffset-r16                  CHOICE {
        refSCS15kHz                        INTEGER (-2..2),
        refSCS30kHz                        INTEGER (-5..5),
        refSCS60kHz                        INTEGER (-10..10),
        refSCS120kHz                       INTEGER (-20..20)
    }                                                                OPTIONAL,   -- Cond AsyncCA
    channelAccessConfig-r16            ChannelAccessConfig-r16       OPTIONAL    -- Need N
    ]]
}
```

FIG. 30

```
UplinkConfig ::=                       SEQUENCE {
    initialUplinkBWP         BWP-UplinkDedicated                         OPTIONAL,    -- Need M
    uplinkBWP-ToReleaseList  SEQUENCE (SIZE (1..maxNrofBWPs)) OF BWP-Id OPTIONAL,    -- Need N
    uplinkBWP-ToAddModList   SEQUENCE (SIZE (1..maxNrofBWPs)) OF BWP-Uplink OPTIONAL, -- Need N
    firstActiveUplinkBWP-Id              BWP-Id       OPTIONAL,    -- Cond SyncAndCellAdd
    pusch-ServingCellConfig  SetupRelease { PUSCH-ServingCellConfig }   OPTIONAL,    -- Need M
    carrierSwitching         SetupRelease { SRS-CarrierSwitching }      OPTIONAL,    -- Need M
    ...,
    [[
    powerBoostPi2BPSK                    BOOLEAN      OPTIONAL,    -- Need M
    uplinkChannelBW-PerSCS-List  SEQUENCE (SIZE (1..maxSCSs)) OF SCS-SpecificCarrier
        OPTIONAL    -- Need S
    ]],
    [[
    bdFactorR-r16                        ENUMERATED {n1}    OPTIONAL,    -- Need R
    lte-CRS-PatternList-r16              SetupRelease { LTE-CRS-PatternList-r16 }
        OPTIONAL,    -- Cond LTE-CRS
    lte-CRS-PatternListSecond-r16        SetupRelease { LTE-CRS-PatternList-r16 }
        OPTIONAL,    -- Cond CORESETPool
    enablePLRS-UpdateForPUSCH-SRS        ENUMERATED {enabled}   OPTIONAL,    -- Need R
    enableDefaultBeamPL-ForPUSCH0        ENUMERATED {enabled}   OPTIONAL,    -- Need R
    enableDefaultBeamPL-ForPUCCH         ENUMERATED {enabled}   OPTIONAL,    -- Need R
    enableDefaultBeamPL-ForSRS           ENUMERATED {enabled}   OPTIONAL     -- Need R
    ]]
}

ChannelAccessConfig-r16 ::=              SEQUENCE {
    maxEnergyDetectionThreshold-r16      INTEGER (-85..-52),
    energyDetectionThresholdOffset-r16   INTEGER (-20..-13),
    ul-toDL-COT-SharingED-Threshold-r16  INTEGER (-85..-52)   OPTIONAL,    -- Need R
    absenceOfAnyOtherTechnology-r16      ENUMERATED {true}    OPTIONAL     -- Need R
}

-- TAG-SERVINGCELLCONFIG-STOP
-- ASN1STOP
```

FIG. 30 (Cont.)

| *ServingCellConfig* field descriptions |
|---|
| *absenceOfAnyOtherTechnology*<br>Presence of this field indicates absence on a long term basis (e.g. by level of regulation) of any other technology sharing the carrier; absence of this field indicates the potential presence of any other technology sharing the carrier, as specified in TS 37.213 [48] clause Y. |
| *bdFactorR*<br>Parameter for determining and distributing the maximum numbers of BD/CCE for mPDCCH based mPDSCH transmission as specified in TS 38.213 [13] Clause 10.1. |
| *bwp-InactivityTimer*<br>The duration in ms after which the UE falls back to the default Bandwidth Part (see TS 38.321 [3], clause 5.15). When the network releases the timer configuration, the UE stops the timer without switching to the default BWP. |
| *ca-SlotOffset*<br>Slot offset between the primary cell (PCell/PSCell) and the SCell in unaligned frame boundary with slot alignment and partial SFN alignment inter-band CA. Based on this field, the UE determines the time offset of the SCell as specified in clause 4.5 of TS 38.211 [16]. The granularity of this field is determined by the reference SCS for the slot offset (i.e. the maximum of PCell/PSCell lowest SCS among all the configured SCSs in DL/UL SCS-*SpecificCarrierList* in *ServingCellConfig* and this serving cell's lowest SCS among all the configured SCSs in DL/UL SCS-*SpecificCarrierList* in *ServingCellConfig*).<br>The Network configures at most single non-zero offset duration in ms (independent on SCS) among CCs in the unaligned CA configuration. If the field is absent, the UE applies the value of 0. |
| *channelAccessConfig*<br>List of parameters used for access procedures of operation with shared spectrum channel access (see TS 37.213 [48]). |
| *crossCarrierSchedulingConfig*<br>Indicates whether this serving cell is cross-carrier scheduled by another serving cell or whether it cross-carrier schedules another serving cell. |
| *defaultDownlinkBWP-Id*<br>The initial bandwidth part is referred to by BWP-Id = 0. ID of the downlink bandwidth part to be used upon expiry of the BWP inactivity timer. This field is UE specific. When the field is absent the UE uses the initial BWP as default BWP. (see TS 38.213 [13], clause 12 and TS 38.321 [3], clause 5.15). |
| *downlinkBWP-ToAddModList*<br>List of additional downlink bandwidth parts to be added or modified. (see TS 38.213 [13], clause 12). |
| *downlinkBWP-ToReleaseList*<br>List of additional downlink bandwidth parts to be released. (see TS 38.213 [13], clause 12). |
| *downlinkChannelBW-PerSCS-List*<br>A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in *scs-SpecificCarrierList* in *DownlinkConfigCommon* / *DownlinkConfigCommonSIB*. Network only configures channel bandwidth that corresponds to the channel bandwidth values defined in TS 38.101-1 [15] and TS 38.101-2 [39]. |
| *energyDetectionThresholdOffset*<br>Indicates the offset to the default maximum energy detection threshold value. Unit in dB. Value -13 corresponds to -13dB, value -12 corresponds to -12dB, and so on (i.e. in steps of 1dB) as specified in TS 37.213 [48]. |
| *firstActiveDownlinkBWP-Id*<br>If configured for an SpCell, this field contains the ID of the DL BWP to be activated upon performing the RRC (re-)configuration. If the field is absent, the RRC (re-)configuration does not impose a BWP switch.<br>If configured for an SCell, this field contains the ID of the downlink bandwidth part to be used upon MAC-activation of an SCell. The initial bandwidth part is referred to by BWP-Id = 0.<br>Upon PCell change and PSCell addition/change, the network sets the *firstActiveDownlinkBWP-Id* and *firstActiveUplinkBWP-Id* to the same value. |
| *initialDownlinkBWP*<br>The dedicated (UE-specific) configuration for the initial downlink bandwidth-part (i.e. DL BWP#0). If any of the optional IEs are configured within this IE, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1 |
| *lte-CRS-PatternList*<br>A list of LTE CRS patterns around which the UE shall do rate matching for PDSCH. The LTE CRS patterns in this list shall be non-overlapping in frequency. |

FIG. 31

| |
|---|
| lte-CRS-PatternListSecond |
| A list of LTE CRS patterns around which the UE shall do rate matching for PDSCH scheduled with a DCI detected on a CORESET with CORESETPoolIndex configured with 1. This list is configured only if CORESETPoolIndex configured with 1. The first LTE CRS pattern in this list shall be fully overlapping in frequency with the first LTE CRS pattern in lte-CRS-PatternList. The second LTE CRS pattern in this list shall be fully overlapping in frequency with the second LTE CRS pattern in lte-CRS-PatternList, and so on. |
| lte-CRS-ToMatchAround |
| Parameters to determine an LTE CRS pattern that the UE shall rate match around. |
| maxEnergyDetectionThreshold |
| Indicates the absolute maximum energy detection threshold value. Unit in dBm. Value -85 corresponds to -85 dBm, value -84 corresponds to -84 dBm, and so on (i.e. in steps of 1dBm) as specified in TS 37.213 [48]. If the field is not configured, the UE shall use a default maximum energy detection threshold value as specified in TS 37.213 [48]. |
| pathlossReferenceLinking |
| Indicates whether UE shall apply as pathloss reference either the downlink of SpCell (PCell for MCG or PSCell for SCG) or of SCell that corresponds with this uplink (see TS 38.213 [13], clause 7). |
| pdsch-ServingCellConfig |
| PDSCH related parameters that are not BWP-specific. |
| rateMatchPatternToAddModList |
| Resources patterns which the UE should rate match PDSCH around. The UE rate matches around the union of all resources indicated in the rate match patterns. Rate match patterns defined here on cell level apply only to PDSCH of the same numerology. See TS 38.214 [19], clause 5.1.2.2.3. |
| sCellDeactivationTimer |
| SCell deactivation timer in TS 38.321 [3]. If the field is absent, the UE applies the value infinity. |
| servingCellMO |
| measObjectId of the MeasObjectNR in MeasConfig which is associated to the serving cell. For this MeasObjectNR, the following relationship applies between this MeasObjectNR and frequencyInfoDL in ServingCellConfigCommon of the serving cell: if ssbFrequency is configured, its value is the same as the absoluteFrequencySSB and if csi-rs-ResourceConfigMobility is configured, the value of its subcarrierSpacing is present in one entry of the scs-SpecificCarrierList, csi-RS-CellListMobility includes an entry corresponding to the serving cell (with cellId equal to physCellId in ServingCellConfigCommon) and the frequency range indicated by the csi-rs-MeasurementBW of the entry in csi-RS-CellListMobility is included in the frequency range indicated by in the entry of the scs-SpecificCarrierList. |
| supplementaryUplink |
| Network may configure this field only when supplementaryUplinkConfig is configured in ServingCellConfigCommon or ServingCellConfigCommonSIB. |
| supplementaryUplinkRelease |
| If this field is included, the UE shall release the uplink configuration configured by supplementaryUplink. The network only includes either supplementaryUplinkRelease or supplementaryUplink at a time. |
| tag-Id |
| Timing Advance Group ID, as specified in TS 38.321 [3], which this cell belongs to. |
| tdd-UL-DL-ConfigurationDedicated-Iab-mt v16xy |
| Resource configuration per IAB-MT D/U/F overrides all symbols (with a limitation that effectively only flexible symbols can be overwritten in Rel-16) per slot over the number of slots as provided by TDD-UL-DL-ConfigurationCommon. |
| ul-toDL-COT-SharingED-Threshold |
| Maximum energy detection threshold that the UE should use to share channel occupancy with gNB for DL transmission with length no longer than 2, 4, and 8 OFDM symbols for 15Khz, 30Khz, 60KHz SCS respectively, as specified in TS 37.213 [48]. |
| uplinkConfig |
| Network may configure this field only when uplinkConfigCommon is configured in ServingCellConfigCommon or ServingCellConfigCommonSIB. |

FIG. 31 (Cont.)

| UplinkConfig field descriptions |
|---|
| *carrierSwitching*<br>Includes parameters for configuration of carrier based SRS switching (see TS 38.214 [19], clause 6.2.1.3. |
| *enableDefaultBeamPlForPUSCH0_0, enableDefaultBeamPlForPUCCH, enableDefaultBeamPlForSRS*<br>When the parameter is present, UE derives the spatial relation and the corresponding pathloss reference Rs as specified in 38.213, clauses 7.1.1, 7.2.1, 7.3.1 and 9.2.2The network only configures these parameters for FR2. |
| *enablePLRSupdateForPUSCHSRS*<br>When this parameter is present, the Rel-16 feature of MAC CE based pathloss RS updates for PUSCH/SRS is enabled. Network only configures this parameter , when the UE is configured with *srl-PUSCH-PowerControl*. |
| *firstActiveUplinkBWP-Id*<br>If configured for an SpCell, this field contains the ID of the UL BWP to be activated upon performing the RRC (re-)configuration. If the field is absent, the RRC (re-)configuration does not impose a BWP switch.<br>If configured for an SCell, this field contains the ID of the uplink bandwidth part to be used upon MAC-activation of an SCell. The initial bandwidth part is referred to by BandiwdthPartId = 0. |
| *initialUplinkBWP*<br>The dedicated (UE-specific) configuration for the initial uplink bandwidth-part (i.e. UL BWP#0). If any of the optional IEs are configured within this IE as part of the IE *uplinkConfig*, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1 |
| *powerBoostPi2BPSK*<br>If this field is set to *true*, the UE determines the maximum output power for PUCCH/PUSCH transmissions that use pi/2 BPSK modulation according to TS 38.101-1 [15], clause 6.2.4. |
| *pusch-ServingCellConfig*<br>PUSCH related parameters that are not BWP-specific. |
| *uplinkBWP-ToAddModList*<br>The additional bandwidth parts for uplink to be added or modified. In case of TDD uplink- and downlink BWP with the same *bandwidthPartId* are considered as a BWP pair and must have the same center frequency. |
| *uplinkBWP-ToReleaseList*<br>The additional bandwidth parts for uplink to be released. |
| *uplinkChannelBW-PerSCS-List*<br>A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in *scs-SpecificCarrierList* in *UplinkConfigCommon / UplinkConfigCommonSIB*. Network only configures channel bandwidth that corresponds to the channel bandwidth values defined in TS 38.101-1 [15] and TS 38.101-2 [39]. |

FIG. 32

| Conditional Presence | Explanation |
|---|---|
| AsyncCA | This field is mandatory present for SCells whose slot offset between the SpCell is not 0. Otherwise it is absent, Need S. |
| CORESETPool | This field is optionally present, Need M, if the field lte-CRS-ToMatchAround is not configured and CORESETPoolIndex configured with 1. It is absent otherwise. |
| LTE-CRS | This field is optionally present, Need M, if the field lte-CRS-ToMatchAround is not configured. It is absent otherwise. |
| MeasObject | This field is mandatory present for the SpCell if the UE has a measConfig, and it is optionally present, Need M, for SCells. |
| MultipleNonDormantBWP | The field is mandatory present when the SCell is configured with more than one BWP-DownlinkDedicated with pdcch-Config present, otherwise it is absent. |
| MultipleNonDormantBWP-WUS | The field is mandatory present when the SCell is configured with WUS and with more than one BWP-DownlinkDedicated with pdcch-Config present, otherwise it is absent. |
| SCellOnly | This field is optionally present, Need R, for SCells. It is absent otherwise. |
| ServingCellWithoutPUCCH | This field is optionally present, Need S, for SCells except PUCCH SCells. It is absent otherwise. |
| SyncAndCellAdd | This field is mandatory present for a SpCell upon PCell change and PSCell addition/change and upon RRCSetup/RRCResume. The field is mandatory present for an SCell upon addition. For SpCell, the field is optionally present, Need N, upon reconfiguration without reconfigurationWithSync. In all other cases the field is absent. |
| TDD | This field is optionally present, Need R, for TDD cells. It is absent otherwise. |

FIG. 33

```
-- ASN1START
-- TAG-MEASUREMENTREPORT-START

MeasurementReport ::=                SEQUENCE {
    criticalExtensions               CHOICE {
        measurementReport                MeasurementReport-IEs,
        criticalExtensionsFuture         SEQUENCE {}
    }
}

MeasurementReport-IEs ::=            SEQUENCE {
    measResults                          MeasResults, lateNonCriticalExtension             OCTET STRING
OPTIONAL,
    nonCriticalExtension                 SEQUENCE{}
OPTIONAL
}

-- TAG-MEASUREMENTREPORT-STOP
-- ASN1STOP
```

FIG. 34

| Timer | Start | Stop | At expiry |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with *reconfigurationWithSync* for that cell group, and upon initiating the connection re-establishment procedure.<br>Upon SCG release, if the T310 is kept in SCG. | If the T310 is kept in MCG: If AS security is not activated: go to RRC_IDLE else: initiate the MCG failure information procedure as specified in 5.7.3b or the connection re-establishment procedure as specified in 5.3.7.<br>If the T310 is kept in SCG, Inform E-UTRAN/NR about the SCG radio link failure by initiating the SCG failure information procedure as specified in 5.7.3. |

FIG. 35

| Counter | Reset | Incremented | When reaching max value |
|---|---|---|---|
| N310 | Upon reception of "in-sync" indication from lower layers;<br>upon receiving *RRCReconfiguration* with *reconfigurationWithSync* for that cell group;<br>upon initiating the connection re-establishment procedure. | Upon reception of "out-of-sync" from lower layer while the timer T310 is stopped. | Start timer T310 |
| N311 | Upon reception of "out-of-sync" indication from lower layers;<br>upon receiving *RRCReconfiguration* with *reconfigurationWithSync* for that cell group;<br>upon initiating the connection re-establishment procedure. | Upon reception of the "in-sync" from lower layer while the timer T310 is running. | Stop the timer T310. |

FIG. 36

Intra-gNB case

```
ASN1START
-- TAG-MEASCONFIG-START

MeasConfig ::=                        SEQUENCE {
    measObjectToRemoveList                MeasObjectToRemoveList          OPTIONAL,    -- Need N
    measObjectToAddModList                MeasObjectToAddModList          OPTIONAL,    -- Need N
    reportConfigToRemoveList              ReportConfigToRemoveList        OPTIONAL,    -- Need N
    reportConfigToAddModList              ReportConfigToAddModList        OPTIONAL,    -- Need N
    measIdToRemoveList                    MeasIdToRemoveList              OPTIONAL,    -- Need N
    measIdToAddModList                    MeasIdToAddModList              OPTIONAL,    -- Need N
    s-MeasureConfig                       CHOICE {
        ssb-RSRP                              RSRP-Range,
        csi-RSRP                              RSRP-Range
    }                                                                     OPTIONAL,    -- Need M
    quantityConfig                        QuantityConfig                  OPTIONAL,    -- Need M
    measGapConfig                         MeasGapConfig                   OPTIONAL,    -- Need M
    measGapSharingConfig                  MeasGapSharingConfig            OPTIONAL,    -- Need M
    ...
    s-MeasureBeamConfig                   SEQUENCE {
        ssb-RSRP                              RSRP-Range,
        csi-RSRP                              RSRP-Range,
        ...
    }                                         OPTIONAL
}

MeasObjectToRemoveList ::=            SEQUENCE (SIZE (1..maxNrofObjectId)) OF MeasObjectId MeasIdToRemoveList ::=                SEQUENCE (SIZE (1..maxNrofMeasId)) OF MeasId ReportConfigToRemoveList ::=          SEQUENCE (SIZE (1..maxReportConfigId)) OF ReportConfigId

-- TAG-MEASCONFIG-STOP
-- ASN1STOP
```

FIG. 58

| MeasConfig field descriptions |
|---|
| *measGapConfig* |
| Used to setup and release measurement gaps in NR. |
| *measIdToAddModList* |
| List of measurement identities to add and/or modify. |
| *measIdToRemoveList* |
| List of measurement identities to remove. |
| *measObjectToAddModList* |
| List of measurement objects to add and/or modify. |
| *measObjectToRemoveList* |
| List of measurement objects to remove. |
| *reportConfigToAddModList* |
| List of measurement reporting configurations to add and/or modify. |
| *reportConfigToRemoveList* |
| List of measurement reporting configurations to remove. |
| *s-MeasureConfig* |
| Threshold for NR SpCell RSRP measurement controlling when the UE is required to perform measurements on non-serving cells. Choice of *ssb-RSRP* corresponds to cell RSRP based on SS/PBCH block and choice of *csi-RSRP* corresponds to cell RSRP of CSI-RS. |
| *measGapSharingConfig* |
| Specifies the measurement gap sharing scheme and controls setup/ release of measurement gap sharing. |
| *s-MeasureBeamConfig* |
| Threshold for NR SS/PBCH RSSP and NR CSI-RS RSRP measurement controlling when the UE is required to perform measurements on non-serving SS/PBCH beam or non-serving CSI-RS beam. The value *ssb-RSRP* corresponds to RSRP based on the SS/PBCH beam and the value of *csi-RSRP* corresponds to RSRP of the CSI-RS beam. |

FIG. 59

```
-- ASN1START
-- TAG-MEASRESULTS-START

MeasResults ::=                         SEQUENCE {
    measId                              MeasId,
    measResultServingMOList             MeasResultServMOList,
    measResultNeighCells                CHOICE {
        measResultListNR                    MeasResultListNR,
        ...,
        measResultListEUTRA                 MeasResultListEUTRA,
        measResultListUTRA-FDD-r16          MeasResultListUTRA-FDD-r16 }   OPTIONAL,
    ...,
    [[
    measResultServFreqListEUTRA-SCG     MeasResultServFreqListEUTRA-SCG     OPTIONAL,
    measResultServFreqListNR-SCG        MeasResultServFreqListNR-SCG        OPTIONAL,
    measResultSFTD-EUTRA                MeasResultSFTD-EUTRA                OPTIONAL,
    measResultSFTD-NR                   MeasResultCellSFTD-NR               OPTIONAL
    ]],
    [[
    measResultCellListSFTD-NR           MeasResultCellListSFTD-NR           OPTIONAL
    ]],
    [[
    measResultForRSSI-r16               MeasResultForRSSI-r16               OPTIONAL,
    locationInfo-r16                    LocationInfo-r16                    OPTIONAL,
    ul-PDCP-DelayValueResultList-r16    UL-PDCP-DelayValueResultList-r16    OPTIONAL,
    measResultsSL-r16                   MeasResultsSL-r16                   OPTIONAL,
    measResultCLI-r16                   MeasResultCLI-r16                   OPTIONAL
    ]],
    [[
    measResultServSSBBeam               MeasResultSSBBeam       OPTIONAL,
    measResultServCSIRSBeam             MeasResultCSIRSBeam     OPTIONAL,
    measResultNeighSSBBeams             MeasResultSSBBeamList   OPTIONAL,
    ...,
    ]],
}

MeasResultSSBBeamList ::=   SEQUENCE (SIZE (1.. maxReportSSBBeam)) OF MeasResultSSBBeam MeasResultSSBBeam ::=   SEQUENCE {
    physCellId      PhysCellId                  OPTIONAL,
    resultsSSB-Beam         SEQUENCE {
        ssb-Index       SSB-Index,
        ssb-Results     MeasQuantityResults,
        ...
        }                   OPTIONAL
    },
    ...,
}

MeasResultCSIRSBeam ::= SEQUENCE {
    physCellId      PhysCellId                  OPTIONAL,
    resultsCSIRS-Beam       SEQUENCE {
        csi-RS-Index    CSI-RS-Index,
        csi-RS-Results  MeasQuantityResults,
        ...
        }                   OPTIONAL
    },
    ...,
}
...,
}
```

FIG. 60

```
MeasResultServMOList ::=                SEQUENCE (SIZE (1..maxNrofServingCells)) OF
MeasResultServMO MeasResultServMO ::=                    SEQUENCE {
    servCellId                              ServCellIndex,
    measResultServingCell                   MeasResultNR,
    measResultBestNeighCell                 MeasResultNR                OPTIONAL,
    ...
}

MeasResultListNR ::=                    SEQUENCE (SIZE (1..maxCellReport)) OF MeasResultNR MeasResultNR ::=                        SEQUENCE {
    physCellId                              PhysCellId                  OPTIONAL,
    measResult                              SEQUENCE {
        cellResults                             SEQUENCE{
            resultsSSB-Cell                         MeasQuantityResults     OPTIONAL,
            resultsCSI-RS-Cell                      MeasQuantityResults     OPTIONAL
        },
        rsIndexResults                          SEQUENCE{
            resultsSSB-Indexes                      ResultsPerSSB-IndexList     OPTIONAL,
            resultsCSI-RS-Indexes                   ResultsPerCSI-RS-IndexList  OPTIONAL
        }                   OPTIONAL
    },
    ...,
    [[
    cgi-Info                                CGI-InfoNR                  OPTIONAL
    ]]
}

MeasResultListEUTRA ::=                 SEQUENCE (SIZE (1..maxCellReport)) OF MeasResultEUTRA MeasResultEUTRA ::=                     SEQUENCE {
    eutra-PhysCellId                        PhysCellId,
    measResult                              MeasQuantityResultsEUTRA, cgi-Info                                CGI-InfoEUTRA               OPTIONAL,
    ...
}

MultiBandInfoListEUTRA ::=              SEQUENCE (SIZE (1..maxMultiBands)) OF
FreqBandIndicatorEUTRA MeasQuantityResults ::=                 SEQUENCE {
    rsrp                                    RSRP-Range      OPTIONAL,
    rsrq                                    RSRQ-Range      OPTIONAL,
    sinr                                    SINR-Range      OPTIONAL
}

MeasQuantityResultsEUTRA ::=            SEQUENCE {
    rsrp                                    RSRP-RangeEUTRA         OPTIONAL,
    rsrq                                    RSRQ-RangeEUTRA         OPTIONAL,
    sinr                                    SINR-RangeEUTRA         OPTIONAL
}

ResultsPerSSB-IndexList::=              SEQUENCE (SIZE (1..maxNrofIndexesToReport2)) OF
ResultsPerSSB-Index ResultsPerSSB-Index ::=                 SEQUENCE {
    ssb-Index                               SSB-Index,
    ssb-Results                             MeasQuantityResults     OPTIONAL
}

ResultsPerCSI-RS-IndexList::=           SEQUENCE (SIZE (1..maxNrofIndexesToReport2)) OF
ResultsPerCSI-RS-Index ResultsPerCSI-RS-Index ::=              SEQUENCE {
    csi-RS-Index                            CSI-RS-Index,
    csi-RS-Results                          MeasQuantityResults     OPTIONAL
}
```

FIG. 60 (Cont.)

| MeasResultNR field descriptions |
|---|
| *averageDelay* <br> Indicates average delay for the packets during the reporting period, as specified in TS 38.314 [53]. Value 0 corresponds to 0 millisecond, value 1 corresponds to 0.1 millisecond, value 2 corresponds to 0.2 millisecond, and so on. |
| *cellResults* <br> Cell level measurement results. |
| *drb-Id* <br> Indicates DRB value for which uplink PDCP delay ratio or value is provided, according to TS 38.314 [53]. |
| *excessDelay* <br> Indicates excess queueing delay ratio in UL, according to excess delay ratio measurement report mapping table, as defined in TS 38.314 [53], Table 4.2.1.1.1-1. |
| *locationInfo* <br> Positioning related information and measurements. |
| *physCellId* <br> The physical cell identity of the NR cell for which the reporting is being performed. |
| *resultsSSB-Cell* <br> Cell level measurement results based on SS/PBCH related measurements. |
| *resultsSSB-Indexes* <br> Beam level measurement results based on SS/PBCH related measurements. |
| *resultsCSI-RS-Cell* <br> Cell level measurement results based on CSI-RS related measurements. |
| *resultsCSI-RS-Indexes* <br> Beam level measurement results based on CSI-RS related measurements. |
| *rsIndexResults* <br> Beam level measurement results. |

FIG. 61

| MeasResults field descriptions |
|---|
| *measId* |
| Identifies the measurement identity for which the reporting is being performed. |
| *measResultCellListSFTD-NR* |
| SFTD measurement results between the PCell and the NR neighbour cell(s) in NR standalone. |
| *measResultCLI* |
| CLI measurement results. |
| *measResultEUTRA* |
| Measured results of an E-UTRA cell. |
| *measResultForRSSI* |
| Includes measured RSSI result in dBm (see TS 38.215 [9]) and *channelOccupancy* which is the percentage of samples when the RSSI was above the configured *channelOccupancyThreshold* for the associated *reportConfig*. |
| *measResultListEUTRA* |
| List of measured results for the maximum number of reported best cells for an E-UTRA measurement identity. |
| *measResultListNR* |
| List of measured results for the maximum number of reported best cells for an NR measurement identity. |
| *measResultListUTRA-FDD* |
| List of measured results for the maximum number of reported best cells for a UTRA-FDD measurement identity. |
| *measResultNR* |
| Measured results of an NR cell. |
| *measResultServFreqListEUTRA-SCG* |
| Measured results of the E-UTRA SCG serving frequencies: the measurement result of PSCell and each SCell, if any, and of the best neighbouring cell on each E-UTRA SCG serving frequency. |
| *measResultServFreqListNR-SCG* |
| Measured results of the NR SCG serving frequencies: the measurement result of PSCell and each SCell, if any, and of the best neighbouring cell on each NR SCG serving frequency. |
| *measResultServingMOList* |
| Measured results of measured cells with reference signals indicated in the serving cell measurement objects including measurement results of SpCell, configured SCell(s) and best neighbouring cell within measured cells with reference signals indicated in on each serving cell measurement object. |
| *measResultSFTD-EUTRA* |
| SFTD measurement results between the PCell and the E-UTRA PScell in NE-DC. |
| *measResultSFTD-NR* |
| SFTD measurement results between the PCell and the NR PScell in NR-DC. |
| *measResultUTRA-FDD* |
| Measured result of a UTRA-FDD cell. |

FIG. 62

| MeasResultSSBBeam field descriptions |
|---|
| *physCellId* |
| The physical cell identity of the NR cell for which the reporting is being performed. |
| *resultsSSB-Beam* |
| Beam level measurement results based on SS/PBCH related measurements. |

FIG. 63

| MeasResultCSIRSBeam field descriptions |
|---|
| *physCellId* |
| The physical cell identity of the NR cell for which the reporting is being performed. |
| *resultsCSI-RS-Beam* |
| Beam level measurement results based on CSI-RS related measurements. |

FIG. 64

```
-- ASN1START
-- TAG-REPORTCONFIGNR-START

ReportConfigNR ::=                          SEQUENCE {
    reportType                                  CHOICE {
        periodical                                  PeriodicalReportConfig,
        eventTriggered                              EventTriggerConfig,
        ...,
        reportCGI                                   ReportCGI,
        reportSFTD                                  ReportSFTD-NR,
        condTriggerConfig-r16                       CondTriggerConfig-r16,
        cli-Periodical-r16                          CLI-PeriodicalReportConfig-r16,
        cli-EventTriggered-r16                      CLI-EventTriggerConfig-r16
        crossBeam-EventTriggered-r17                CrossBeam-EventTriggerConfig-r17,
    }
}

ReportCGI ::=                       SEQUENCE {
    cellForWhichToReportCGI             PhysCellId,
    ...,
    [[
    useAutonomousGaps-r16           ENUMERATED {setup}              OPTIONAL    -- Need R
    ]]
}

ReportSFTD-NR ::=                   SEQUENCE {
    reportSFTD-Meas                     BOOLEAN,
    reportRSRP                          BOOLEAN,
    ...,
    [[
    reportSFTD-NeighMeas                ENUMERATED {true}       OPTIONAL,   -- Need R
    drx-SFTD-NeighMeas                  ENUMERATED {true}       OPTIONAL,   -- Need R
    cellsForWhichToReportSFTD SEQUENCE (SIZE (1..maxCellSFTD)) OF PhysCellId    OPTIONAL -- Need R
    ]]
}

CondTriggerConfig-r16 ::=   SEQUENCE {
    condEventId                 CHOICE {
        condEventA3                 SEQUENCE {
            a3-Offset                   MeasTriggerQuantityOffset,
            hysteresis                  Hysteresis,
            timeToTrigger               TimeToTrigger
        },
        condEventA5                 SEQUENCE {
            a5-Threshold1               MeasTriggerQuantity,
            a5-Threshold2               MeasTriggerQuantity,
            hysteresis                  Hysteresis,
            timeToTrigger               TimeToTrigger
        },
        ...
    },
    rsType-r16                  NR-RS-Type,
    ...
}
```

FIG. 65

```
EventTriggerConfig::=                   SEQUENCE {
    eventId                             CHOICE {
        eventA1                             SEQUENCE {
            a1-Threshold                        MeasTriggerQuantity,
            reportOnLeave                       BOOLEAN,
            hysteresis                          Hysteresis,
            timeToTrigger                       TimeToTrigger
        },
        eventA2                             SEQUENCE {
            a2-Threshold                        MeasTriggerQuantity,
            reportOnLeave                       BOOLEAN,
            hysteresis                          Hysteresis,
            timeToTrigger                       TimeToTrigger
        },
        eventA3                             SEQUENCE {
            a3-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
        },
        eventA4                             SEQUENCE {
            a4-Threshold                        MeasTriggerQuantity,
            reportOnLeave                       BOOLEAN,
            hysteresis                          Hysteresis,
            timeToTrigger                       TimeToTrigger,
            useWhiteCellList                    BOOLEAN
        },
        eventA5                             SEQUENCE {
            a5-Threshold1                       MeasTriggerQuantity,
            a5-Threshold2                       MeasTriggerQuantity,
            reportOnLeave                       BOOLEAN,
            hysteresis                          Hysteresis,
            timeToTrigger                       TimeToTrigger,
            useWhiteCellList                    BOOLEAN
        },
        eventA6                             SEQUENCE {
            a6-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
        },
        ...
    }, rsType                              NR-RS-Type, reportInterval                      ReportInterval,
    reportAmount                ENUMERATED {r1, r2, r4, r8, r16, r32, r64, infinity}, reportQuantityCell          MeasReportQuantity,
    maxReportCells              INTEGER (1..maxCellReport), reportQuantityRS-Indexes    MeasReportQuantity                      OPTIONAL,   -- Need R
    maxNrofRS-IndexesToReport   INTEGER (1..maxNrofIndexesToReport)     OPTIONAL,   -- Need R
    includeBeamMeasurements     BOOLEAN,
    reportAddNeighMeas          ENUMERATED {setup}                      OPTIONAL,   -- Need R
    ...,
    [[
    measRSSI-ReportConfig-r16   MeasRSSI-ReportConfig-r16               OPTIONAL,   -- Need R
    useT312-r16                 BOOLEAN                                 OPTIONAL,   -- Need M
    includeCommonLocationInfo-r16 ENUMERATED {true}                     OPTIONAL,   -- Need R
    includeBT-Meas-r16          BT-NameListConfig-                      OPTIONAL,   -- Need R
    includeWLAN-Meas-r16        WLAN-NameListConfig-r16                 OPTIONAL,   -- Need R
    includeSensor-Meas-r16      Sensor-NameListConfig-r16               OPTIONAL    -- Need R
    ]]
}
```

FIG. 65 (Cont. 1)

```
PeriodicalReportConfig ::=              SEQUENCE {
   rsType                               NR-RS-Type, reportInterval                       ReportInterval,
   reportAmount                         ENUMERATED {r1, r2, r4, r8, r16, r32, r64,
infinity}, reportQuantityCell                   MeasReportQuantity,
   maxReportCells                       INTEGER (1..maxCellReport), reportQuantityRS-Indexes    MeasReportQuantity                OPTIONAL,   -- Need R
   maxNrofRS-IndexesToReport   INTEGER (1..maxNrofIndexesToReport) OPTIONAL, -- Need R
   includeBeamMeasurements              BOOLEAN,
   useWhiteCellList                     BOOLEAN,
   ...,
   [[
   measRSSI-ReportConfig-r16    MeasRSSI-ReportConfig-r16         OPTIONAL,   -- Need R
   includeCommonLocationInfo-r16 ENUMERATED {true}                OPTIONAL,   -- Need R
   includeBT-Meas-r16           BT-NameListConfig-r16             OPTIONAL,   -- Need R
   includeWLAN-Meas-r16         WLAN-NameListConfig-r16           OPTIONAL,   -- Need R
   includeSensor-Meas-r16       Sensor-NameListConfig-r16         OPTIONAL,   -- Need R
   ul-DelayValueConfig-r16   SetupRelease { UL-DelayValueConfig-r16 } OPTIONAL -- Need R
   ]]

}

NR-RS-Type ::=                          ENUMERATED {ssb, csi-rs}

MeasTriggerQuantity ::=                 CHOICE {
   rsrp                                     RSRP-Range,
   rsrq                                     RSRQ-Range,
   sinr                                     SINR-Range
}

MeasTriggerQuantityOffset ::=           CHOICE {
   rsrp                                     INTEGER (-30..30),
   rsrq                                     INTEGER (-30..30),
   sinr                                     INTEGER (-30..30)
}

MeasReportQuantity ::=                  SEQUENCE {
   rsrp                                     BOOLEAN,
   rsrq                                     BOOLEAN,
   sinr                                     BOOLEAN
}

MeasRSSI-ReportConfig-r16 ::=           SEQUENCE {
   channelOccupancyThreshold-r16            INTEGER (1..ffsValue)      OPTIONAL,   -- Need
R
   ...
}

CLI-EventTriggerConfig-r16 ::=          SEQUENCE {
   eventId-r16                          CHOICE {
      eventI1-r16                           SEQUENCE {
         i1-Threshold-r16                      MeasTriggerQuantityCLI-r16,
         reportOnLeave-r16                     BOOLEAN,
         hysteresis-r16                        Hysteresis,
         timeToTrigger-r16                     TimeToTrigger
      },
      ...
   },
   reportInterval-r16                   ReportInterval,
   reportAmount-r16                     ENUMERATED {r1, r2, r4, r8, r16, r32, r64,
infinity},
   maxReportCLI-r16                     INTEGER (1..maxCLI-Report-r16),
   ...
}
```

FIG. 65 (Cont. 2)

```
CLI-PeriodicalReportConfig-r16 ::=      SEQUENCE {
    reportInterval-r16                      ReportInterval,
    reportAmount r16                        ENUMERATED {r1, r2, r4, r8, r16, r32, r64,
infinity},
    reportQuantityCLI-r16                   MeasReportQuantityCLI-r16,
    maxReportCLI-r16                        INTEGER (1..maxCLI-Report-r16),
    ...
}

MeasTriggerQuantityCLI-r16 ::=          CHOICE {
    srs-RSRP-r16                            SRS-RSRP-Range-r16,
    cli-RSSI-r16                            CLI-RSSI-Range-r16
}

MeasReportQuantityCLI-r16 ::=           ENUMERATED {srs-rsrp, cli-rssi}

CrossBeam-EventTriggerConfig-r17::=     SEQUENCE {
    eventId                                 CHOICE {
        eventF1                                 SEQUENCE {
            f1-Threshold1                           MeasTriggerQuantity,
            f1-Threshold2                           MeasTriggerQuantity,
            reportOnLeave                           BOOLEAN,
            hysteresis                              Hysteresis,
            timeToTrigger                           TimeToTrigger,
            ...
        },
        eventF2                                 SEQUENCE {
            f2-Threshold1                           MeasTriggerQuantity,
            f2-Threshold2                           MeasTriggerQuantity,
            reportOnLeave                           BOOLEAN,
            hysteresis1                             Hysteresis,
            hysteresis2                             Hysteresis,
            timeToTrigger                           TimeToTrigger,
            ...
        },
        eventF3                                 SEQUENCE {
            f3-Threshold                            MeasTriggerQuantity,
            f3-Offset                               MeasTriggerQuantityOffset,
            reportOnLeave                           BOOLEAN,
            hysteresis1                             Hysteresis,
            hysteresis2                             Hysteresis,
            timeToTrigger                           TimeToTrigger,
            ...
        },
        eventF4                                 SEQUENCE {
            f4-Offset                               MeasTriggerQuantityOffset,
            reportOnLeave                           BOOLEAN,
            hysteresis                              Hysteresis,
            timeToTrigger                           TimeToTrigger,
            ...
        },
        eventF5                                 SEQUENCE {
            f5-Offset1                              MeasTriggerQuantityOffset,
            f5-Offset2                              MeasTriggerQuantityOffset,
            reportOnLeave                           BOOLEAN,
            hysteresis1                             Hysteresis,
            hysteresis2                             Hysteresis,
            timeToTrigger                           TimeToTrigger,
            ...
        },
```

FIG. 65 (Cont. 3)

```
eventF6                               SEQUENCE {
        f6-Threshold1                         MeasTriggerQuantity,
        f6-Threshold2                         MeasTriggerQuantity,
        reportOnLeave                         BOOLEAN,
        hysteresis1                           Hysteresis,
        hysteresis2                           Hysteresis,
        timeToTrigger                         TimeToTrigger,
        ...
    },
    eventF7                               SEQUENCE {
        f7-Threshold1                         MeasTriggerQuantity,
        f7-Threshold2                         MeasTriggerQuantity,
        f7-Threshold3                         MeasTriggerQuantity,
        reportOnLeave                         BOOLEAN,
        hysteresis1                           Hysteresis,
        hysteresis2                           Hysteresis,
        hysteresis3                           Hysteresis,
        timeToTrigger                         TimeToTrigger,
        ...
    },

...
}, rsType-r17               NR-RS-Type-r17,
reportInterval           ReportInterval,
reportAmount             ENUMERATED {r1, r2, r4, r8, r16, r32, r64, infinity},
reportQuantityBeam       MeasReportQuantity,
maxReportSSBBeam         INTEGER (1..maxNrofSSBs-1),
reportQuantityRS-Indexes    MeasReportQuantity                          OPTIONAL,    -- Need R
maxNrofSSB-RS-IndexesToReport  INTEGER (1..maxNrofSSBIndexesToReport)  OPTIONAL,    -- Need R
maxNrofCSI-RS-IndexesToReport  INTEGER (1..maxNrofCSIIndexesToReport)  OPTIONAL,    -- Need R
reportAddNeighSSBMeas    ENUMERATED {setup}                             OPTIONAL     -- Need R
useT312-r16              BOOLEAN                                        OPTIONAL,    -- Need M

}

NR-RS-Type-r17 ::=       ENUMERATED {ssb, csi-rs, ssb-and-csi-rs,...}

-- TAG-REPORTCONFIGNR-STOP
-- ASN1STOP
```

FIG. 65 (Cont. 4)

| CrossBeam-EventTriggeredConfig field descriptions |
|---|
| *f3-Offset/f4-Offset/f5-Offset1/f5-Offset2*<br>Offset value(s) to be used in NR measurement report triggering condition for event f3/f4/f5. The actual value is field value * 0.5 dB. |
| *fN-ThresholdM*<br>Threshold value associated to the selected trigger quantity (e.g. RSRP, RSRQ, SINR) per RS Type (e.g. SS/PBCH block, CSI-RS) to be used in NR measurement report triggering condition for event number fN. If multiple thresholds are defined for event number fN, the thresholds are differentiated by M. The network configures fN-Threshold1 for events F1, F2, F6, F7, fN-Threshold2 for events F1, F2, F6, F7, f7-Threshold3 for event F7 and f3-Threshold for event F3. |
| *eventId*<br>Choice of NR event triggered reporting criteria. |
| *maxNrofSSB-RS-IndexesToReport*<br>Max number of SSB RS indexes to include in the measurement report for *fN* events. |
| *maxNrofCSI-RS-IndexesToReport*<br>Max number of CSI RS indexes to include in the measurement report for *fN* events. |
| *maxReportSSBBeam*<br>Max number of non-serving SSB beam to include in the measurement report. |
| *reportAddNeighSSBMeas*<br>Indicates that the UE shall include the best neighbour SS/PBCH block per serving frequency. |
| *reportAmount*<br>*Number* of measurement reports applicable for *eventTriggered*. |
| *reportOnLeave*<br>Indicates whether or not the UE shall initiate the measurement reporting procedure when the leaving condition is met for a SS/PBCH block Index whose SS/PBCH Index is in *beamsTriggeredList*, or a CSI-RS beam whose CSI-RS Index is in *beamsTriggeredList*, as specified in 5.5.4.1. |
| *reportQuantityBeam*<br>The beam measurement quantities to be included in the measurement report. |
| *reportQuantityRS-Indexes*<br>Indicates which measurement information per RS index the UE shall include in the measurement report. |
| *timeToTrigger*<br>Time during which specific criteria for the event needs to be met in order to trigger a measurement report. |
| *useT312*<br>If value *TRUE* is configured, the UE shall use the timer T312 with the value *t312* as specified in the corresponding *measObjectNR*. If value FALSE is configured, the timer T312 is considered as disabled. Network configures value *TRUE* only if *reportType* is set to *eventTriggered*. |

FIG. 66

```
maxNrofIndexesToReport           INTEGER ::= 32
maxNrofIndexesToReport2          INTEGER ::= 64
maxNrofSSBIndexesToReport        INTEGER ::= 32
maxNrofCSIRSIndexesToReport         INTEGER ::= 32
```

FIG. 67

```
-- ASN1START
-- NR-UE-VARIABLES-START

NR-UE-Variables DEFINITIONS AUTOMATIC TAGS ::=

BEGIN

IMPORTS
    ARFCN-ValueNR,
    CellIdentity,
    EUTRA-PhysCellId,
    MeasId,
    MeasIdToAddModList,
    MeasIdleCarrierEUTRA-r16,
    MeasIdleCarrierNR-r16,
    MeasResultIdleEUTRA-r16,
    MeasResultIdleNR-r16,
    MeasObjectToAddModList,
    PhysCellId,
    RNTI-Value,
    ReportConfigToAddModList,
    RSRP-Range,
    SL-MeasId-r16,
    SL-MeasIdList-r16,
    SL-MeasObjectList-r16,
    SL-ReportConfigList-r16,
    SL-QuantityConfig-r16,
    Tx-PoolMeasToAddModListEUTRA-r16,
    Tx-PoolMeasList-r16,
    QuantityConfig,
    maxNrofCellMeas,
    maxNrofMeasId,
    maxFreqIdle-r16,    PhysCellIdUTRA-FDD-r16,
    ValidityAreaList-r16,
    CondConfigToAddModList-r16,
    ConnEstFailReport-r16,
    LoggingDuration-r16,
    LoggingInterval-r16,
    LogMeasInfoList-r16,
    LogMeasInfo-r16,
    RA-Report-r16,
    RLF-Report-r16,
    TraceReference-r16,
    WLAN-Identifiers-r16,
    WLAN-NameList-r16,
    BT-NameList-r16,
    PLMN-Identity,
    maxPLMN,
    RA-ReportList-r16,
    VisitedCellInfoList-r16,
    AbsoluteTimeInfo-r16,
    LoggedEventTriggerConfig-r16,
    LoggedPeriodicalReportConfig-r16,
    Sensor-NameListConfig-r16,
    WLAN-NameListConfig-r16,
    BT-NameListConfig-r16,
    PLMN-IdentityList3-r16,
    AreaConfiguration-r16,
    maxNrofSL-MeasId-r16,
    maxNrofFreqSL-r16,
    maxNrofCLI-RSSI-Resources-r16,
    maxNrofSRS-Resources-r16,
    RSSI-ResourceId-r16,
    SRS-ResourceId,
    maxNrofBeamMeas, FROM NR-RRC-Definitions;

-- NR-UE-VARIABLES-STOP
-- ASN1STOP
```

FIG. 68

```
-- ASN1START
-- TAG-VARMEASCONFIG-START

VarMeasConfig ::=                   SEQUENCE {
    -- Measurement identities
    measIdList                      MeasIdToAddModList          OPTIONAL,
    -- Measurement objects
    measObjectList                  MeasObjectToAddModList          OPTIONAL,
    -- Reporting configurations
    reportConfigList                ReportConfigToAddModList        OPTIONAL,
    -- Other parameters
    quantityConfig                  QuantityConfig                  OPTIONAL, s-MeasureConfig                     CHOICE {
        ssb-RSRP                            RSRP-Range,
        csi-RSRP                            RSRP-Range
    }                                                               OPTIONAL,
    s-MeasureBeamConfig             SEQUENCE {
        ssb-RSRP                            RSRP-Range,
        csi-RSRP                            RSRP-Range,
        ...
    }                               OPTIONAL

}

-- TAG-VARMEASCONFIG-STOP
-- ASN1STOP
```

FIG. 69

```
-- ASN1START
-- TAG-VARMEASREPORTLIST-START

VarMeasReportList ::=              SEQUENCE (SIZE (1..maxNrofMeasId)) OF VarMeasReport VarMeasReport ::=                  SEQUENCE {
    -- List of measurement that have been triggered
    measId                             MeasId,
    cellsTriggeredList                 CellsTriggeredList              OPTIONAL,
    numberOfReportsSent                INTEGER,
    cli-TriggeredList-r16              CLI-TriggeredList-r16           OPTIONAL,
    poolsTriggeredList-r16             CHOICE {
        tx-PoolMeasToAddModListEUTRA-r16    Tx-PoolMeasToAddModListEUTRA-r16,
        tx-PoolMeasToAddModListNR-r16       Tx-PoolMeasList-r16
    }                                                                  OPTIONAL,
    beamsTriggeredList                 BeamsTriggeredList              OPTIONAL
}

CellsTriggeredList ::=             SEQUENCE (SIZE (1..maxNrofCellMeas)) OF CHOICE {
    physCellId                         PhysCellId,
    physCellIdEUTRA                    EUTRA-PhysCellId,
    physCellIdUTRA-FDD-r16             PhysCellIdUTRA-FDD-r16
    }

CLI-TriggeredList-r16 ::=          CHOICE {
    srs-RSRP-TriggeredList-r16         SRS-RSRP-TriggeredList-r16,
    cli-RSSI-TriggeredList-r16         CLI-RSSI-TriggeredList-r16
    }

SRS-RSRP-TriggeredList-r16 ::=     SEQUENCE (SIZE (1.. maxNrofSRS-Resources-r16)) OF SRS-
ResourceId CLI-RSSI-TriggeredList-r16 ::=     SEQUENCE (SIZE (1.. maxNrofCLI-RSSI-Resources-r16)) OF RSSI-
ResourceId-r16

BeamsTriggeredList ::=             SEQUENCE (SIZE (1..maxNrofBeamMeas)) {
    beamSSBId                          SSB-Index,
    beamCSIRSId                        CSI-RS-Index,
    } maxNrofBeamMeas INTEGER ::= 32     -- Maximum number of entries in each of the beam lists in a
measurement

-- TAG-VARMEASREPORTLIST-STOP
-- ASN1STOP
```

FIG. 70

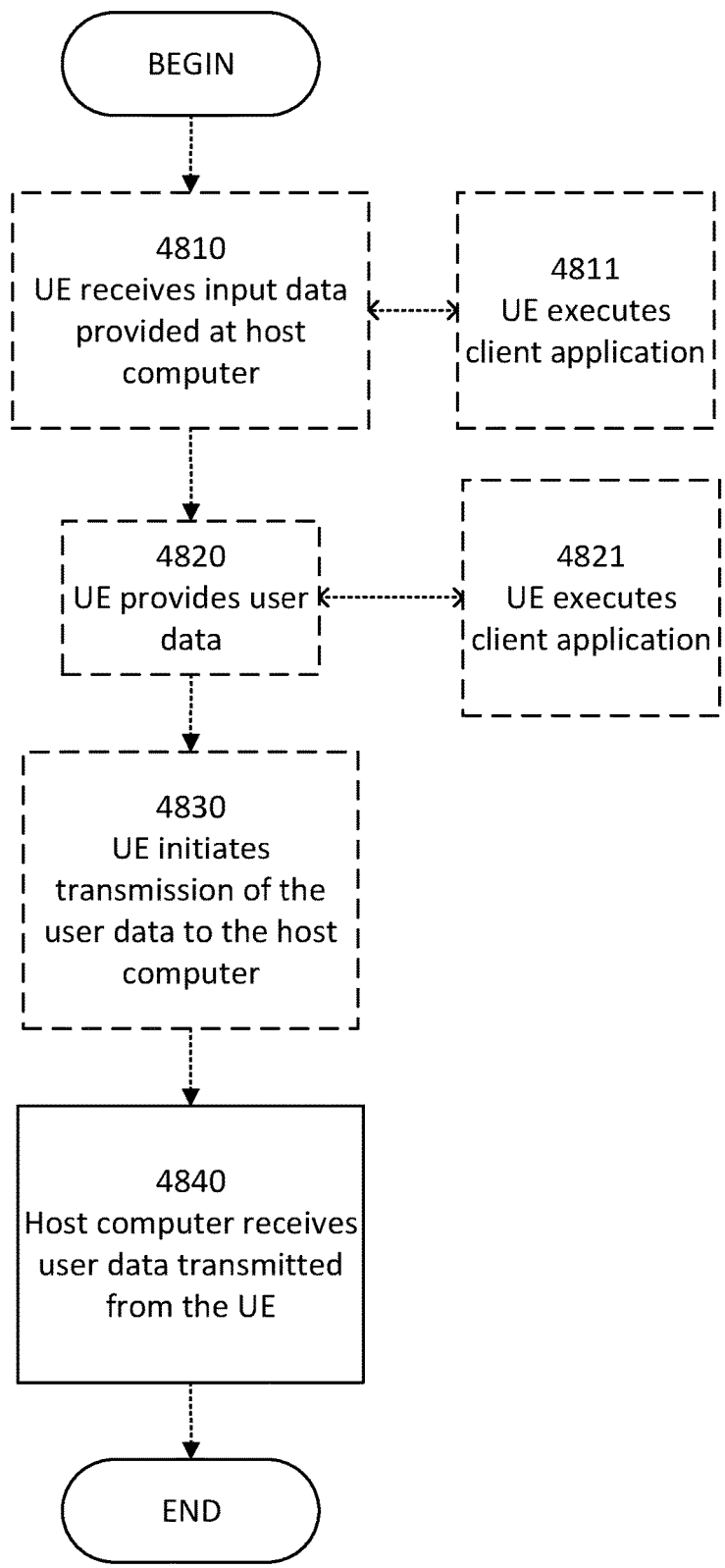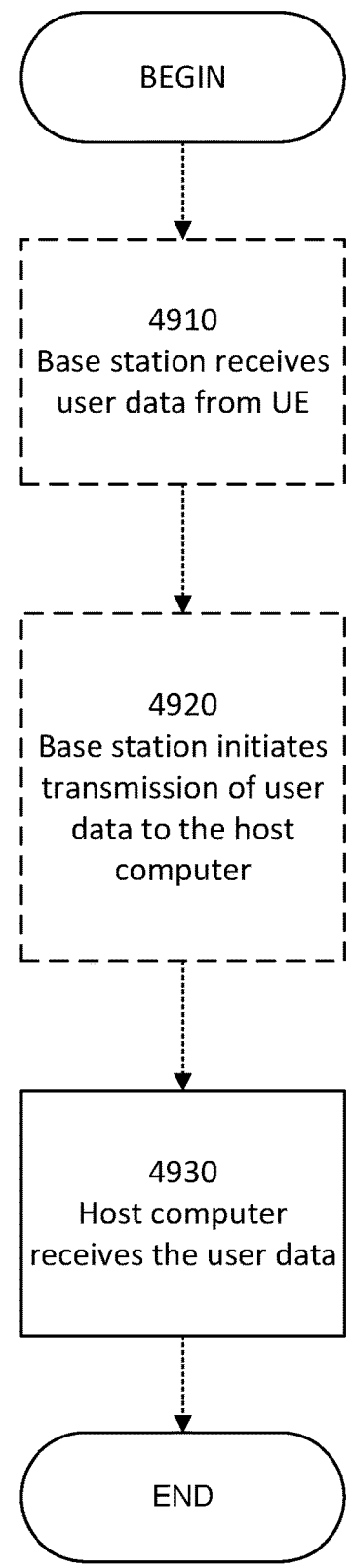
FIG. 78
FIG. 79

CONFIGURING AND/OR DETECTING MEASUREMENT REPORT TRIGGERING EVENTS BASED ON UNBALANCED REFERENCE SIGNALS AND RELATED COMMUNICATION DEVICES AND NETWORK NODES

CROSS REFERENCE TO RELATED APPLICATIONS

This application is a 35 U.S.C. § 371 national stage application of PCT International Application No. PCT/SE2021/050771 filed on Aug. 4, 2021, which in turn claims domestic priority to U.S. Provisional Patent Application No. 63/062,223 filed on Aug. 6, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

FIG. 1 illustrates an example of a 5th Generation ("5G") network (also referred to as a new radio ("NR") network) including a network node 102 (e.g., a 5G base station ("gNB")), multiple communication devices 104 (also referred to as user equipment ("UE")), and a neighbor network node 106. In this example, some of the communication devices 104 are within a coverage area 112 of network node 102, some of the communication devices 104 are within a coverage area 116 of neighbor network node 106, and some of the communication devices 104 are within both coverage area 112 and coverage area 116.

FIG. 2 illustrates an example of a next generation ("NG") (also referred to as NR) system architecture. The NG-radio access network ("RAN") node 210 includes of a set of gNBs 220, 230 connected to the 5G core ("5GC") network through a NG interface. Each of the gNB 220, 230 can support frequency division duplexing ("FDD") mode, time division duplexing ("TDD") mode or dual mode operation. Each of the gNBs 220, 230 can be interconnected through a Xn interface. Each of the gNBs 220, 230 can include a gNB-CU 222, 232 and gNB-distributed units ("DUs") 224a-b, 232a-b. Each of the gNB-CU 222, 232 can be connected with gNB-DU 224a-b, 234a-b of their respective gNB 220, 230 by a F1 logical interface. In this example, each gNB-DU 224a-b, 234a-b is connected to only one gNB-CU 222, 232. For resiliency, a gNB-DU 224a-b, 234a-b may be connected to multiple gNB-CU by appropriate implementation. The NG, Xn, and F1 interfaces can be logical interfaces. The NG-RAN node can be layered into a radio network layer ("RNL") and a transport network layer ("TNL"). The NG-RAN architecture (e.g., the NG-RAN logical nodes and interfaces between them) can be part of the RNL. For each NG-RAN interface (NG, Xn, F1) the related TNL protocol and the functionality can be specified. The TNL can provide services for user plane transport and signaling transport.

A gNB may also be connected to a long term evolution ("LTE") base station ("eNB") via an X2 interface. Another architectural option is that where an LTE eNB connected to the Evolved Packet Core network is connected over the X2 interface with a so called nr-gNB, the latter is a gNB not connected directly to a CN and connected via X2 to an eNB for the sole purpose of performing dual connectivity.

The architecture in FIG. 2 can be expanded by spitting one or more of the gNB-CUs 222, 232 into two entities. One gNB-CU-user plane ("UP"), which serves the user plane and hosts the packet data convergence protocol ("PDCP") and one gNB-CU-control plane ("CP"), which serves the control plane and hosts the PDCP and radio resource control ("RRC") protocol. A gNB-DU can host the radio link control ("RLC")/media access control ("MAC")/physical layer ("PHY") protocols.

SUMMARY

According to some embodiments of inventive concepts, a method of operating a communication device in a wireless communication network is provided. A measurement report triggering event is detected based on a measurement of a first reference signal received by the communication device and based on a measurement of a second reference signal received by the communication device, wherein the first and second reference signals are different. A measurement report is transmitted to the wireless communication network responsive to detecting the measurement report triggering event. The measurement report includes at least one of the measurement of the first reference signal and/or the measurement of the second reference signal.

According to some other embodiments of inventive concepts, a method of operating a network node is provided. A measurement configuration is transmitted over a radio interface to a communication device. The measurement configuration defines a measurement report triggering event based on a measurement of a first reference signal received by the communication device and based on a measurement of a second reference signal received by the communication device, and the first and second reference signals are different. A measurement report is received from the communication device including at least one of the measurement of the first reference signal and/or the measurement of the second reference signal. The measurement report is provided by the communication device based on the measurement configuration.

According to some embodiments, by detecting measurement report triggering events based on multiple reference signals (e.g., based on a channel state information reference signal and based on a synchronization signal block reference signal), improved reporting of one or both of the reference signals from a wireless communication device may be provided. Such reporting, for example, may be used at the network to detect one or more of: areas of sub-optimal coverage of CSI-RS beams compared to SSB beams; areas on downlink interference; areas of coverage imbalance; and/or areas with potentially high uplink interference.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a diagram illustrating an example of a synchronization signal block ("SSB")-index information element ("IE");

FIG. 4 is a diagram illustrating an example of a SSB-machine type communication ("MTC") IE;

FIG. 5 is a table illustrating an example of SSB-MTC field descriptions;

FIG. 6 is a table illustrating an example of SSB-MTC2 field descriptions;

FIG. 7 is a table illustrating an example of SSB-MTC3 field descriptions;

FIG. 8 is a diagram illustrating an example of a SSB-PositionQCL-Relationship IE;

FIG. 9 is a diagram illustrating an example of a SSB-ToMeasure IE;

FIG. 10 is a table illustrating an example of SSB-ToMeasure field descriptions;

FIG. 11 is a diagram illustrating an example of a non-zero power ("NZP")-CSI-RS-Resource IE;

FIG. 12 is a table illustrating an example of NZP-CSI-RS-Resource field descriptions;

FIG. 13 is a table illustrating examples of explanations of conditional presences;

FIG. 14 is a diagram illustrating an example of a NZP-CSI-RS-ResourceId IE;

FIG. 15 is a diagram illustrating an example of a NZP-CSI-RS-ResourceSet IE;

FIG. 16 is a table illustrating an example of NZP-CSI-RS-ResourceSet field descriptions;

FIG. 17 is a diagram illustrating an example of a NZP-CSI-RS-ResourceSetId;

FIG. 18 is a diagram illustrating an example of a CSI-RS-ResourceConfigMobility IE;

FIG. 19 is a table illustrating an example of CSI-RS-CellMobiility field descriptions;

FIG. 20 is a table illustrating an example of CSI-RS-ResourceConfigMobility field descriptions;

FIG. 21 is a diagram illustrating an example of a NR-RS-Type IE;

FIG. 22 is a diagram illustrating an example of a MeasObjectNR IE;

FIG. 23 is a table illustrating an example of CellsToAddMod field descriptions;

FIG. 24 is a table illustrating an example of MeasObjectNR field descriptions;

FIG. 25 is a table illustrating an example of RMTC-Config field descriptions;

FIG. 26 is a table illustrating an example of ReferenceSignalConfig field descriptions;

FIG. 27 is a table illustrating an example of SSB-ConfigMobility field descriptions;

FIG. 28 is a table illustrating an example of explanations for conditional presences;

FIG. 29 is a diagram illustrating an example of a MeasResults IE;

FIG. 30 is a diagram illustrating an example of a ServingCellConfig IE;

FIG. 31 is a table illustrating an example of ServingCellConfig field descriptions;

FIG. 32 is a table illustrating an example of UplinkConfig field descriptions;

FIG. 33 is a table illustrating an example of explanations of conditional presences;

FIG. 34 is a diagram illustrating an example of a MeasurementReport message;

FIG. 35 is a table illustrating an example of a T310 timer;

FIG. 36 is a table illustrating an example of counter N310 and 311;

FIG. 58 illustrates an example of a MeasConfig information element according to some embodiments of inventive concepts;

FIG. 59 is a table illustrating an example of MeasConfig field descriptions according to some embodiments of inventive concepts;

FIG. 60 illustrates an example of a MeasResults IE according to some embodiments of inventive concepts;

FIG. 61 is a table illustrating an example of MeasResultNR field descriptions according to some embodiments of inventive concepts;

FIG. 62 is a table illustrating an example of MeasResults field descriptions according to some embodiments of inventive concepts;

FIG. 63 is a table illustrating an example of MeasResultSSBBeam field descriptions according to some embodiments of inventive concepts;

FIG. 64 is a table illustrating an example of MeasResultCSIRSBeam field descriptions according to some embodiments of inventive concepts;

FIG. 65 illustrates an example of a ReportConfigNR IE according to some embodiments of inventive concepts;

FIG. 66 is a table illustrating CrossBeam-EventTriggered-Config field descriptions;

FIG. 67 illustrates an example of maximum indices for reporting;

FIG. 68 illustrates an example of a NR-UE-variables IE;

FIG. 69 illustrates an example of a VarMeasConfig IE;

FIG. 70 illustrates an example of a VarMeasReportList IE;

FIG. 78 is a block diagram of methods implemented in a communication system including a host computer, a base station and a user equipment in accordance with some embodiments; and FIG. 79 is a block diagram of methods implemented in a communication system including a host computer, a base station and a user equipment in accordance with some embodiments.

DETAILED DESCRIPTION

Figure 1:
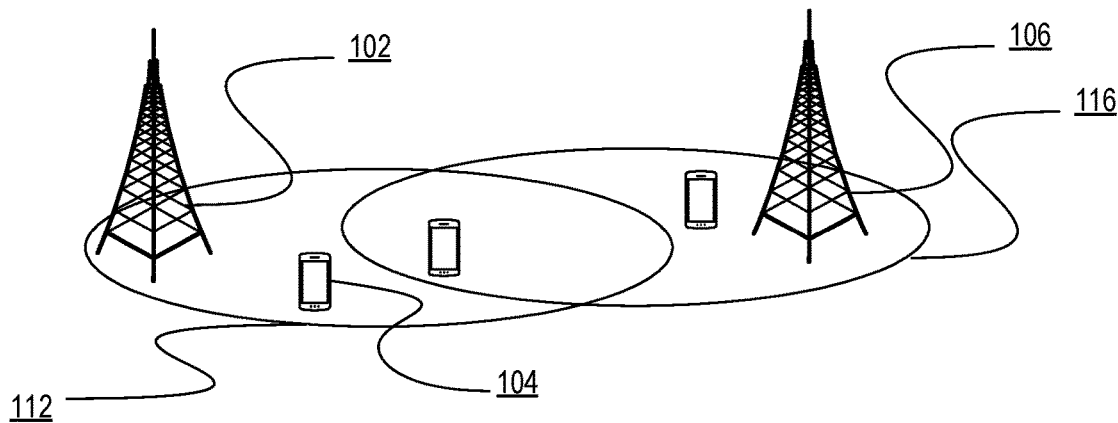
FIG. 1 is a schematic diagram illustrating an example of a 5th generation ("5G") network.
Figure 2:
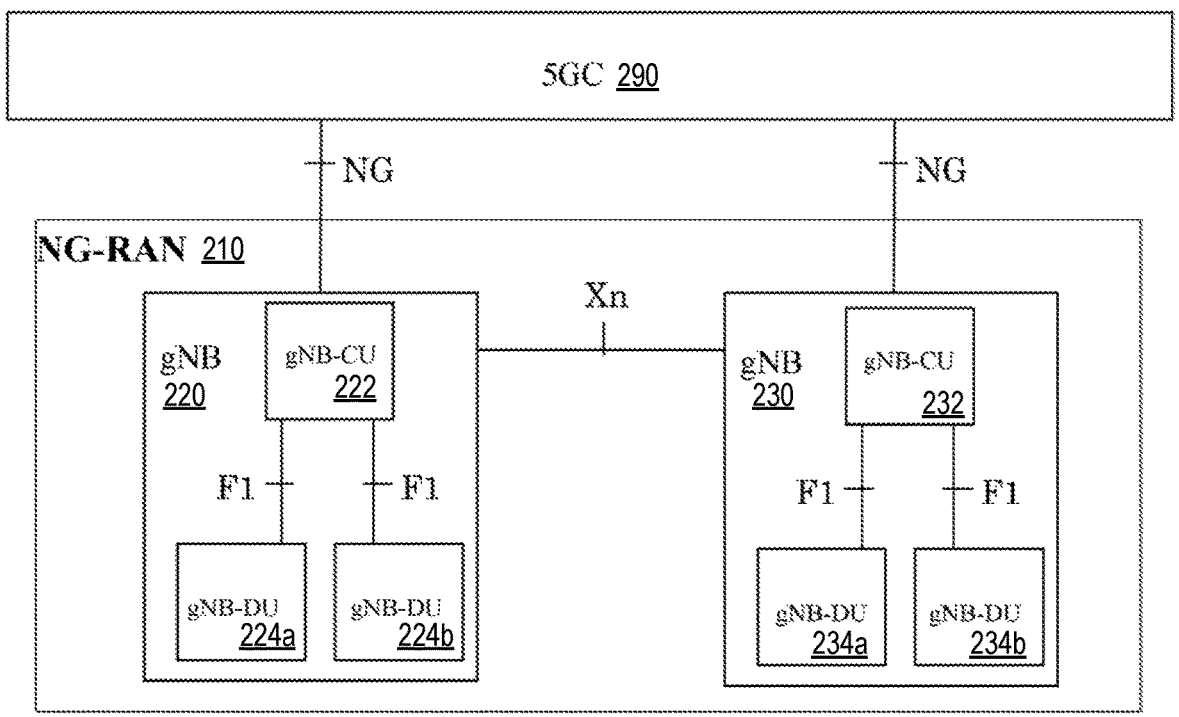
FIG. 2 is a block diagram illustrating an example of a NR network system architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

New radio ("NR") Reference Signals are described below.

Two types of reference signals are defined for NR, SSB and CSI-RS. Some of their characteristics are reported below from the 3GPP TS 38.331.

FIG. 3 illustrates an example of a synchronization signal block ("SSB")-index information element ("IE"), as described in TS 38.213, clause 4.1, which identifies an SS-Block within an SS-Burst.

FIG. 4 illustrates an example of a SSB-machine type communication ("MTC") IE, which can be used to configure measurement timing configurations (e.g., timing occasions at which the UE measures SSBs).

FIG. 5 includes a table illustrating an example of SSB-MTC field descriptions.

FIG. 6 includes a table illustrating an example of SSB-MTC2 field descriptions.

FIG. 7 includes a table illustrating an example of SSB-MTC3 field descriptions.

FIG. 8 illustrates an example of a SSB-PositionQCL-Relationship IE, which can be used to indicate the quasi-colocation ("QCL") relationship between SSB positions on the frequency indicated by ssbFrequency (see TS 38.213, clause 4.1). Value n1 corresponds to 1, value n2 corresponds to 2 and so on.

FIG. 9 illustrates an example of a SSB-ToMeasure IE, which can be used to configure a pattern of SSBs.

FIG. 10 includes a table illustrating an example of SSB-ToMeasure field descriptions.

Chanel status information ("CSI")-reference signals ("RSs") are described below.

FIG. 11 illustrates an example of a non-zero power ("NZP")-CSI-RS-Resource IE. The NZP-CSI-RS-Resource IE can be used to configure NZP-CSI-RS transmitted in the cell where the IE is included, which the UE may be configured to measure on (see TS 38.214, clause 5.2.2.3.1). A change of configuration between periodic, semi-persistent or aperiodic for an NZP-CSI-RS-Resource may be supported with a release and add.

FIG. 12 includes a table that illustrates an example of NZP-CSI-RS-Resource field descriptions.

FIG. 13 includes a table that illustrates examples of explanations of conditional presences.

FIG. 14 illustrates an example of a NZP-CSI-RS-ResourceId IE, which can be used to identify one NZP-CSI-RS-Resource.

FIG. 15 illustrates an example of a NZP-CSI-RS-ResourceSet IE, which is a set of NZP-CSI-RS resources (their IDs) and set-specific parameters.

FIG. 16 includes a table illustrates examples of NZP-CSI-RS-ResourceSet field descriptions.

FIG. 17 illustrates an example of a NZP-CSI-RS-ResourceSetId, which can be used to identify one NZP-CSI-RS-ResourceSet.

FIG. 18 illustrates an example of a CSI-RS-ResourceConfigMobility IE, which can be used to configure CSI-RS based RRM measurements.

FIG. 19 includes a table illustrating examples of CSI-RS-CellMobiility field descriptions.

FIG. 20 includes a table illustrating examples of CSI-RS-ResourceConfigMobility field descriptions.

New radio ("NR") measurement configuration and results are discussed below.

The network may configure an RRC_CONNECTED UE to perform measurements. The network may configure the UE to report them in accordance with the measurement configuration or perform conditional configuration evaluation in accordance with the conditional configuration. The measurement configuration can be provided by means of dedicated signaling, for example, using the RRCReconfiguration or RRCResume.

The network may configure the UE to perform the following types of measurements: NR measurements; Inter-radio access technology ("RAT") measurements of Evolved Universal Terrestrial Radio Access ("E-UTRA") frequencies; and Inter-RAT measurements of universal mobile telecommunications system terrestrial radio access ("UTRA")-frequency division duplexing ("FDD") frequencies.

The network may configure the UE to report the following measurement information based on synchronization signal ("SS")SS/physical broadcast channel ("PBCH") block(s): measurement results per SS/PBCH block; measurement results per cell based on SS/PBCH block(s); and SS/PBCH block(s) indexes.

The network may configure the UE to report the following measurement information based on CSI-RS resources: measurement results per CSI-RS resource; measurement results per cell based on CSI-RS resource(s); and CSI-RS resource measurement identifiers.

The network may configure the UE to perform constant bit rate ("CBR") measurements for sidelink.

The network may configure the UE to report the following measurement information based on sound reference signal ("SRS") resources: measurement results per SRS resource; and SRS resource(s) indexes.

The network may configure the UE to report the following measurement information based on command line interface ("CLI")-received signal strength indicator ("RSSI") resources: measurement results per CLI-RSSI resource; and CLI-RSSI resource(s) indexes.

The measurement configuration includes the following parameters: measurement objects, reporting configurations, measurement identities, quantity configurations, and measurement gaps.

Measurement objects can include a list of objects on which the UE can perform the measurements.

Reporting configurations can include a list of reporting configurations where there can be one or multiple reporting configurations per measurement object. Each measurement reporting configuration can include reporting criterion, RS type, and reporting format. The reporting criterion can be a criterion that triggers the UE to send a measurement report. This can either be periodical or a single event description. The RS type can be the RS that the UE uses for beam and cell measurement results (SS/PBCH block or CSI-RS). The reporting format can include the quantities per cell and per beam that the UE includes in the measurement report (e.g., received signal receive power ("RSRP")) and other associated information such as the maximum number of cells and the maximum number of beams per cell to report. In case of conditional configuration triggering configuration, each configuration can include execution criteria and RS type. The execution criteria can include criteria that triggers the UE to perform conditional configuration execution. The RS type can include the RS that the UE uses for beam and cell measurement results (SS/PBCH block or CSI-RS) for conditional configuration execution condition.

Measurement identities can include, for measurement reporting, a list of measurement identities where each measurement identity links one measurement object with one reporting configuration.

Quantity configurations can include the measurement filtering configuration used for all event evaluation, related reporting, and for periodical reporting of that measurement.

Measurement gaps can include periods that the UE may use to perform measurements.

In new radio-dual connectivity ("NR-DC"), the UE may receive two independent measConfig. The first measConfig may be associated with a master cell group ("MCG"), that is included in the RRCReconfiguration message received via a signaling radio bearer 1 ("SRB1"). The second measConfig may be associated with a secondary cell group ("SCG"), that is included in the RRCReconfiguration message received via SRB3, or, alternatively, included within a RRCReconfiguration message embedded in a RRCReconfiguration message received via SRB1.

The IE ReportConfigNR can specify criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS. The following are examples of CHO or CPC events.

Event A1: Serving becomes better than absolute threshold.

Event A2: Serving becomes worse than absolute threshold.

Event A3: Neighbor becomes amount of offset better than PCell/PSCell.

Event A4: Neighbor becomes better than absolute threshold.

Event A5: PCell/PSCell becomes worse than absolute threshold1 AND Neighbor/SCell becomes better than another absolute threshold2.

Event A6: Neighbor becomes amount of offset better than SCell.

Event B1: Inter RAT neighbor becomes better than threshold.

Event B2: PCell becomes worse than threshold1 and inter RAT neighbor becomes better than threshold2.

Event I1: Interference becomes higher than threshold.

Event C1: The NR sidelink channel busy ratio is above a threshold.

Event C2: The NR sidelink channel busy ratio is below a threshold.

Event V1: The V2X sidelink channel busy ratio is above a threshold.

Event V2: The V2X sidelink channel busy ratio is below a threshold.

The events A1, A2, A3, A4, A5, A6, B1, B2 are based on either SSB reference signals or CSI-RS reference signals as indicated by the NR-RS-Type IE illustrated in FIG. 21.

FIG. 22 illustrates an example of a MeasObjectNR IE, which can specify information applicable for SS/PBCH block(s) intra/inter-frequency measurements and/or CSI-RS intra/inter-frequency measurements.

FIG. 23 includes a table illustrating an example of CellsToAddMod field descriptions.

FIG. 24 includes a table illustrating an example of MeasObjectNR field descriptions.

FIG. 25 includes a table illustrating an example of RMTC-Config field descriptions.

FIG. 26 includes a table illustrating an example of ReferenceSignalConfig field descriptions.

FIG. 27 includes a table illustrating an example of SSB-ConfigMobility field descriptions.

FIG. 28 includes a table illustrating an example of explanations for conditional presences.

FIG. 29 illustrates an example of a MeasResults IE, which can cover measured results for intra-frequency, inter-frequency, and inter-RAT mobility.

FIG. 30 illustrates an example of a ServingCellConfig IE. The ServingCellConfig IE can be used to configure (e.g., add or modify) the UE with a serving cell, which may be the SpCell or an SCell of an MCG or SCG. The parameters herein are mostly UE specific but partly also cell specific (e.g. in additionally configured bandwidth parts). Reconfiguration between a physical uplink control channel ("PUCCH") SCell and a SCell without a PUCCH is only supported using an SCell release and add.

FIG. 31 includes a table illustrating an example of ServingCellConfig field descriptions.

FIG. 32 includes a table illustrating an example of UplinkConfig field descriptions.

If the dedicated part of initial uplink ("UL")/downlink ("DL") bandwidth part ("BWP") configuration is absent, the initial BWP can be used but with some limitations. For example, changing to another BWP may require a RRCReconfiguration since DCI format 1_0 doesn't support DCI-based switching.

FIG. 33 includes a table illustrating an example of explanations of conditional presences.

FIG. 34 illustrates an example of a MeasurementReport message, which can be used for the indication of measurement results.

A Timer T310 is discussed below and illustrated in FIGS. 35-36. According to 3GPP TS 38.331: timer T310 is started upon detecting physical layer problems for the SpCell i.e. upon receiving N310 consecutive out-of-sync indications from lower layers. Timer T310 is stopped: (1) upon receiving N311 consecutive in-sync indications from lower layers for the SpCell, upon receiving RRCReconfiguration with reconfigurationWithSync for that cell group, and upon initiating the connection re-establishment procedure or (2) upon SCG release, if the T310 is kept in SCG.

Existing methods of UE reporting, however, may not provide sufficient information to detect some coverage issues.

Figure 53:
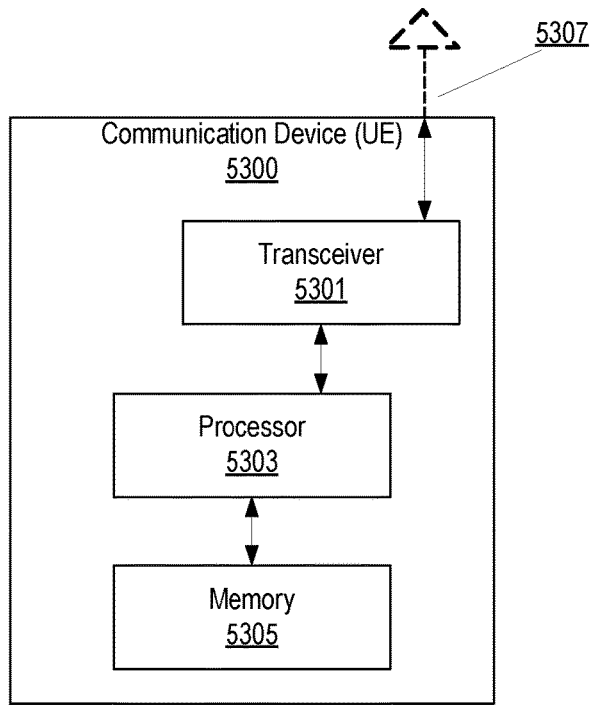
FIG. 53 is a block diagram illustrating a communication device UE according to some embodiments of inventive concepts.

FIG. 53 is a block diagram illustrating elements of a communication device UE 5300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 5300 may be provided, for example, as discussed below with respect to wireless device 4110 of FIG. 71.) As shown, communication device UE may include an antenna 5307 (e.g., corresponding to antenna 4111 of FIG. 71), and transceiver circuitry 5301 (also referred to as a transceiver, e.g., corresponding to interface 4114 of FIG. 71) including a transmitter and a receiver configured to provide uplink and downlink radio communications with a base station(s) (e.g., corresponding to network node 4160 of FIG. 71, also referred to as a RAN node) of a radio access network. Communication device UE may also include processing circuitry 5303 (also referred to as a processor, e.g., corresponding to processing circuitry 4120 of FIG. 71) coupled to the transceiver circuitry, and memory circuitry 5305 (also referred to as memory, e.g., corresponding to device readable medium 4130 of FIG. 71) coupled to the processing circuitry. The memory circuitry 5305 may include computer readable program code that when executed by the processing circuitry 5303 causes the processing circuitry to perform operations according to embodiments disclosed herein. According to other embodiments, processing circuitry 5303 may be defined to include memory so that separate memory circuitry is not required. Communication device UE may also include an interface (such as a user interface) coupled with processing circuitry 5303, and/or communication device UE may be incorporated in a vehicle.

As discussed herein, operations of communication device UE may be performed by processing circuitry 5303 and/or transceiver circuitry 5301. For example, processing circuitry 5303 may control transceiver circuitry 5301 to transmit communications through transceiver circuitry 5301 over a radio interface to a radio access network node (also referred to as a base station) and/or to receive communications through transceiver circuitry 5301 from a RAN node over a radio interface. Moreover, modules may be stored in memory circuitry 5305, and these modules may provide instructions so that when instructions of a module are executed by processing circuitry 5303, processing circuitry 5303 performs respective operations (e.g., operations discussed below with respect to Example Embodiments relating to wireless communication devices). According to some embodiments, a communication device UE 5300 and/or an element(s)/function(s) thereof may be embodied as a virtual node/nodes and/or a virtual machine/machines.

Figures 54, 55:
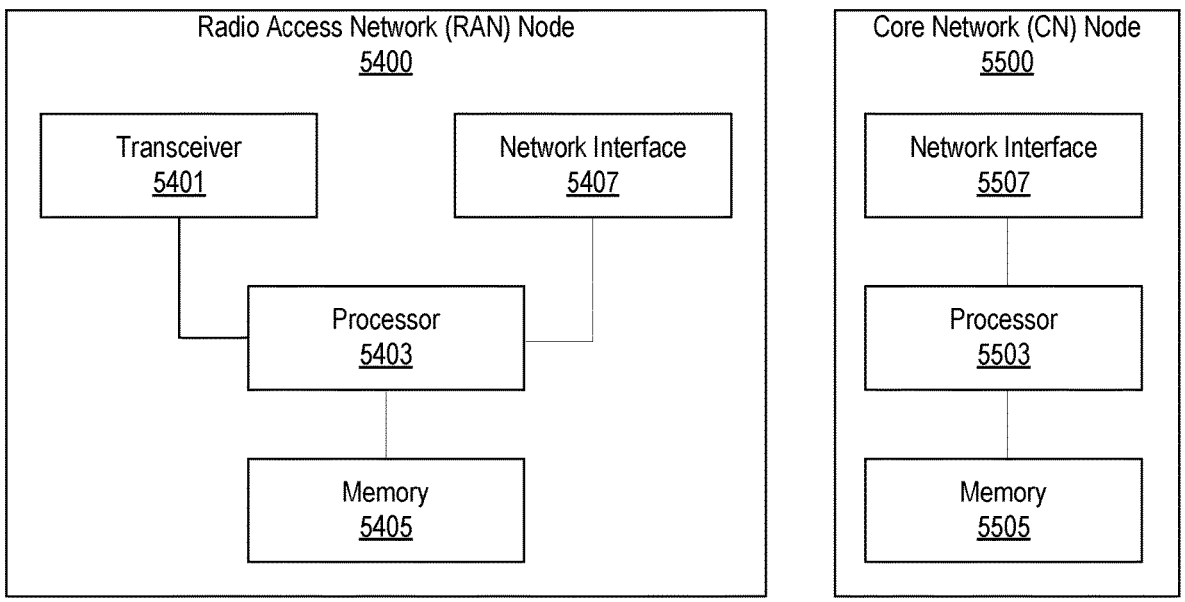
FIG. 54 is a block diagram illustrating a radio access network RAN node (e.g., a base station eNB/gNB) according to some embodiments of inventive concepts.
FIG. 55 is a block diagram illustrating a core network CN node (e.g., an AMF node, an SMF node, etc.) according to some embodiments of inventive concepts.

FIG. 54 is a block diagram illustrating elements of a radio access network RAN node 5400 (also referred to as a network node, base station, eNodeB/eNB, gNodeB/gNB, etc.) of a Radio Access Network (RAN) configured to provide cellular communication according to embodiments of inventive concepts. (RAN node 5400 may be provided, for example, as discussed below with respect to network node 4160 of FIG. 71.) As shown, the RAN node may include transceiver circuitry 5401 (also referred to as a transceiver, e.g., corresponding to portions of interface 4190 of FIG. 71) including a transmitter and a receiver configured to provide uplink and downlink radio communications with mobile terminals. The RAN node may include network interface circuitry 5407 (also referred to as a network interface, e.g., corresponding to portions of interface 4190 of FIG. 71) configured to provide communications with other nodes (e.g., with other base stations) of the RAN and/or core network CN. The network node may also include processing circuitry 5403 (also referred to as a processor, e.g., corresponding to processing circuitry 4170) coupled to the transceiver circuitry, and memory circuitry 5405 (also referred to as memory, e.g., corresponding to device readable medium 4180 of FIG. 71) coupled to the processing circuitry. The memory circuitry 5405 may include computer readable program code that when executed by the processing circuitry 5403 causes the processing circuitry to perform operations according to embodiments disclosed herein. According to other embodiments, processing circuitry 5403 may be defined to include memory so that a separate memory circuitry is not required.

As discussed herein, operations of the RAN node may be performed by processing circuitry 5403, network interface 5407, and/or transceiver 5401. For example, processing circuitry 5403 may control transceiver 5401 to transmit downlink communications through transceiver 5401 over a radio interface to one or more mobile terminals UEs and/or to receive uplink communications through transceiver 5401 from one or more mobile terminals UEs over a radio interface. Similarly, processing circuitry 5403 may control network interface 5407 to transmit communications through network interface 5407 to one or more other network nodes and/or to receive communications through network interface from one or more other network nodes. Moreover, modules may be stored in memory 5405, and these modules may provide instructions so that when instructions of a module are executed by processing circuitry 5403, processing circuitry 5403 performs respective operations (e.g., operations discussed below with respect to Example Embodiments relating to RAN nodes). According to some embodiments, RAN node 5400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

FIG. 55 is a block diagram illustrating elements of a core network CN node (e.g., an SMF node, an AMF node, etc.) of a communication network configured to provide cellular communication according to embodiments of inventive concepts. As shown, the CN node may include network interface circuitry 5507 (also referred to as a network interface) configured to provide communications with other nodes of the core network and/or the radio access network RAN. The CN node may also include a processing circuitry 5503 (also referred to as a processor) coupled to the network interface circuitry, and memory circuitry 5505 (also referred to as memory) coupled to the processing circuitry. The memory circuitry 5505 may include computer readable program code that when executed by the processing circuitry 5503 causes the processing circuitry to perform operations according to embodiments disclosed herein. According to other embodiments, processing circuitry 5503 may be defined to include memory so that a separate memory circuitry is not required.

As discussed herein, operations of the CN node may be performed by processing circuitry 5503 and/or network interface circuitry 5507. For example, processing circuitry 5503 may control network interface circuitry 5507 to transmit communications through network interface circuitry 5507 to one or more other network nodes and/or to receive communications through network interface circuitry from one or more other network nodes. Moreover, modules may be stored in memory 5505, and these modules may provide instructions so that when instructions of a module are executed by processing circuitry 5503, processing circuitry 5503 performs respective operations (e.g., operations discussed below with respect to Example Embodiments relating to core network nodes). According to some embodiments, CN node 5500 and/or an element(s)/function(s) thereof may be embodied as a virtual node/nodes and/or a virtual machine/machines.

Prior approaches may not provide sufficient support for events that can be used to report the status of CSI-RS in comparison with SSB RS.

Also, a UE that is configured with CSI-RS as the RLM signal may not have any issues with RLM but the UE might have very poor L3 reference signal (SSB and/or CSI-RS) coverage. This may lead to a scenario wherein a connected UE might perceive the coverage in a given location but a UE that is idle/inactive at the same location might not perceive any coverage from the same cell. This may lead to a coverage mismatch in Idle/Inactive and connected mode.

Various events are proposed as discussed below. An example of a proposed implementation is also discussed.

According to some embodiments, a flexibility of beam management/optimization may be improved by introducing additional events that a RAN node may configure for a terminal equipment to report the status of CSI-RS beams and SSB beams at the same time.

Proposed events are listed below with possible naming. Detailed explanation, examples and possible implementations are also discussed below.

Event F1: Serving CSI-RS becomes worse than threshold1 AND Serving SSB becomes better than threshold2.

Event F2: Serving CSI-RS becomes worse than threshold1 AND Neighbor SSB becomes better than threshold2.

Event F3: Serving SSB becomes worse than threshold AND Serving CSI-RS becomes offset better than Serving SSB.

Event F4: Neighbor SSB becomes amount of offset better than Serving CSI-RS.

Event F5: Neighbor SSB becomes offset1 better than Serving CSI-RS AND Neighbor SSB becomes offset2 better than Serving SSB.

Event F6 (variant of event F3): Serving SSB becomes worse than threshold1 and Serving CSI-RS becomes better than threshold2.

Event F7 (variant of event F5): Serving CSI-RS becomes better than threshold1 AND Serving SSB becomes worse than threshold2 AND Neighbor SSB becomes better than threshold3.

Event F8: Serving CSI-RS becomes offset better than neighbour SSB.

Event F9: Serving CSI-RS becomes better than threshold 1 and neighbour SSB becomes worse than threshold2.

Event F10: Serving SSB becomes offset better than serving CSI-RS.

Event F11: Serving SSB becomes better than threshold1 and serving CSI-RS becomes worse than threshold2.

Event F12: Serving cell (PCell or PSCell) SSB becomes worse than threshold and T310 is not running.

Event F13: Serving cell (PCell or PSCell) CSI-RS becomes worse than threshold and T310 is not running.

Some embodiments of inventive concepts may enable detection of: areas with sub-optimal coverage of CSI-RS beams compared to SSB beams; areas of downlink interference where the victim is a CSI-RS beam and the aggressor is a SSB beam; areas with coverage imbalance between uplink and downlink; and/or areas with potentially high uplink interference.

New events for CSI-RS and SSB beams measurements are discussed below.

The following is a list for proposed events according to some embodiments of inventive concepts with a possible names, short explanations and examples.

Event F1 is discussed below with respect to FIGS. 37A-B where Serving CSI-RS becomes worse than threshold1 AND Serving SSB becomes better than threshold2

This event may be used e.g. to identify a sub-optimal coverage for a CSI-RS beam compared to the underlying SSB beam.

Figure 37A:
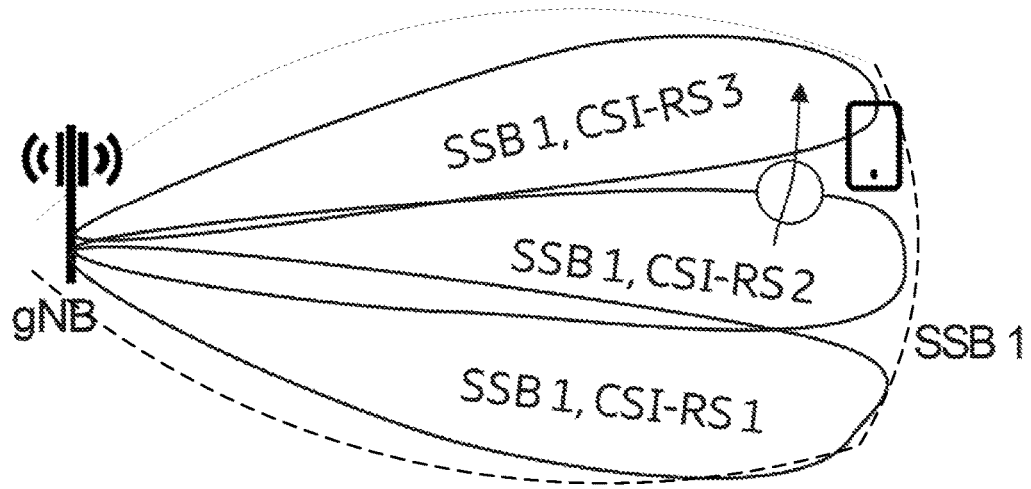
FIGS. 37A-B illustrate an event F1 according to some embodiments of inventive concepts.
Figure 37B:
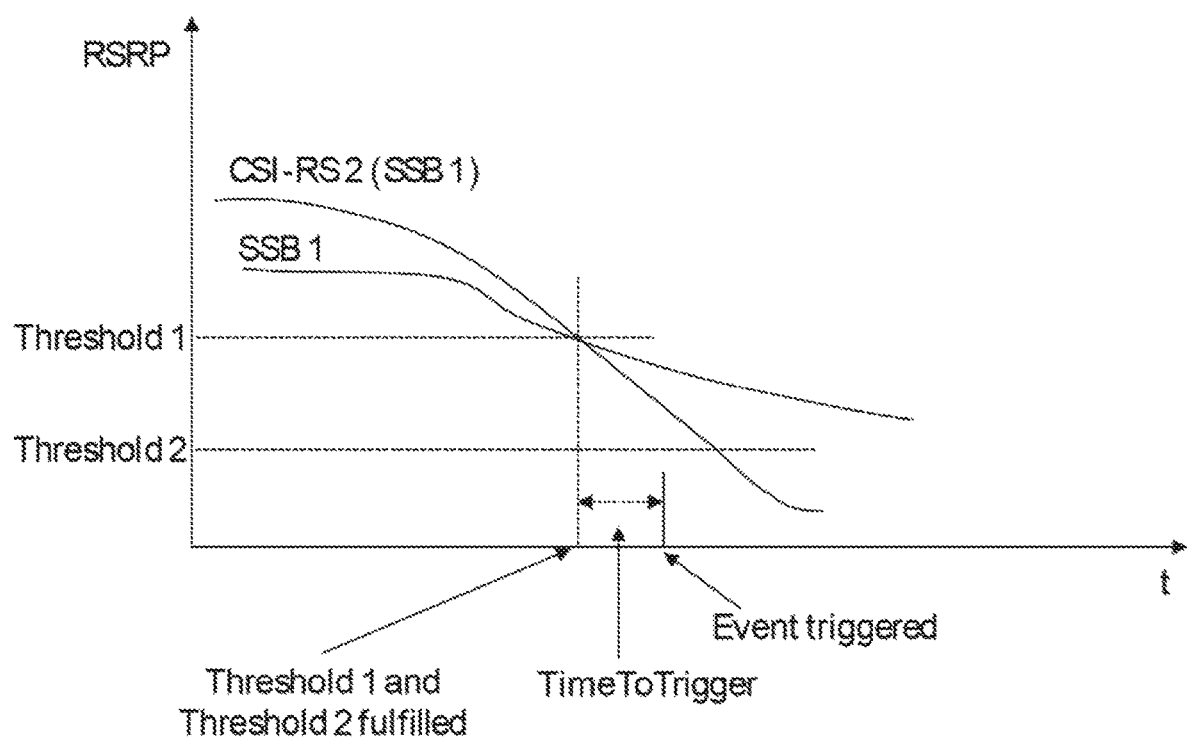

As an example, a situation can be detected in which a UE synched to a CSI-RS beam is moving away from that CSI-RS beam and at the same time the underlying SSB beam can provide a good enough coverage as shown in FIGS. 37A-B.

From a CCO point of view this event may represent an imbalance between CSI-RS coverage areas and SSB areas. In some cases this corresponds to a coverage disparity between data channels and SSB RS coverage because data channel coverage may be equivalent to CSI-RS coverage. Such situation may imply that a UE measuring SSB RS may determine that the cell is good for mobility or for connection establishment, while that same cell is not able to provide data channel coverage in the same area. The latter results in a capacity issue, which the CCO function should identify and eventually address.

In FIGS. 37A-B, Serving CSI-RS becomes worse than threshold1 AND Serving SSB becomes better than threshold2.

Event F2 is discussed below with respect to FIGS. 3A, 3B, 4A, and 4B, where Serving CSI-RS becomes worse than threshold1 AND Neighbor SSB becomes better than threshold2.

This event may be used to detect downlink interference situations where the victim is a CSI-RS beam and the aggressor is a neighbor SSB beam.

As an example, a situation can be detected in which a UE synched to a CSI-RS beam and to the underlying (first) SSB beam. The UE is moving away from the CSI-RS beam and a second SSB beam is measured with good enough coverage.

In an intra-RAN node scenario this may happen e.g. when an NR cell comprises two (or more) SSB beams and the UE moves from the geographical area covered by one of the CSI-RS beam covering the first SSB beam to the geographical area covered by a second SSB beam.

In a scenario between RAN nodes, this may happen e.g. in case the UE moves from (one of) the CSI-RS beam within (one of) the SSB beam(s) defined in a first NR cell to a second SSB beam defined in the second NR cell.

From a CCO point of view this event may imply that the coverage of the serving CSI-RS beam is degrading, while the coverage of the neighbour SSB beam is strong, i.e. neighbour SSB RSs have relatively strong signal. However, such event does not guarantee that coverage and capacity are optimal. As an example, if the serving SSB signal is still strong in the area where the event is recorded, there might be an extended overlap between SSB areas of serving and neighbour cells, hence causing interference and ping pong issues.

Figure 38A:
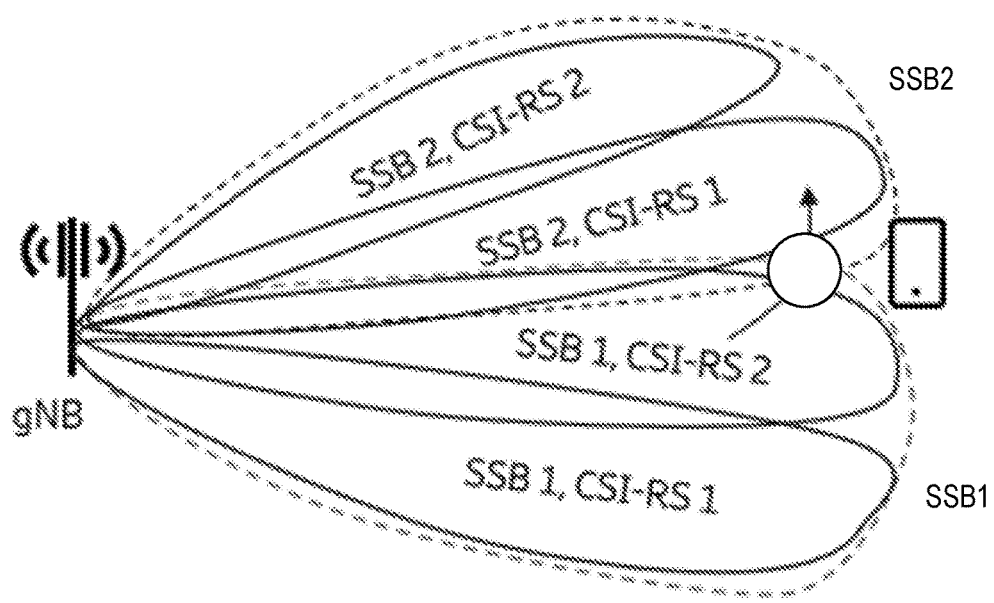
FIGS. 38A-B and FIGS. 39A-B illustrate an event F2 according to some embodiments of inventive concepts.
Figure 38B:
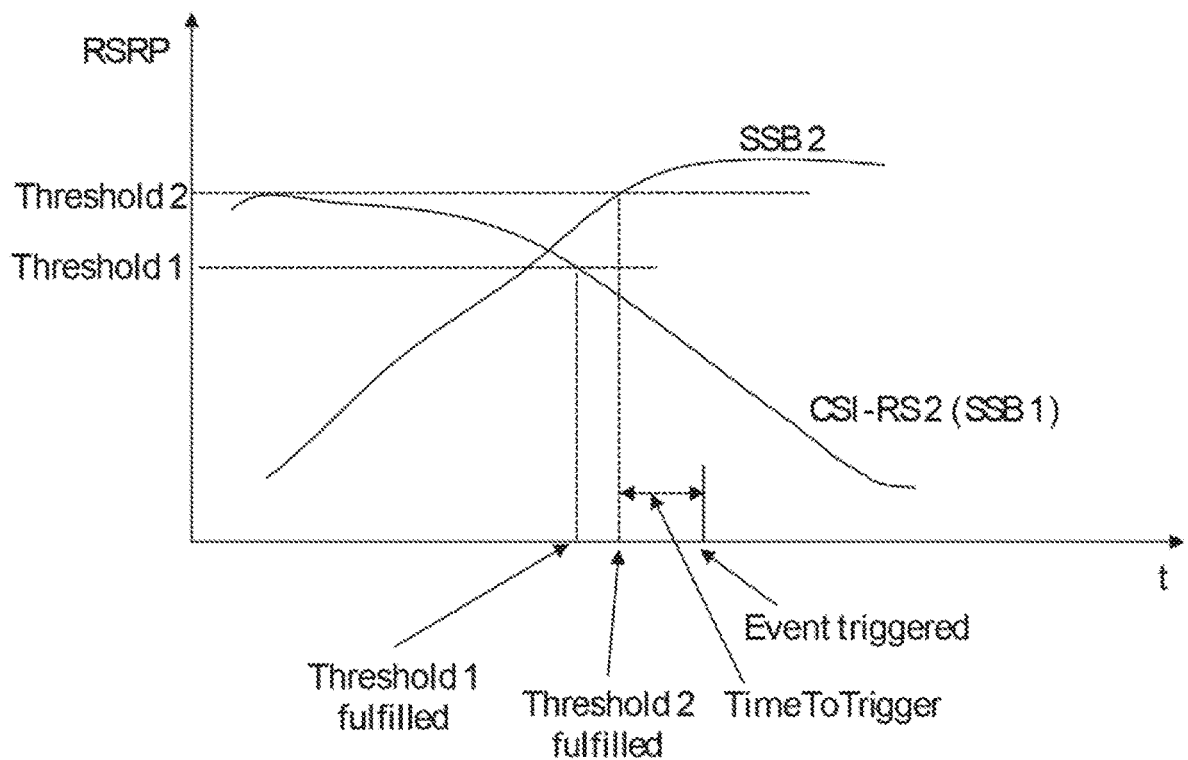

In an Intra-gNB case of FIGS. 38A-B, Serving CSI-RS becomes worse than threshold1 AND Neighbor SSB becomes better than threshold2.

Figure 39A:
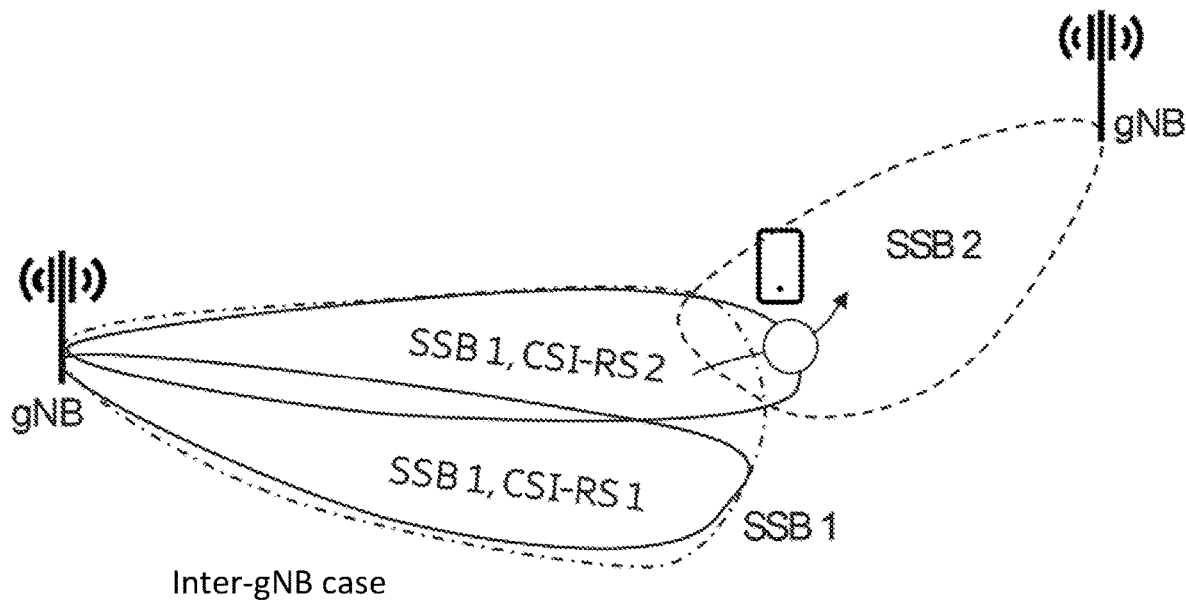
Figure 39B:
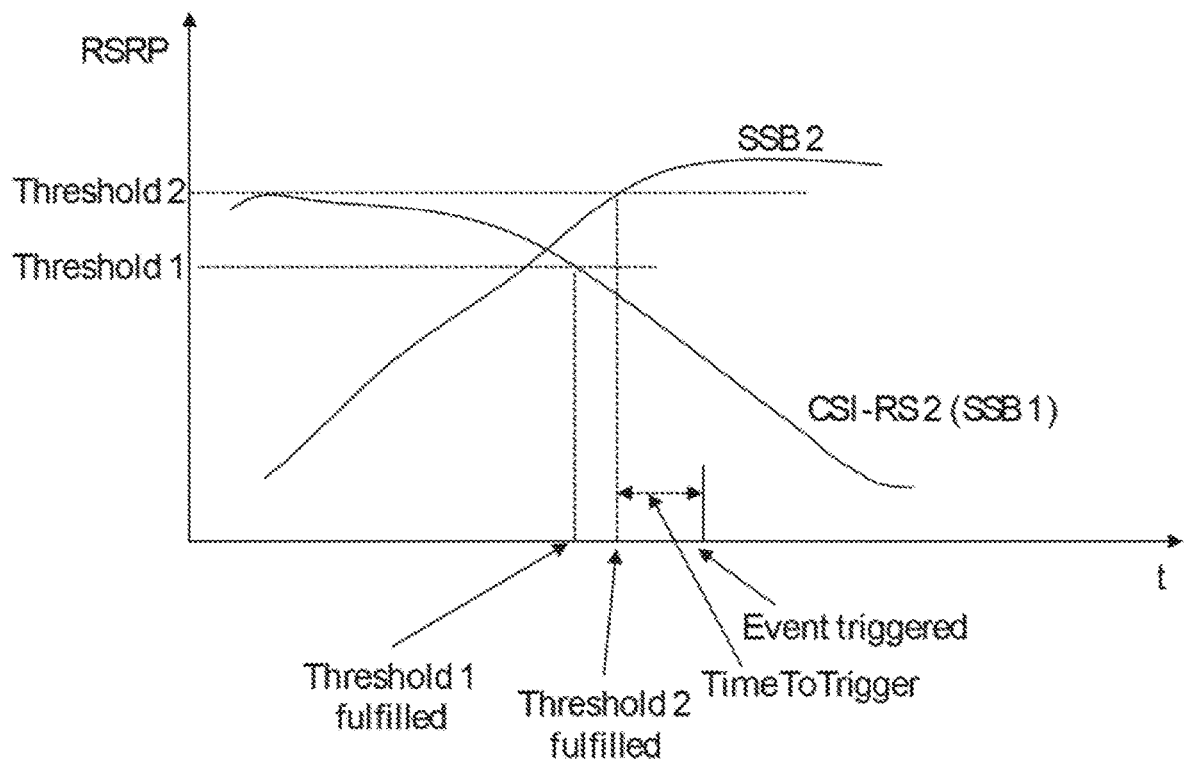

In an Inter-gNB case of FIGS. 39A-B, Serving CSI-RS becomes worse than threshold1 AND Neighbor SSB becomes better than threshold2.

Event F3 is discussed below with respect to FIGS. 40A-B where Serving SSB becomes worse than threshold1 AND Serving CSI-RS becomes offset better than Serving SSB.

This event may be used to detect a risk of RLF for CSI-RS due to coverage imbalance between uplink and downlink coverage.

As an example, a situation can be detected in which a UE is moving within a CSI-RS beam towards a region where the CSI-RS beam coverage stretches too much beyond the underlying SSB beam. If such UE synched to the CSI-RS which transitions from RRC_CONNECTED to RRC_IDLE, the UE may lose synchronization towards the SSB beam and may become unreachable.

This event may also highlight a potential situation of cross cell interference. Assuming that the coverage of SSB RS between neighbour cells is optimal, namely that there are no SSB RS coverage holes or excessive overlaps, this event may signify that a UE served by a cell has entered the coverage of a neighbour cell and for that it might be generating interference towards the UEs of such neighbour cell.

Figure 40A:
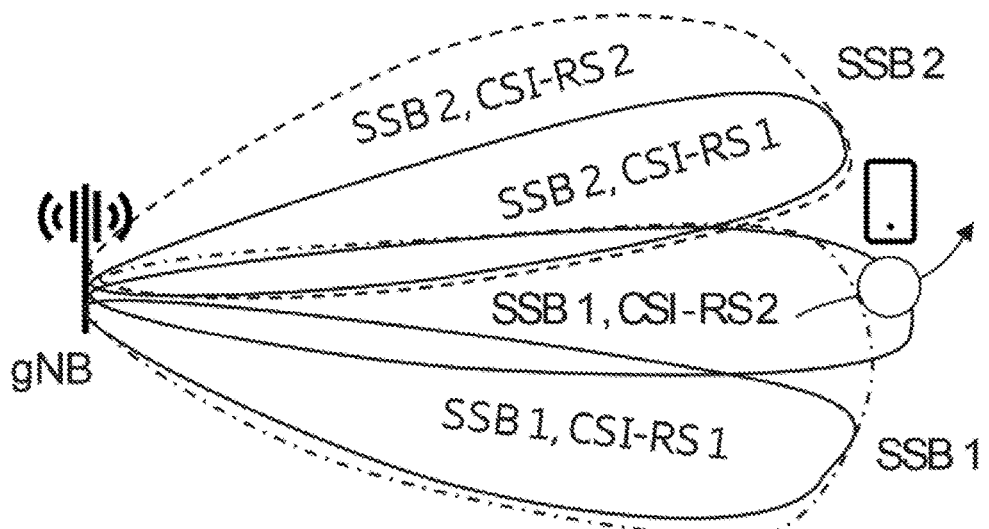
FIGS. 40A-B illustrate an event F3 according to some embodiments of inventive concepts.
Figure 40B:
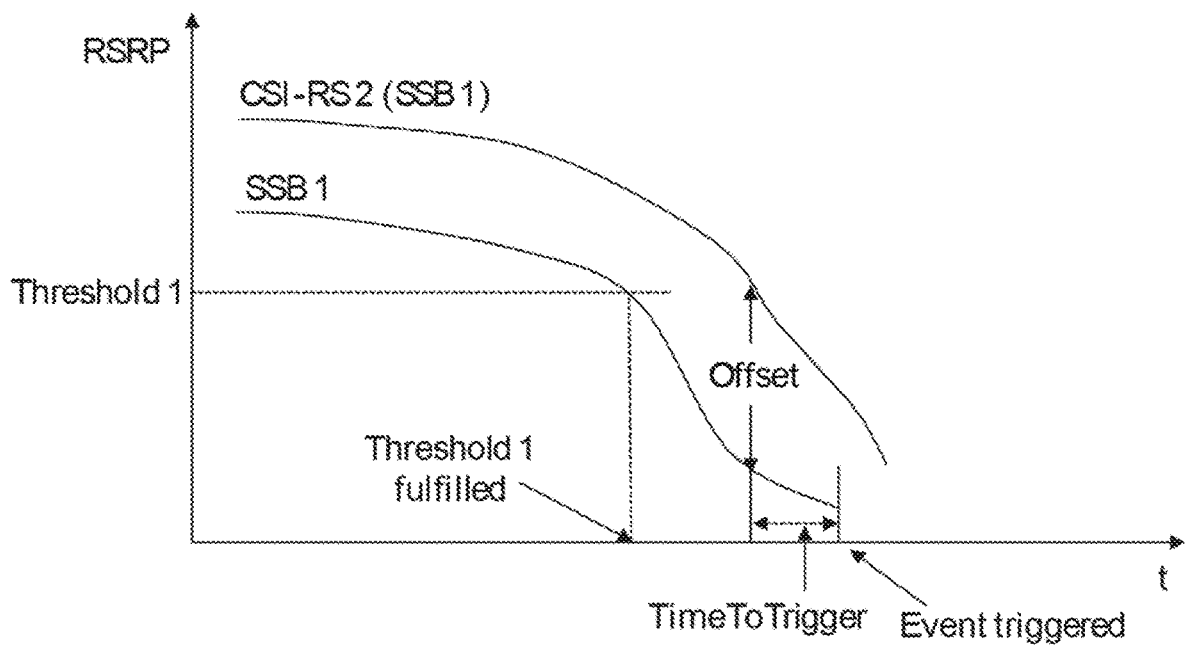

In FIGS. 40A-B, Serving SSB becomes worse than threshold1 AND Serving CSI-RS becomes offset better than Serving SSB.

Event F4 is discussed below with respect to FIGS. 41A-B where Neighbor SSB becomes amount of offset better than Serving CSI-RS The event may be used to detect regions with uplink and downlink imbalance with potentially high uplink interference.

As an example, a situation can be detected in which a UE is moving within a CSI-RS beam towards a region where the CSI-RS beam coverage stretches beyond the underlying SSB beam and another SSB beam becomes too strong.

Figure 41A:
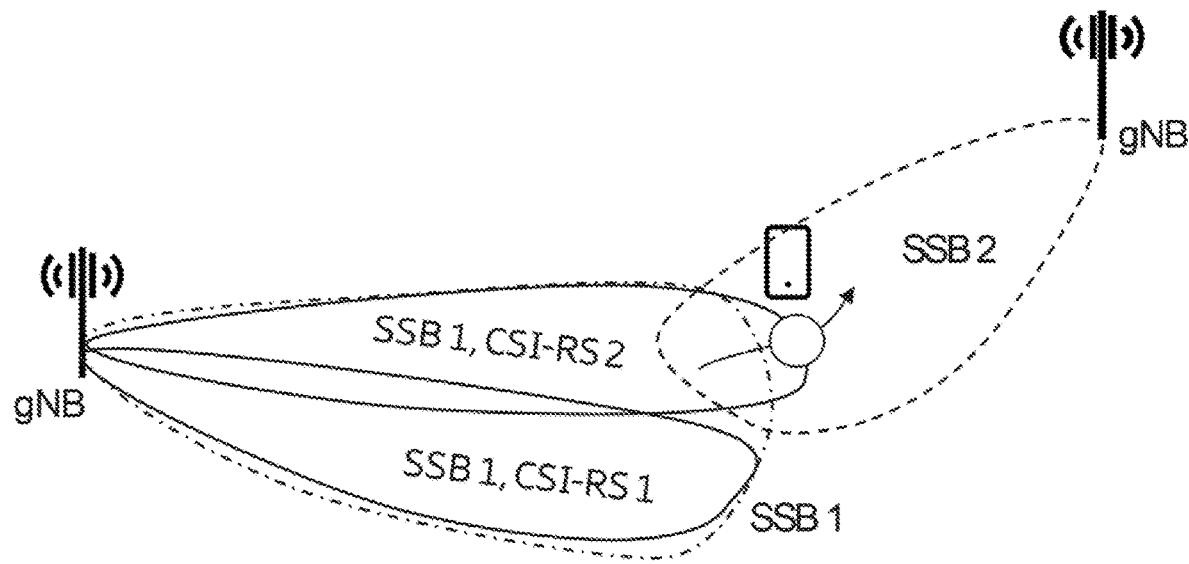
FIGS. 41A-B illustrate an event F4 according to some embodiments of inventive concepts.
Figure 41B:
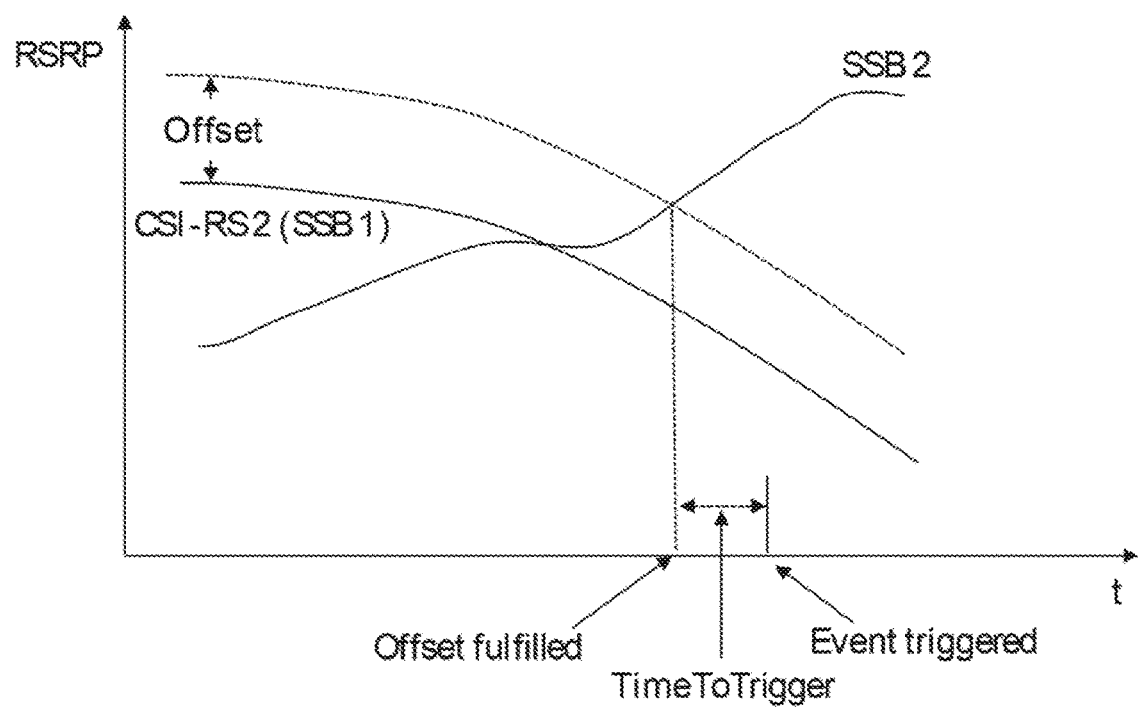

In FIGS. 41A-B, the Neighbor SSB becomes an amount of offset better than Serving CSI-RS.

Event F5 is discussed below with respect to FIGS. 42A-B and FIGS. 43A-B where Neighbor SSB becomes offset1 better than Serving CSI-RS AND Neighbor SSB becomes offset2 better than Serving SSB.

The event can be used to detect sub-optimal coverage between a CSI-RS beam and the corresponding SSB beam in conjunction with a sub-optimal coverage of neighbor SSB beams.

This event checks the relative levels (e.g. coverage or quality) of the serving CSI-RS beam and a neighbor SSB beam and the relative levels (e.g., coverage or quality) of the same neighbor SSB beam and the serving SSB beam. It may be used to detect regions with sub-optimal coverage for SSB beams and imbalance between uplink and downlink.

As an example, a situation can be detected in which a UE is moving within a CSI-RS beam towards a region where the CSI-RS beam coverage stretches too much beyond the underlying SSB beam and at the same time another SSB beam becomes too strong compared to the serving SSB. This condition may be a strong indicator of the fact that the UE is generating cross cell interference towards the neighbour cell therefore limiting cell capacity. At the same time this situation is a strong indicator that there is substantial coverage overlap between cells and therefore there can be frequent ping pong mobility events.

As another example, a situation can be detected in which a UE is at the border of a CSI-RS beam and a neighbor SSB beam provides a better signal compared to both the CSI-RS beam and the serving SSB beam.

Figure 42A:
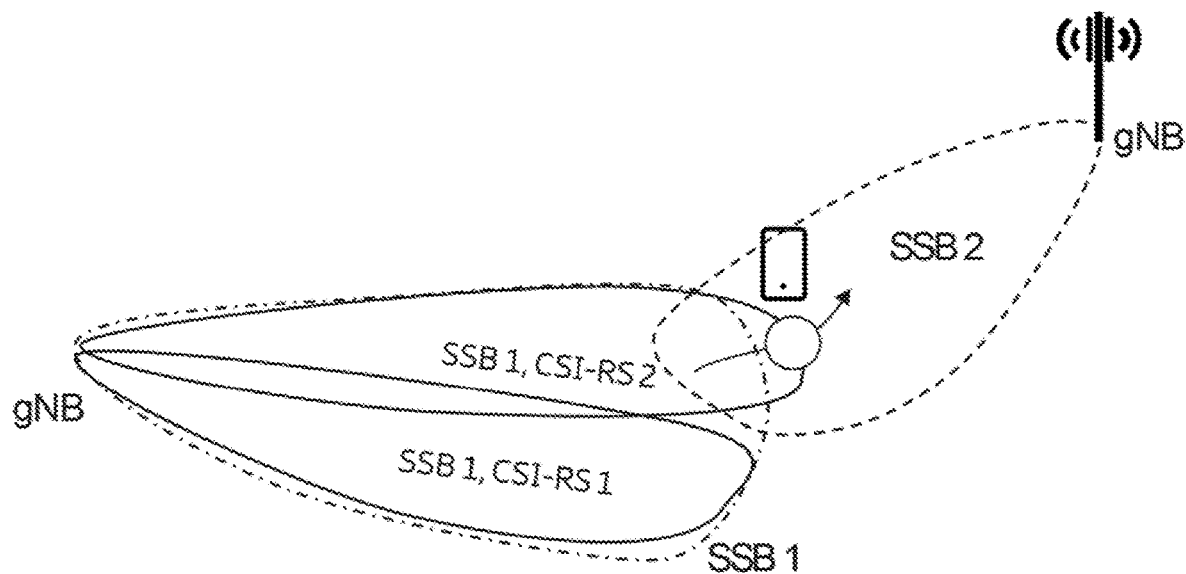
FIGS. 42A-B and FIGS. 43A-B illustrate an event F5 according to some embodiments of inventive concepts.
Figure 42B:
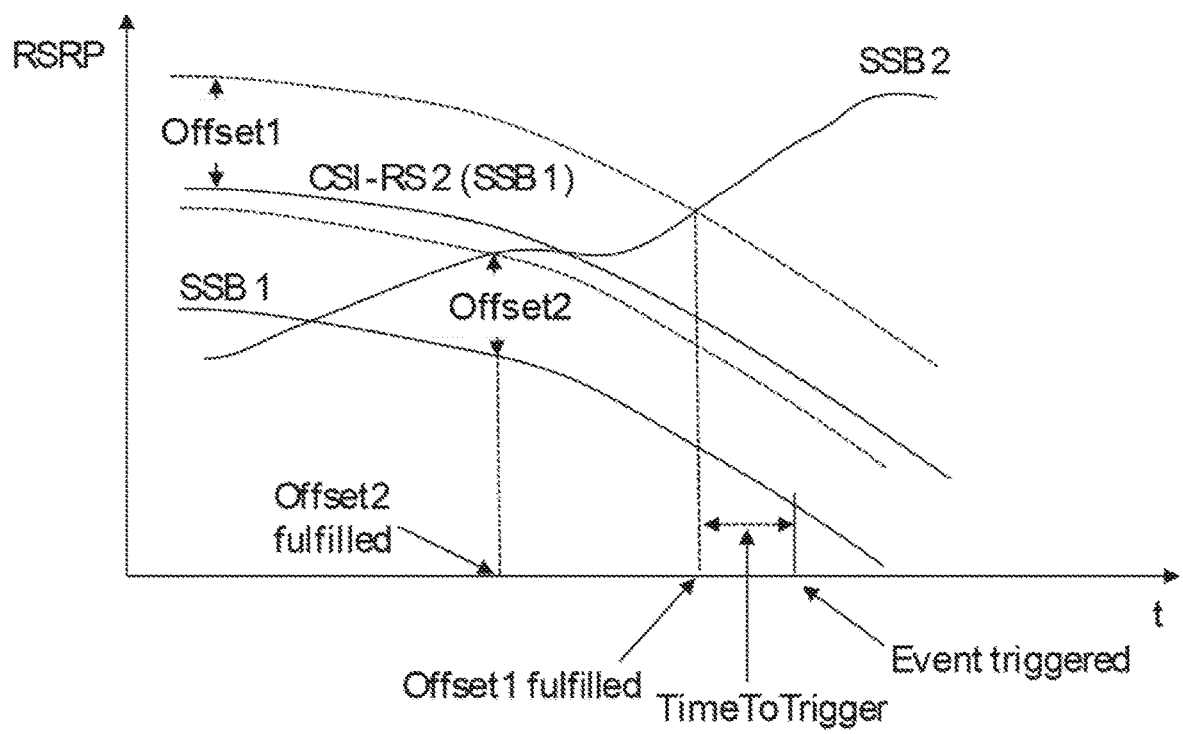

In FIGS. 42A-B, the CSI-RS beam is beyond own SSB beam—Neighbor SSB becomes offset1 better than Serving CSI-RS AND Neighbor SSB becomes offset2 better than Serving SSB.

Figure 43A:
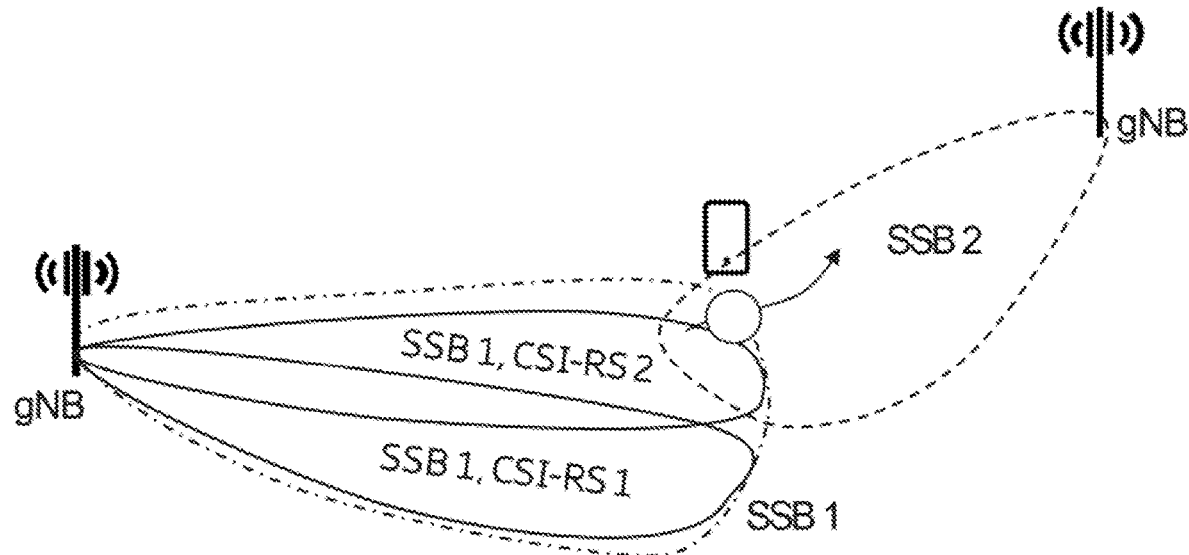
Figure 43B:
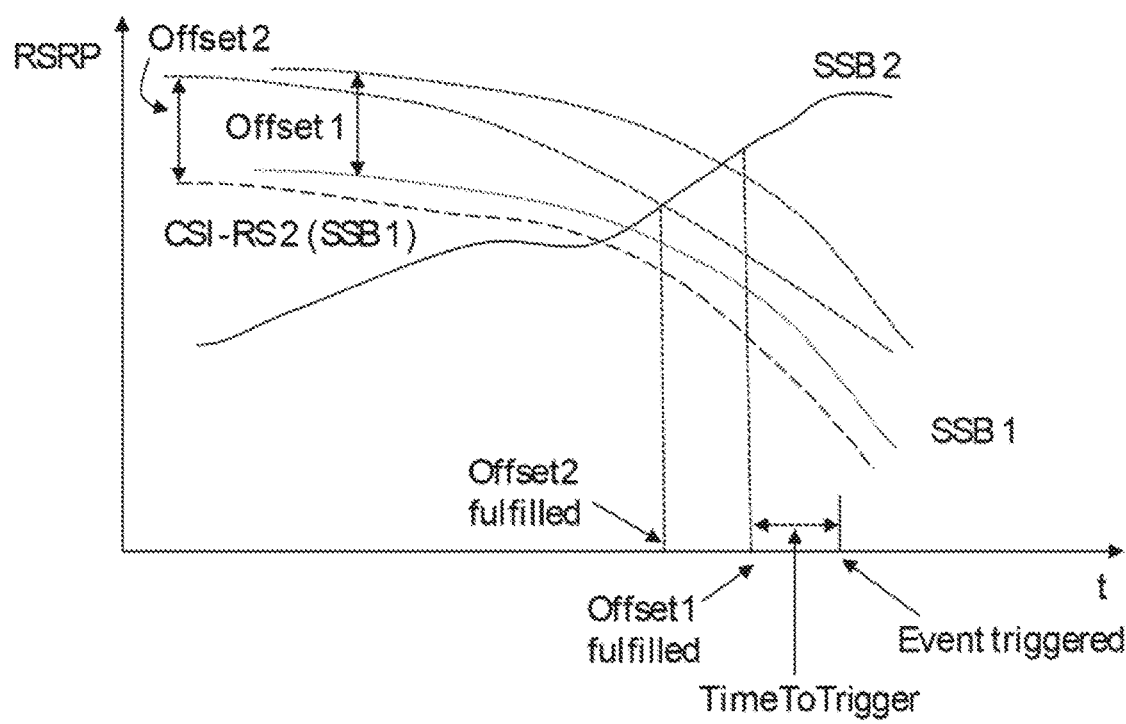

In FIGS. 43A-B, the CSI-RS beam is within own SSB beam—Neighbor SSB becomes offset1 better than Serving CSI-RS AND Neighbor SSB becomes offset2 better than Serving SSB.

Event F6 (variant of event F3) is discussed below with respect to FIGS. 44A-B where Serving SSB becomes worse than threshold1 and Serving CSI-RS becomes better than threshold2.

This event is similar to event F3 and may be used to detect a risk of RLF for CSI-RS and imbalance between downlink and uplink coverage. The difference with event F3 is that the event relates to absolute levels for SSB and CSI-RS instead of relative offset between them.

As an example, a situation can be detected in which a UE is moving within a CSI-RS beam towards a region where the CSI-RS beam coverage stretches too much beyond the underlying SSB beam. If such UE transitions from RRC_CONNECTED to RRC_IDLE, the UE may lose synchronization towards the SSB beam and may become unreachable.

Figure 44A:
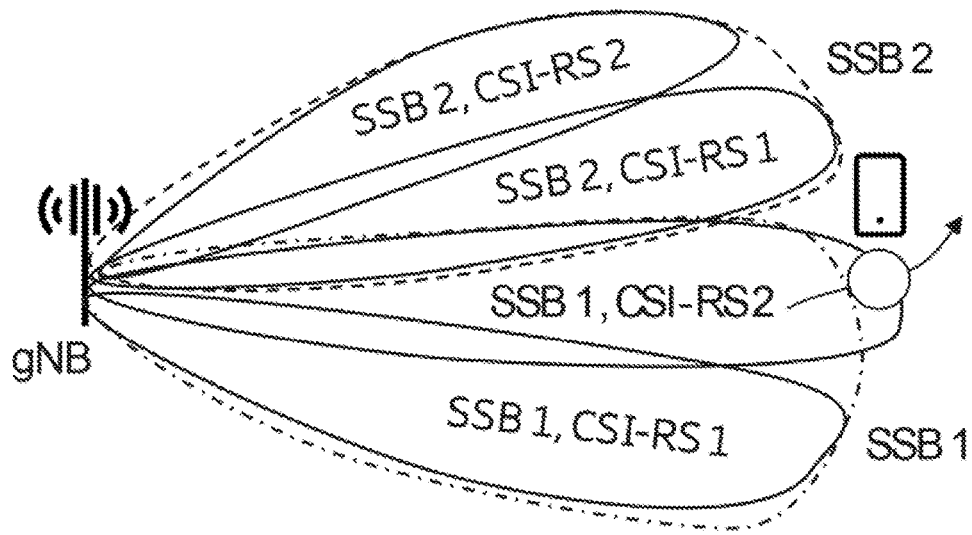
FIGS. 44A-B illustrate an event F6 according to some embodiments of inventive concepts.
Figure 44B:
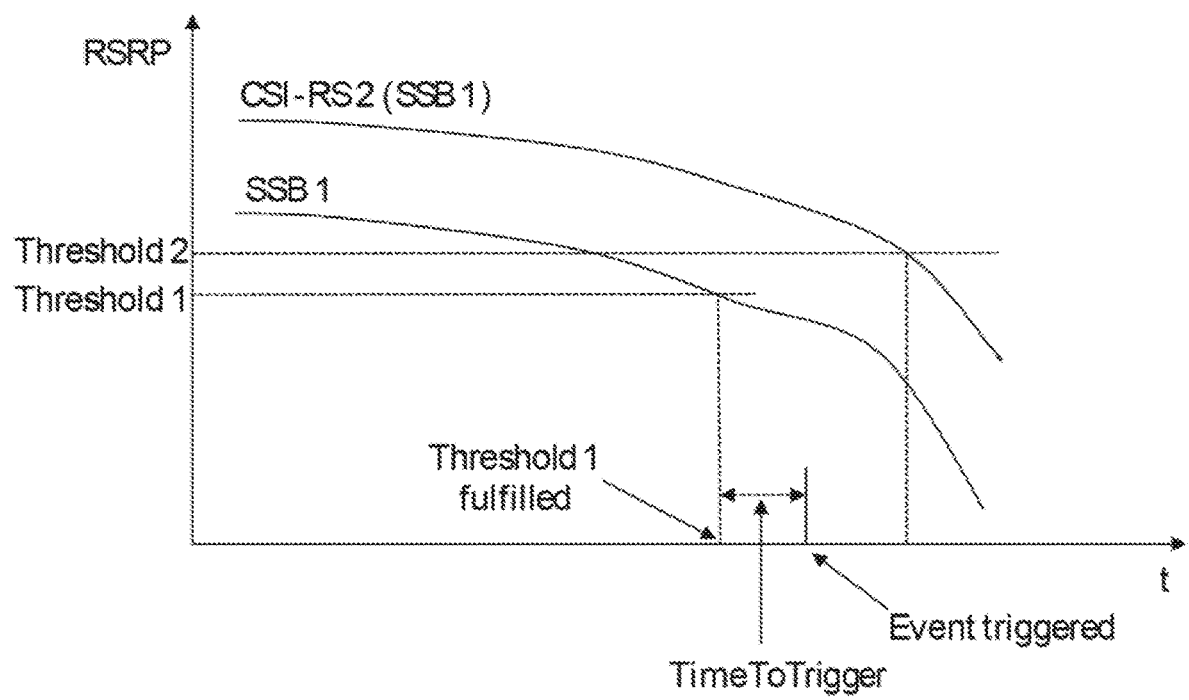

In FIGS. 44A-B, Serving SSB becomes worse than threshold1 and Serving CSI-RS becomes better than threshold2.

Event F7 (variant of event F5) is discussed below with respect to FIGS. 45A-B where Serving CSI-RS becomes better than threshold1 AND.

Serving SSB becomes worse than threshold2 AND Neighbor SSB becomes better than threshold3.

The event can be used to detect sub-optimal coverage between a CSI-RS beam and the corresponding SSB beam in conjunction with a sub-optimal coverage of neighbor SSB beams This event is similar to event F5. It checks the levels (e.g. coverage or quality) of the serving CSI-RS beam, the levels of the (first) corresponding SSB beam and the levels of a second (neighbor) SSB Beam against absolute thresholds instead of relative offsets.

Figure 45A:
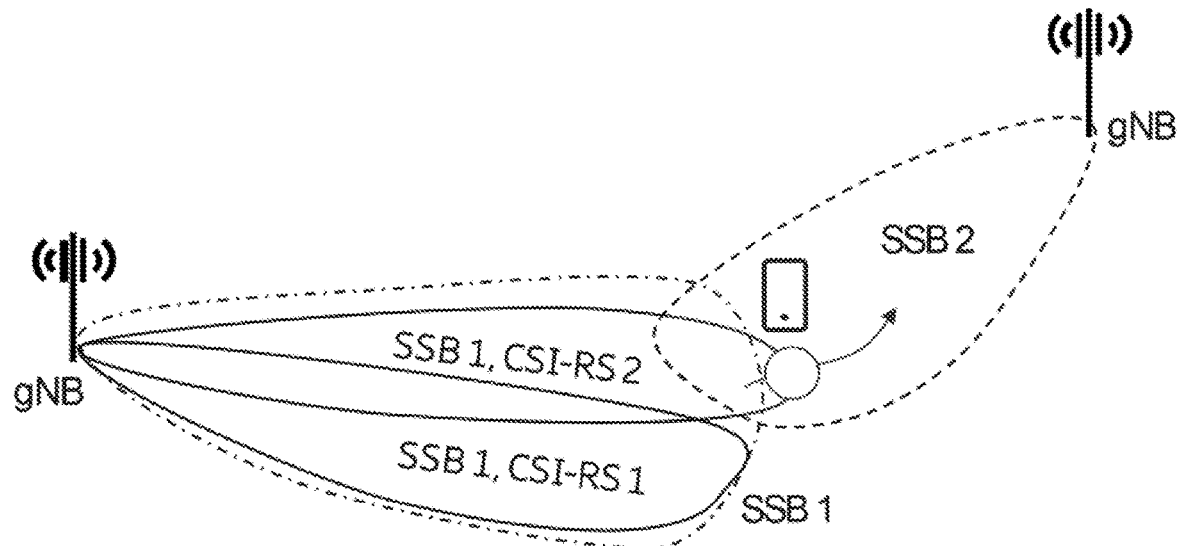
FIGS. 45A-B illustrate an event F7 according to some embodiments of inventive concepts.
Figure 45B:
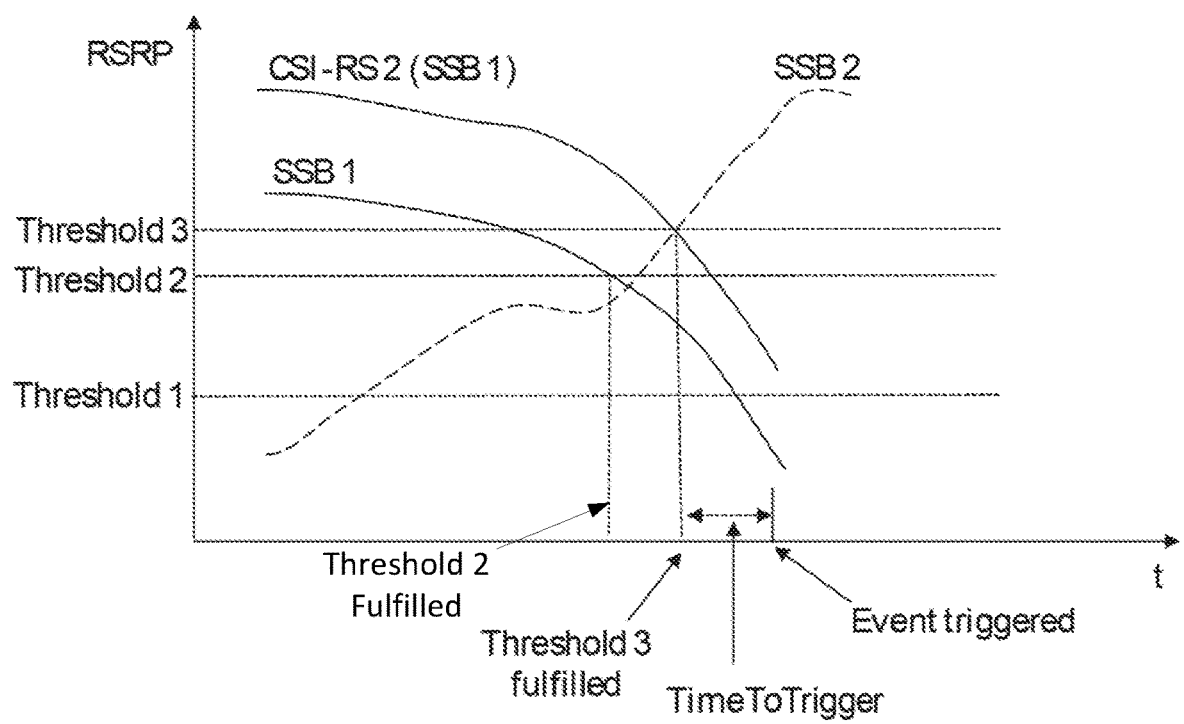

In FIGS. 45A-B, Serving CSI-RS becomes better than threshold1 AND Serving SSB becomes worse than threshold2 AND Neighbor SSB becomes better than threshold3.

Event F8 is discussed below with respect to FIGS. 46A-B where Serving CSI-RS becomes offset better than neighbour SSB.

The event can be used to detect overshooting of CSI-RS beams into a neighbor SSB. This event may reveal a situation where the UE has moved inside the SSB coverage of a neighbour cell while still reporting a good level of CSI-RS signal, which may be indicative of good data channel reception. If the neighbour cell has a data channel coverage that is equivalent to the SSB coverage (coverage of SSB2) then there is a possibility for the UE to be generating high interference towards UEs in the SSB2 coverage area.

Figure 46A:
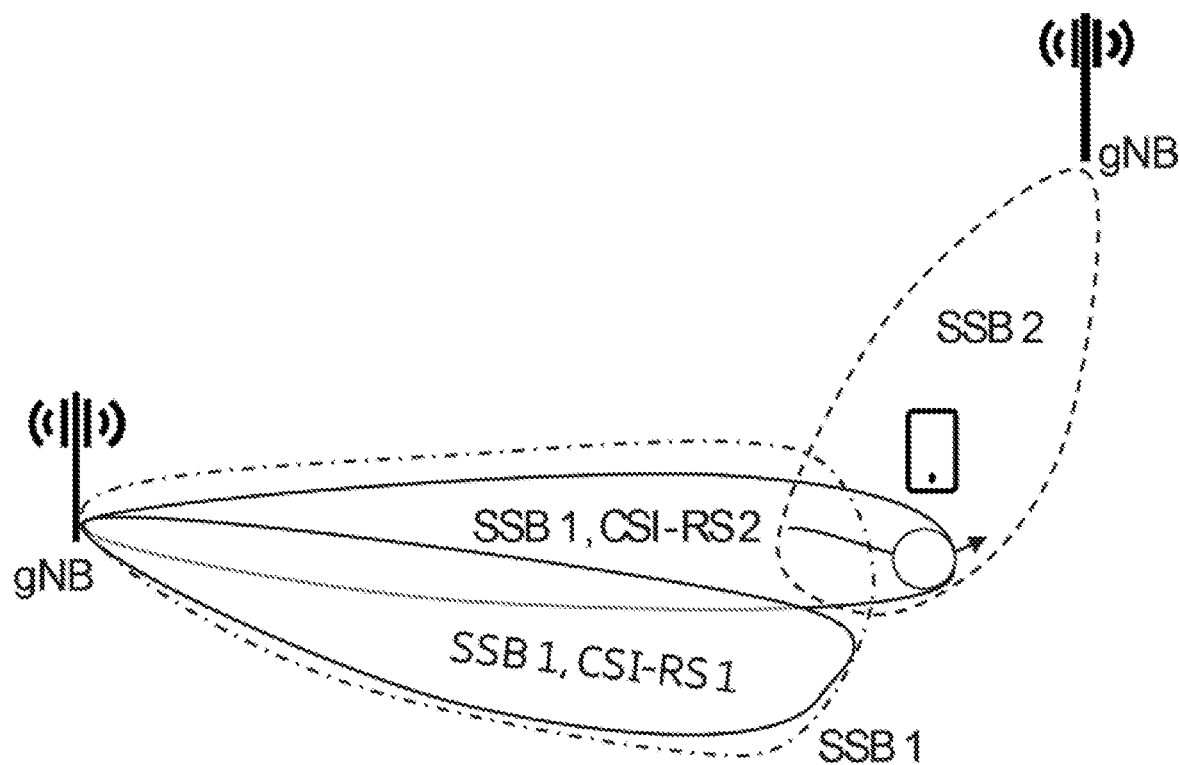
FIGS. 46A-B illustrate an event F8 according to some embodiments of inventive concepts.
Figure 46B:
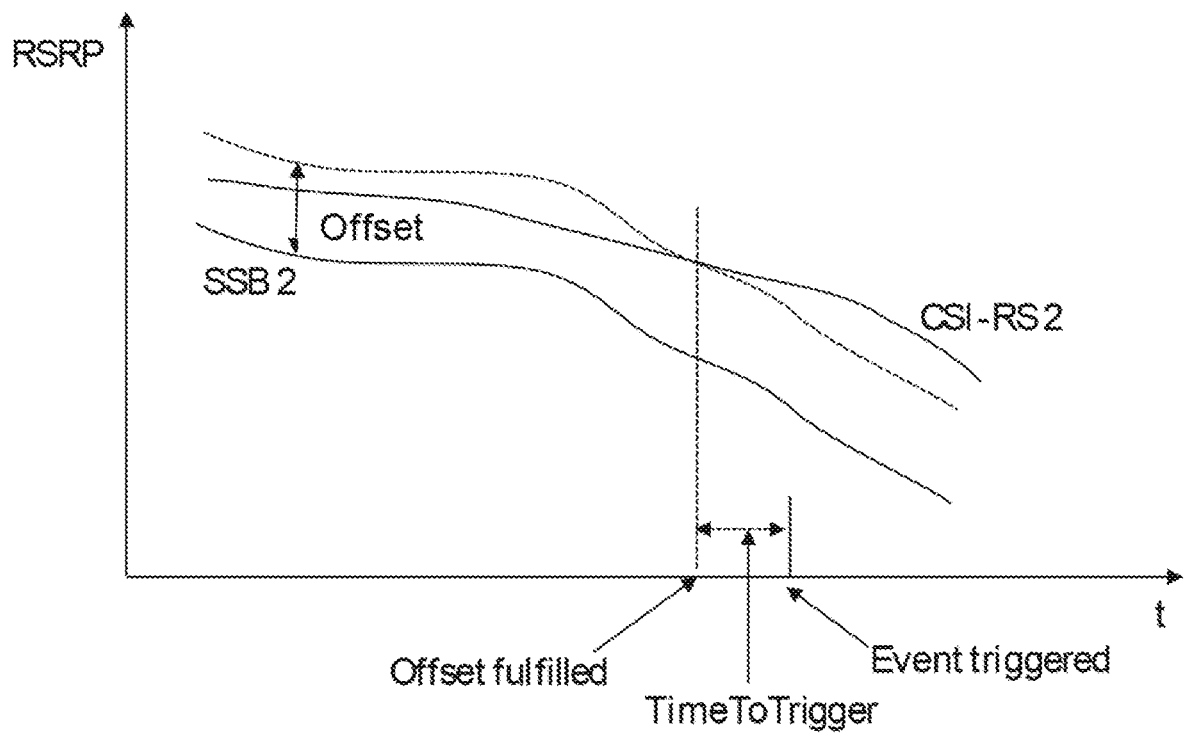

In FIGS. 46A-B, Serving CSI-RS becomes offset better than neighbour SSB.

Event F9 is discussed below with respect to FIGS. 47A-B where Serving CSI-RS becomes better than threshold 1 and neighbour SSB becomes worse than threshold 2.

This event is a variant of Event F8. The difference with Event F8 is that absolute thresholds can be set to compare the signals of served and neighbour nodes.

Figure 47A:
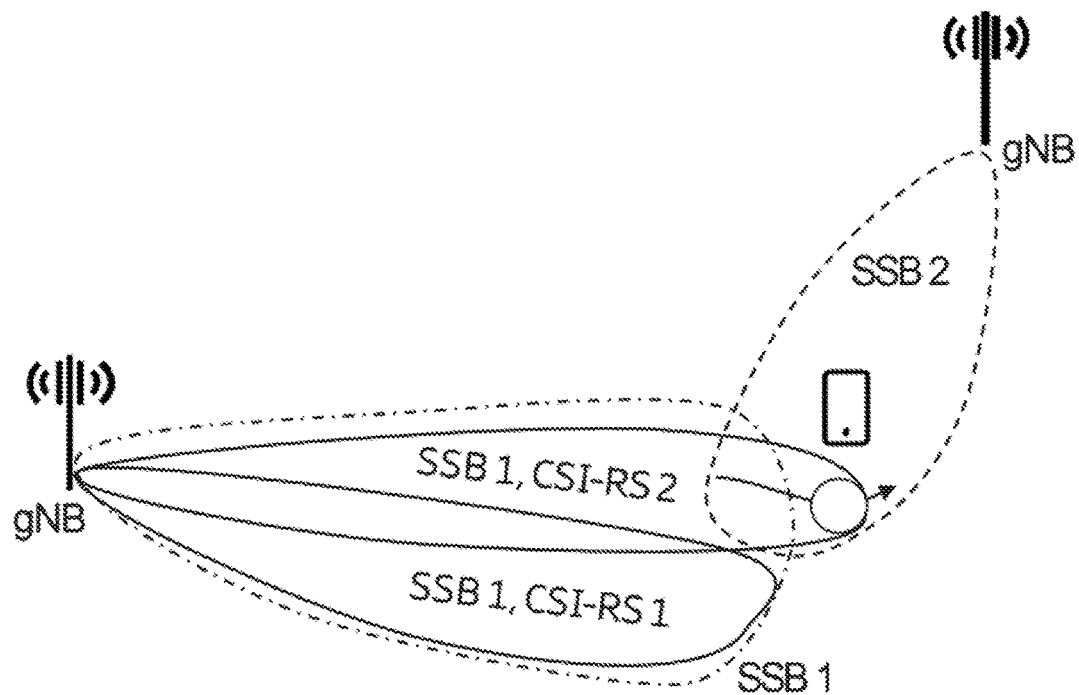
FIGS. 47A-B illustrate an event F9 according to some embodiments of inventive concepts.
Figure 47B:
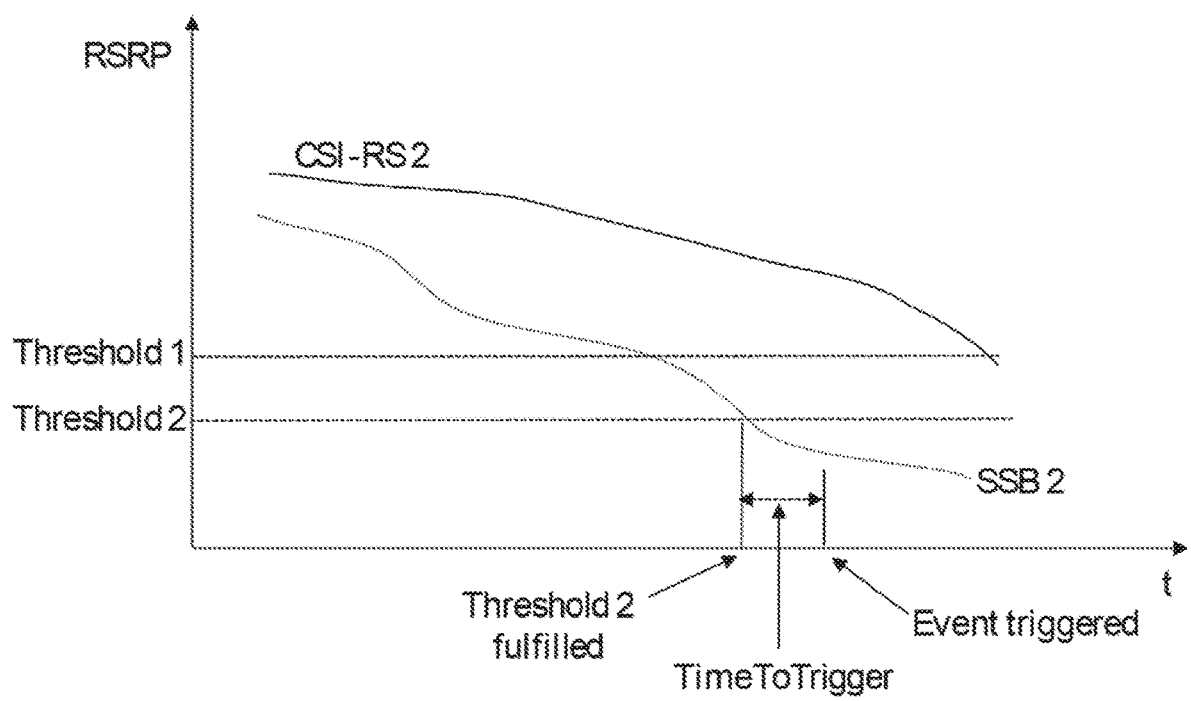

In FIGS. 47A-B, Serving CSI-RS becomes better than threshold 1 and neighbour SSB becomes worse than threshold 2.

Event F10 is discussed below with respect to FIGS. 48A-B where Serving SSB becomes offset better than serving CSI-RS.

This event indicates that there is a coverage disparity between CSI-RS and SSB coverage within the same cell. This event may be highlighting a capacity issue because it may indicate that data channels cannot stretch to cover the whole area where SSB RSs are sufficiently strong. While from a mobility point of view the cell may look feasible, if mobility is based on SSB RS signals, the cell may not be able to offer data channels with sufficiently good signal levels in the location where mobility to the cell is triggered. Possible corrective actions may be to adapt the SSB coverage area of the cell to the CSI RS area, assuming that coverage holes are not generated. Or to increase CSI-RS coverage and match the CSI-RS coverage to the SSB coverage.

Figure 48A:
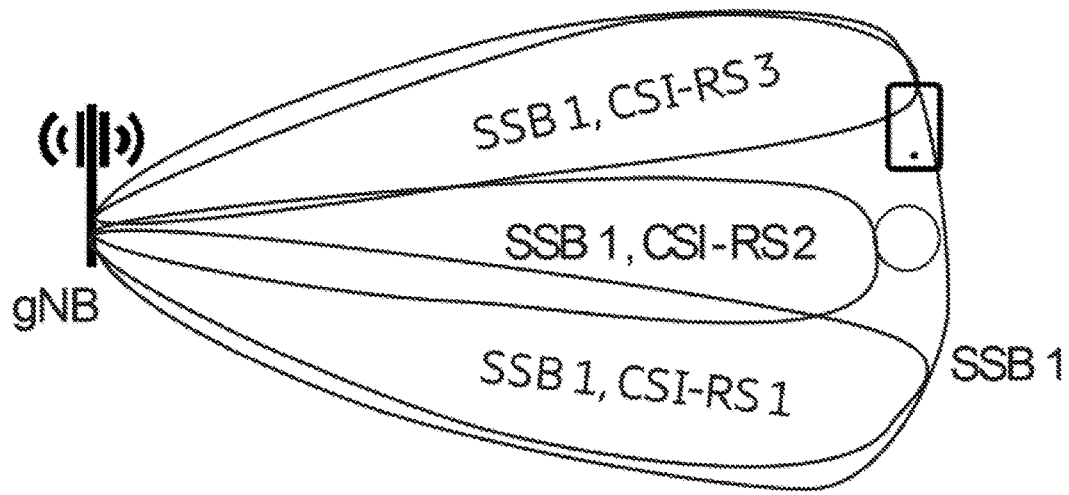
FIGS. 48A-B illustrate an event F10 according to some embodiments of inventive concepts.
Figure 48B:
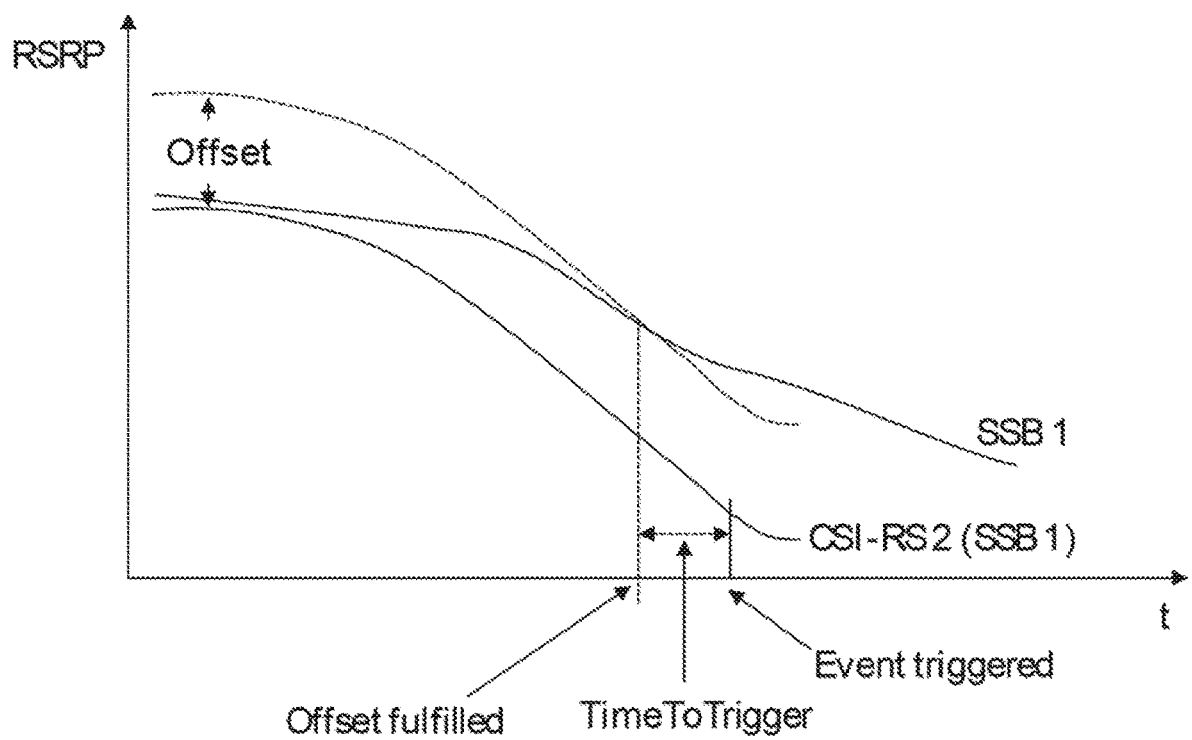

In FIGS. 48A-B, Serving SSB becomes offset better than serving CSI-RS.

Event F11 is discussed below with respect to FIGS. 49A-B where Serving SSB becomes better than threshold1 and serving CSI-RS becomes worse than threshold2.

This event is a variant of Event F10. The difference with Event F10 is that absolute thresholds can be set to compare the signals of serving SSB and serving CSI-RS.

Figure 49A:
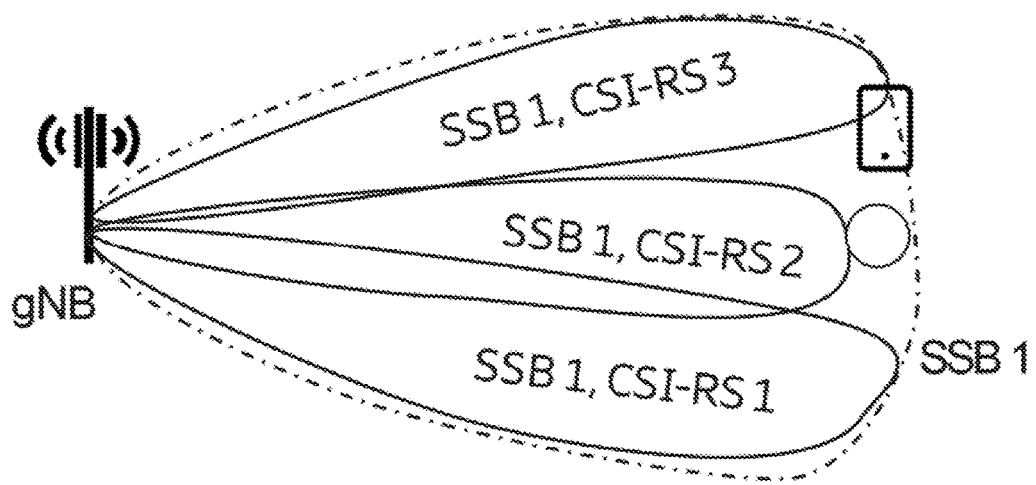
FIGS. 49A-B illustrate an event F11 according to some embodiments of inventive concepts.
Figure 49B:
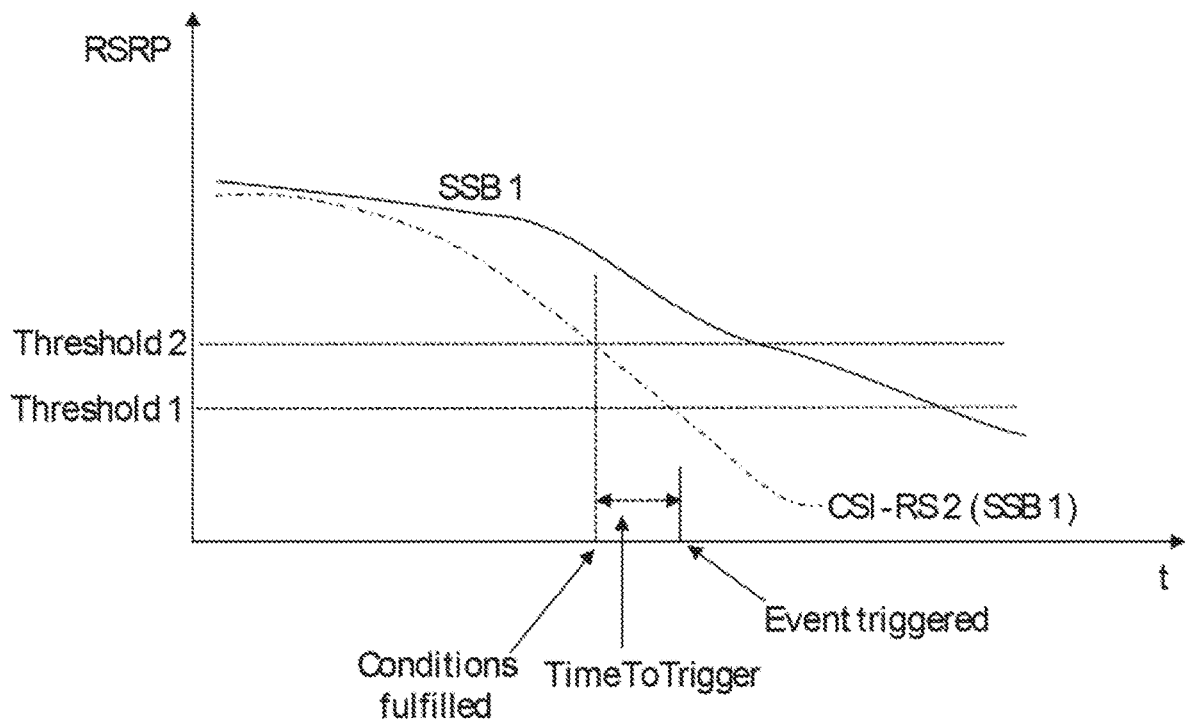

In FIGS. 49A-B, Serving SSB becomes better than threshold1 and serving CSI-RS becomes worse than threshold2.

Event F12 is discussed below with respect to FIGS. 50A-B where Serving cell (PCell or PSCell) SSB becomes worse than threshold and T310 is not running.

A UE that is configured with activated transmission configuration indicator ("TCI")-State of PDCCH based RLM (no RLM resources are configured at all), then the link beam performance dictates whether the UE has any RLM issues or not. If the link beam is continuously tuned towards this UE then the UE might have a good link quality which ensures that the timer T310 is not triggered at the UE. In such scenarios, the UE might have moved out of the coverage of the SSBs.

Having the proposed event ensures that the network can identify such locations where the link beam is overshooting the coverage of the SSBs.

An example of event F12 is provided in FIGS. 50A-B, where the UE is in the external region of the SSB beam (e.g. where RSRP of the SSB beam is below Threshold), and the condition that timer T310 is not running is fulfilled.

Figure 50A:
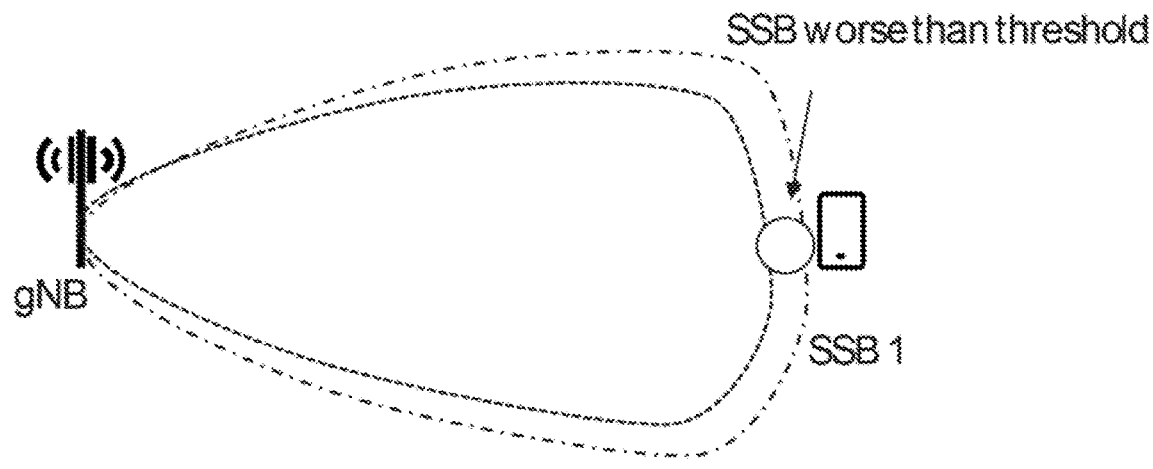
FIGS. 50A-B illustrate an event F12 according to some embodiments of inventive concepts.
Figure 50B:
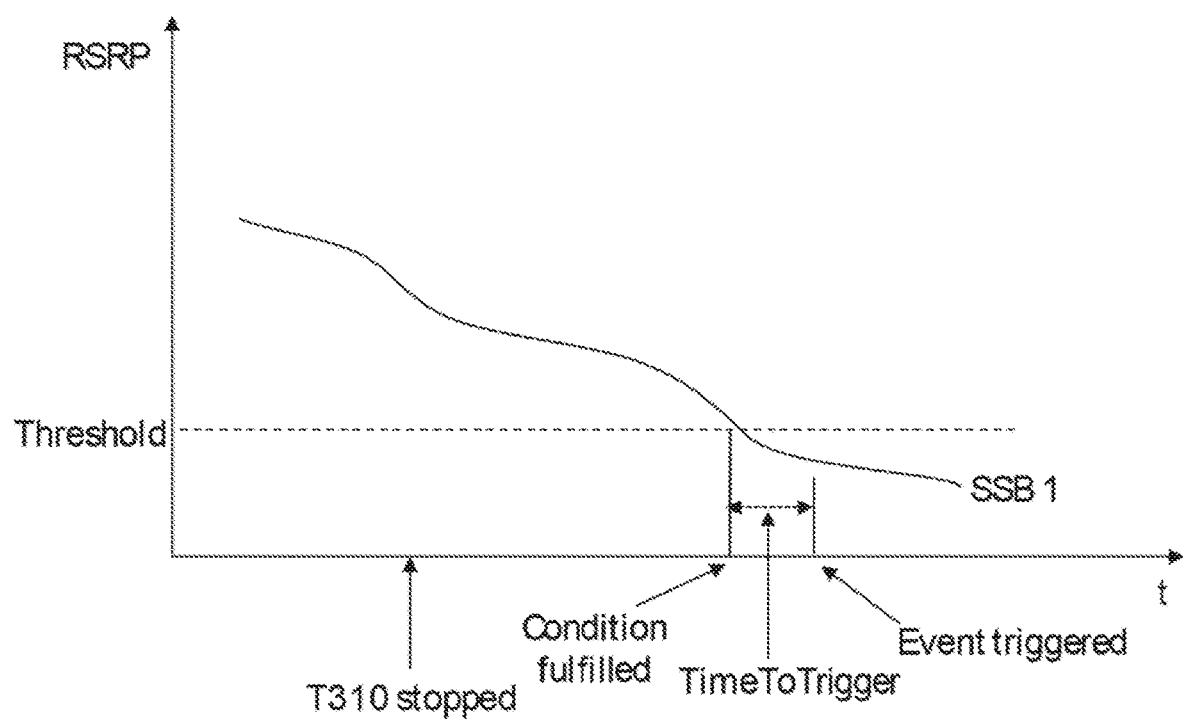

In FIGS. 50A-B, Serving cell (PCell or PSCell) SSB becomes worse than threshold and T310 is not running.

Event F13 is discussed below with respect to FIGS. 51A-B where Serving cell (PCell or PSCell) CSI-RS becomes worse than threshold and T310 is not running.

A UE that is configured with activated TCI-State of PDCCH based RLM (no RLM resources are configured at all), then the link beam performance dictates whether the UE has any RLM issues or not. If the link beam is continuously tuned towards this UE then the UE might have a good link quality which ensures that the timer T310 is not triggered at the UE. In such scenarios, the UE might have moved out of the coverage of the SSBs i.e., the L3 RSRP of the serving cell might be bad.

Having the proposed event ensures that the network can identify such locations where the link beam is overshooting the coverage of the CSI-RSs.

Figure 51A:
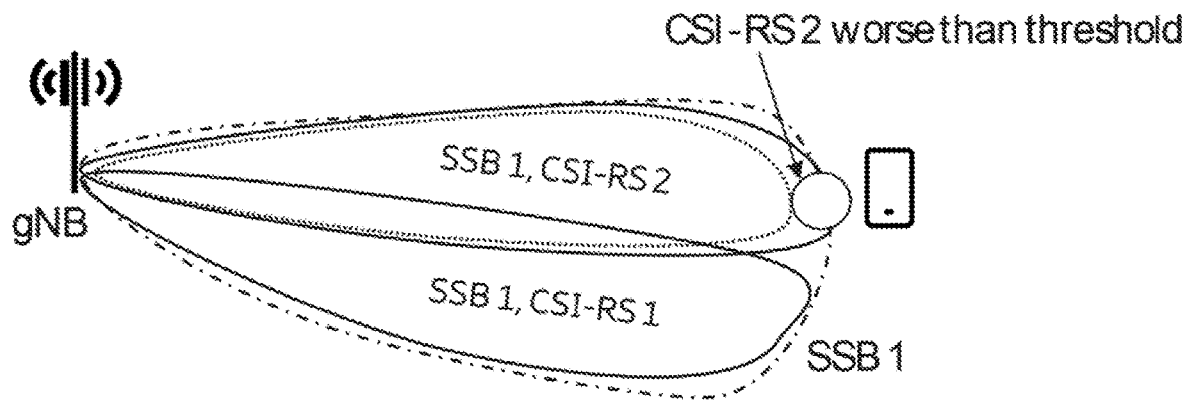
FIGS. 51A-B illustrate an event F13 according to some embodiments of inventive concepts.
Figure 51B:
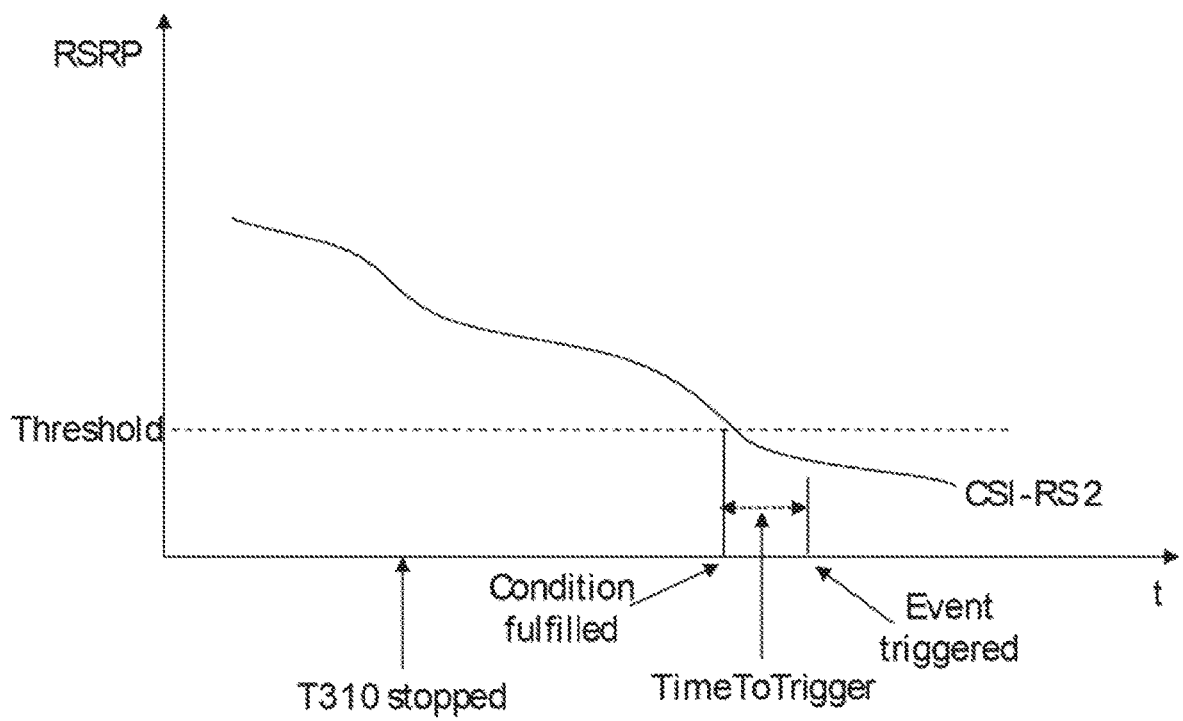

In FIGS. 51A-B, Serving cell (PCell or PSCell) CSI-RS becomes worse than threshold and T310 is not running.

An example of an implementation related to events F1 to F7 according to some embodiments of inventive concepts is discussed below. The text below is based on 3GPP TS 38.331, with additions/modifications according to some embodiments of inventive concepts (e.g., modifying Sections 5.5, 5.5.2, 5.5.3, 5.5.3.3, 5.5.3.3a, 5.5.4, 5.5.4.1, 5.5.5, 5.5.5.1, 5.5.5.2, 5.5.5.3, 6.3.2, 6.4, and 7.4 of TS 38.331, and adding Sections 5.5.4.x1, 5.5.4.x2, 5.5.4.x3, 5.5.4.x4, 5.5.4.x5, 5.5.4.x6, and 5.5.4.x7 to TS 38.331).

A list of reporting configurations where there can be one or multiple reporting configurations per measurement object. Each measurement reporting configuration consists of the following: reporting criterion, RS type, and reporting format. The reporting criterion triggers the UE to send a measurement report. This can either be periodical or a single event description. The RS type is the type of RS that the UE uses for beam and cell measurement results (SS/PBCH block or CSI-RS or both SS/PBCH and CSI-RS). The reporting format indicates the quantities per cell and per beam that the UE includes in the measurement report (e.g. RSRP) and other associated information such as the maximum number of cells and the maximum number beams per cell to report.

Measurement configuration is described below. The UE shall:

1> if the received measConfig includes the measObjectToRemoveList:

2> perform the measurement object removal procedure as specified in 5.5.2.4;

1> if the received measConfig includes the measObjectToAddModList:
  2> perform the measurement object addition/modification procedure as specified in 5.5.2.5;
1> if the received measConfig includes the reportConfigToRemoveList:
  2> perform the reporting configuration removal procedure as specified in 5.5.2.6;
1> if the received measConfig includes the reportConfigToAddModList:
  2> perform the reporting configuration addition/modification procedure as specified in 5.5.2.7;
1> if the received measConfig includes the quantityConfig:
  2> perform the quantity configuration procedure as specified in 5.5.2.8;
1> if the received measConfig includes the measIdToRemoveList:
  2> perform the measurement identity removal procedure as specified in 5.5.2.2;
1> if the received measConfig includes the measIdToAddModList:
  2> perform the measurement identity addition/modification procedure as specified in 5.5.2.3;
1> if the received measConfig includes the measGapConfig:
  2> perform the measurement gap configuration procedure as specified in 5.5.2.9;
1> if the received measConfig includes the measGapSharingConfig:
  2> perform the measurement gap sharing configuration procedure as specified in 5.5.2.11;
1> if the received measConfig includes the s-MeasureConfig:
  2> if s-MeasureConfig is set to ssb-RSRP, set parameter ssb-RSRP of s-MeasureConfig within VarMeasConfig to the lowest value of the RSRP ranges indicated by the received value of s-MeasureConfig;
  2> else, set parameter csi-RSRP of s-MeasureConfig within VarMeasConfig to the lowest value of the RSRP ranges indicated by the received value of s-MeasureConfig.
1> if the received measConfig includes the s-MeasureBeamConfig:
  2> set parameter ssb-RSRP of s-MeasureBeamConfig within VarMeasConfig to the lowest value of the RSRP ranges indicated by the received value of s-MeasureBeamConfig;
  2> set parameter csi-RSRP of s-MeasureBeamConfig within VarMeasConfig to the lowest value of the RSRP ranges indicated by the received value of s-MeasureBeamConfig.

Performing measurements are described below. The UE shall:
1> whenever the UE has a measConfig, perform RSRP and RSRQ measurements for each serving cell for which servingCellMO is configured as follows:
  2> if the reportConfig associated with at least one measId included in the measIdList within VarMeasConfig contains an rsType set to ssb and ssb-ConfigMobility is configured in the measObject indicated by the servingCellMO:
    3> if the reportConfig associated with at least one measId included in the measIdList within VarMeasConfig contains a reportQuantityRS-Indexes and maxNrofRS-IndexesToReport and contains an rsType set to ssb:
      4> derive layer 3 filtered RSRP and RSRQ per beam for the serving cell based on SS/PBCH block, as described in 5.5.3.3a;
    3> derive serving cell measurement results based on SS/PBCH block, as described in 5.5.3.3;
  2> if the reportConfig associated with at least one measId included in the measIdList within VarMeasConfig contains an rsType set to csi-rs and CSI-RS-ResourceConfigMobility is configured in the measObject indicated by the servingCellMO:
    3> if the reportConfig associated with at least one measId included in the measIdList within VarMeasConfig contains a reportQuantityRS-Indexes and maxNrofRS-IndexesToReport and contains an rsType set to csi-rs:
      4> derive layer 3 filtered RSRP and RSRQ per beam for the serving cell based on CSI-RS, as described in 5.5.3.3a;
    3> derive serving cell measurement results based on CSI-RS, as described in 5.5.3.3;
  2> if the reportConfig associated with at least one measId included in the measIdList within VarMeasConfig contains an rsType-r17 set to ssb-and-csi-rs and both ssb-ConfigMobility and CSI-RS-ResourceConfigMobility are configured in the measObject indicated by the servingCellMO:
    3> if the reportConfig associated with at least one measId included in the measIdList within VarMeasConfig contains a reportQuantityRS-Indexes and maxNrofSSB-RS-IndexesToReport:
      4> derive layer 3 filtered RSRP and RSRQ for the serving SS/PBCH block as described in 5.5.3.3a;
    3> derive serving SSB beam measurement results based on SS/PBCH block, as described in 5.5.3.3;
    3> if the reportConfig associated with at least one measId included in the measIdList within VarMeasConfig contains a reportQuantityRS-Indexes and maxNrofCSI-RS-IndexesToReport:
      4> derive layer 3 filtered RSRP and RSRQ per beam for the serving CSI-RS, as described in 5.5.3.3a;
    3> derive serving CSI-RS beam measurement results based on CSI-RS, as described in 5.5.3.3;
1> for each serving cell for which servingCellMO is configured, if the reportConfig associated with at least one measId included in the measIdList within VarMeasConfig contains SINR as trigger quantity and/or reporting quantity:
  2> if the reportConfig contains rsType set to ssb and ssb-ConfigMobility is configured in the servingCellMO:
    3> if the reportConfigcontains a reportQuantityRS-Indexes and maxNrofRS-IndexesToReport:
      4> derive layer 3 filtered SINR per beam for the serving cell based on SS/PBCH block, as described in 5.5.3.3a;
    3> derive serving cell SINR based on SS/PBCH block, as described in 5.5.3.3;
  2> if the reportConfig contains rsType set to csi-rs and CSI-RS-ResourceConfigMobility is configured in the servingCellMO:
    3> if the reportConfigcontains a reportQuantityRS-Indexes and maxNrofRS-IndexesToReport:

4> derive layer 3 filtered SINR per beam for the serving cell based on CSI-RS, as described in 5.5.3.3a;
3> derive serving cell SINR based on CSI-RS, as described in 5.5.3.3;
2> if the reportConfig contains rsType-r17 set to ssb-and-csi-rs and both ssb-ConfigMobility and CSI-RS-ResourceConfigMobility are configured in the servingCellMO:
3> if the reportConfig contains a reportQuantityRS-Indexes and maxNrofSSB-RS-IndexesToReport and maxNrofCSI-RS-IndexesToReport:
4> derive layer 3 filtered SINR for the serving SSB beam based on SS/PBCH block, as described in 5.5.3.3a;
4> derive layer 3 filtered SINR for the serving CSI-RS beam based on CSI-RS, as described in 5.5.3.3a;
3> derive serving SSB beam SINR based on SS/PBCH block, as described in 5.5.3.3;
3> derive serving CSI-RS beam SINR based on CSI-RS, as described in 5.5.3.3;
<Skip text>
2> if the reportType for the associated reportConfig is periodical, eventTriggered or condTriggerConfig or crossBeam-EventTriggered-r17:
3> if a measurement gap configuration is setup, or
3> if the UE does not require measurement gaps to perform the concerned measurements:
4> if s-MeasureConfig is not configured, or
4> if s-MeasureConfig is set to ssb-RSRP and the NR SpCell RSRP based on SS/PBCH block, after layer 3 filtering, is lower than ssb-RSRP, or
4> if s-MeasureConfig is set to csi-RSRP and the NR SpCell RSRP based on CSI-RS, after layer 3 filtering, is lower than csi-RSRP:
5> if the measObject is associated to NR and the rsType is set to csi-rs:
6> if reportQuantityRS-Indexes and maxNrofRS-IndexesToReport for the associated reportConfig are configured:
7> derive layer 3 filtered beam measurements only based on CSI-RS for each measurement quantity indicated in reportQuantityRS-Indexes, as described in 5.5.3.3a;
6> derive cell measurement results based on CSI-RS for the trigger quantity and each measurement quantity indicated in reportQuantityCell using parameters from the associated measObject, as described in 5.5.3.3;
5> if the measObject is associated to NR and the rsType is set to ssb:
6> if reportQuantityRS-Indexes and maxNrofRS-IndexesToReport for the associated reportConfig are configured:
7> derive layer 3 beam measurements only based on SS/PBCH block for each measurement quantity indicated in reportQuantityRS-Indexes, as described in 5.5.3.3a;
6> derive cell measurement results based on SS/PBCH block for the trigger quantity and each measurement quantity indicated in reportQuantityCell using parameters from the associated measObject, as described in 5.5.3.3;
5> if the measObject is associated to E-UTRA:

6> perform the corresponding measurements associated to neighbouring cells on the frequencies indicated in the concerned measObject, as described in 5.5.3.2;
5> if the measObject is associated to UTRA-FDD:
6> perform the corresponding measurements associated to neighbouring cells on the frequencies indicated in the concerned measObject, as described in 5.5.3.2;
4> if the measRSSI-ReportConfig is configured in the associated reportConfig:
5> perform the RSSI and channel occupancy measurements on the frequency indicated in the associated measObject;
4> if s-MeasureBeamConfig is not configured, or
4> if s-MeasureBeamConfig is configured and the RSRP based on SS/PBCH block, after layer 3 filtering, is lower than ssb-RSRP and the RSRP based on CSI-RS, after layer 3 filtering, is lower than csi-RSRP:
5> if the measObject is associated to NR and the rsType-r17 is set to csi-rs:
6> if reportQuantityRS-Indexes and maxNrofCSI-RS-IndexesToReport for the associated reportConfig are configured:
7> derive layer 3 filtered CSI-RS beam measurements only based on CSI-RS for each measurement quantity indicated in reportQuantityRS-Indexes, as described in 5.5.3.3a;
6> derive CSI-RS beam measurement results based on CSI-RS for the trigger quantity and each measurement quantity indicated in reportQuantityBeam using parameters from the associated measObject, as described in 5.5.3.3;
5> if the measObject is associated to NR and the rsType-r17 is set to ssb:
6> if reportQuantityRS-Indexes and maxNrofSSB-RS-IndexesToReport for the associated reportConfig are configured:
7> derive layer 3 SSB beam measurements only based on SS/PBCH block for each measurement quantity indicated in reportQuantityRS-Indexes, as described in 5.5.3.3a;
6> derive SSB beam measurement results based on SS/PBCH block for the trigger quantity and each measurement quantity indicated in reportQuantityBeam using parameters from the associated measObject, as described in 5.5.3.3;
5> if the measObject is associated to NR and the rsType-r17 is set to ssb-and-csi-rs:
6> if reportQuantityRS-Indexes and maxNrofSSB-RS-IndexesToReport and maxNrofCSI-RS-IndexesToReport for the associated reportConfig are configured:
7> derive layer 3 SSB beam measurements based on SS/PBCH block for each measurement quantity indicated in reportQuantityRS-Indexes, as described in 5.5.3.3a;
7> derive layer 3 CSI-RS beam measurements based on CSI-RS for each measurement quantity indicated in reportQuantityRS-Indexes, as described in 5.5.3.3a;
6> derive SSB beam measurement results based on SS/PBCH block for the trigger quantity and each measurement quantity indicated in reportQuantityBeam using parameters from the associated measObject, as described in 5.5.3.3;
6> derive CSI-RS beam measurement results based on CSI-RS for the trigger quantity and each measurement quantity indicated in reportQuantityBeam using parameters from the associated measObject, as described in 5.5.3.3;

Derivation of cell measurement results are described below. The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS) and in the reportConfig (rsType-r17 to be measured, SS/PBCH block and CSI-RS). The UE shall:

1> for each cell measurement quantity to be derived based on SS/PBCH block:
  2> if nrofSS-BlocksToAverage in the associated measObject is not configured; or
  2> if absThresh SS-BlocksConsolidation in the associated measObject is not configured; or
  2> if the highest beam measurement quantity value is below or equal to absThresh SS-BlocksConsolidation:
    3> derive each cell measurement quantity based on SS/PBCH block as the highest beam measurement quantity value, where each beam measurement quantity is described in TS 38.215 [9];
  2> else:
    3> derive each cell measurement quantity based on SS/PBCH block as the linear power scale average of the highest beam measurement quantity values above absThresh SS-BlocksConsolidation where the total number of averaged beams shall not exceed nrofSS-BlocksToAverage;
  2> apply layer 3 cell filtering as described in 5.5.3.2;
1> for each cell measurement quantity to be derived based on CSI-RS:
  2> consider a CSI-RS resource to be applicable for deriving cell measurements when the concerned CSI-RS resource is included in the csi-rs-CellMobility including the physCellId of the cell in the CSI-RS-ResourceConfigMobility in the associated measObject;
  2> if nrofCSI-RS-ResourcesToAverage in the associated measObject is not configured; or
  2> if absThreshCSI-RS-Consolidation in the associated measObject is not configured; or
  2> if the highest beam measurement quantity value is below or equal to absThreshCSI-RS-Consolidation:
    3> derive each cell measurement quantity based on applicable CSI-RS resources for the cell as the highest beam measurement quantity value, where each beam measurement quantity is described in TS 38.215 [9];
  2> else:
    3> derive each cell measurement quantity based on CSI-RS as the linear power scale average of the highest beam measurement quantity values above absThreshCSI-RS-Consolidation where the total number of averaged beams shall not exceed nrofCSI-RS-ResourcesToAverage;
  2> apply layer 3 cell filtering as described in 5.5.3.2.

Derivation of layer 3 beam filtered measurement is described below. The UE shall:

1> for each layer 3 beam filtered measurement quantity to be derived based on SS/PBCH block;
  2> derive each configured beam measurement quantity based on SS/PBCH block as described in TS 38.215 [9], and apply layer 3 beam filtering as described in 5.5.3.2;
1> for each layer 3 beam filtered measurement quantity to be derived based on CSI-RS;
  2> derive each configured beam measurement quantity based on CSI-RS as described in TS 38.215 [9], and apply layer 3 beam filtering as described in 5.5.3.2.

Measurement report triggering is described below. If AS security has been activated successfully, the UE shall:

1> for each measId included in the measIdList within VarMeasConfig:
  2> if the corresponding reportConfig includes a reportType set to eventTriggered or periodical:
    3> if the corresponding measObject concerns NR:
      4> if the eventA1 or eventA2 is configured in the corresponding reportConfig:
        5> consider only the serving cell to be applicable;
      4> if the eventA3 or eventA5 is configured in the corresponding reportConfig:
        5> if a serving cell is associated with a measObjectNR and neighbours are associated with another measObjectNR, consider any serving cell associated with the other measObjectNR to be a neighbouring cell as well;
      4> if corresponding reportConfig includes reportType set to periodical; or
      4> for measurement events other than eventA1 or eventA2:
        5> if useWhiteCel/List is set to true:
          6> consider any neighbouring cell detected based on parameters in the associated measObjectNR to be applicable when the concerned cell is included in the whiteCellsToAddModList defined within the VarMeasConfig for this measId;
        5> else:
          6> consider any neighbouring cell detected based on parameters in the associated measObjectNR to be applicable when the concerned cell is not included in the blackCellsToAddModList defined within the VarMeasConfig for this measId;
    3> else if the corresponding measObject concerns E-UTRA:
      4> if eventB1 or eventB2 is configured in the corresponding reportConfig:
        5> consider a serving cell, if any, on the associated E-UTRA frequency as neighbour cell;
      4> else:
        5> consider any neighbouring cell detected on the associated frequency to be applicable when the concerned cell is not included in the blackCellsToAddModListEUTRAN defined within the VarMeasConfig for this measId;
    3> else if the corresponding measObject concerns UTRA-FDD:
      4> if eventB1-UTRA-FDD or eventB2-UTRA-FDD is configured in the corresponding reportConfig; or
      4> if corresponding reportConfig includes reportType set to periodical:

5> consider a neighbouring cell on the associated frequency to be applicable when the concerned cell is included in the cellsToAddModList defined within the VarMeasConfig for this measId;
2> if the corresponding reportConfig includes a reportType set to crossBeam-EventTriggered-r17
3> if the corresponding measObject concerns NR:
4> if the eventF1 or eventF3 or eventF6 is configured in the corresponding reportConfig:
5> consider only the serving SS/PBCH block Index and the serving CSI-RS Index to be applicable;
4> if the eventF2 or eventF4 or eventF5 or eventF7 is configured in the corresponding reportConfig:
5> if a serving SS/PBCH block Index or a serving CSI-RS Index is associated with a measObjectNR and neighbours are associated with another measObjectNR, consider any serving SS/PBCH block Index or serving CSI-RS Index associated with the other measObjectNR to be a neighbouring SS/PBCH block Index or a neighbouring CSI-RS Index as well;
2> else if the corresponding reportConfig includes a reportType set to reportCGI:
3> consider the cell detected on the associated measObject which has a physical cell identity matching the value of the cellForWhichToReportCGI included in the corresponding reportConfig within the VarMeasConfig to be applicable;
<Skip text>
2> if the reportType is set to eventTriggered and if the entry condition applicable for this event, i.e. the event corresponding with the event/d of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
3> include a measurement reporting entry within the VarMeasReportList for this measId;
3> set the numberOfReportsSent defined within the VarMeasReportList for this measId to 0;
3> include the concerned cell(s) in the cellsTriggeredList defined within the VarMeasReportList for this measId;
3> if useT312 is included in reportConfig for this event:
4> if T310 for the corresponding SpCell is running; and
4> if T312 is not running for corresponding SpCell:
5> start timer T312 for the corresponding SpCell with the value of T312 configured in the corresponding measObjectNR;
3> initiate the measurement reporting procedure, as specified in 5.5.5;
2> else if the reportType is set to eventTriggered and if the entry condition applicable for this event, i.e. the event corresponding with the event/d of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
3> set the numberOfReportsSent defined within the VarMeasReportList for this measId to 0;
3> include the concerned cell(s) in the cellsTriggeredList defined within the VarMeasReportList for this measId;
3> if useT312 is included in reportConfig for this event:
4> if T310 for the corresponding SpCell is running; and
4> if T312 is not running for corresponding SpCell:
5> start timer T312 for the corresponding SpCell with the value of T312 configured in the corresponding measObjectNR;
3> initiate the measurement reporting procedure, as specified in 5.5.5;
2> else if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTriggerdefined within the VarMeasConfig for this event:
3> remove the concerned cell(s) in the cellsTriggeredList defined within the VarMeasReportList for this measId;
3> if reportOnLeave is set to true for the corresponding reporting configuration:
4> initiate the measurement reporting procedure, as specified in 5.5.5;
3> if the cellsTriggeredList defined within the VarMeasReportList for this measId is empty:
4> remove the measurement reporting entry within the VarMeasReportList for this measId;
4> stop the periodical reporting timer for this measId, if running;
2> if the reportType is set to crossBeam-EventTriggered-r17 and if the entry condition applicable for this event, i.e. the event corresponding with the eventId of the corresponding reportConfig within VarMeasConfig, is fulfilled for one or more applicable SSB Index and for one or more CSI-RS Index for all measurements after layer 3 filtering taken during timeToTrigger defined for this event within the VarMeasConfig, while the VarMeasReportList does not include a measurement reporting entry for this measId (a first SSB Index and a first CSI-RS Index trigger the event):
3> include a measurement reporting entry within the VarMeasReportList for this measId;
3> set the numberOfReportsSent defined within the VarMeasReportList for this measId to 0;
3> include the concerned SSB Index and CSI-RS Index in the beamsTriggeredList defined within the VarMeasReportList for this measId;
3> if useT312 is included in reportConfig for this event:
4> if T310 for the corresponding SpCell is running; and
4> if T312 is not running for corresponding SpCell:
5> start timer T312 for the corresponding SpCell with the value of T312 configured in the corresponding measObjectNR;

3> initiate the measurement reporting procedure, as specified in 5.5.5;
2> else if the reportType is set to crossBeam-Event-Triggered-r17 and if the entry condition applicable for this event, i.e. the event corresponding with the eventId of the corresponding reportConfig within VarMeasConfig, is fulfilled for one or more applicable SSB Index or one or more CSI-RS Index not included in the beamsTriggeredList for all measurements after layer 3 filtering taken during timeToTrigger defined for this event within the VarMeasConfig (a subsequent SS/PBCH block or CSI-RS beam triggers the event):
   3> set the numberOfReportsSent defined within the VarMeasReportList for this measId to 0;
   3> include the concerned beam(s) in the beamsTriggeredList defined within the VarMeasReportList for this measId;
   3> if useT312 is included in reportConfig for this event:
     4> if T310 for the corresponding SpCell is running; and
     4> if T312 is not running for corresponding SpCell:
       5> start timer T312 for the corresponding SpCell with the value of T312 configured in the corresponding measObjectNR;
   3> initiate the measurement reporting procedure, as specified in 5.5.5;
2> else if the reportType is set to crossBeam-Event-Triggered-r17 and if the leaving condition applicable for this event is fulfilled for one or more of the SSB Index or CSI-RS Index included in the beamsTriggeredList defined within the VarMeasReportList for this measIdfor all measurements after layer 3 filtering taken during timeToTrigger defined within the VarMeasConfig for this event:
   3> remove the concerned beam(s) in the beamsTriggeredList defined within the VarMeasReportList for this measId;
   3> if reportOnLeave is set to true for the corresponding reporting configuration:
     4> initiate the measurement reporting procedure, as specified in 5.5.5;
   3> if the beamsTriggeredList defined within the VarMeasReportList for this measId is empty:
     4> remove the measurement reporting entry within the VarMeasReportList for this measId;

Event F1 (Serving CSI-RS becomes worse than threshold1 AND Serving SSB becomes better than threshold2) is described below. The UE shall:
   1> consider the entering condition for this event to be satisfied when both condition F1-1 and condition F1-2, as specified below, are fulfilled;
   1> consider the leaving condition for this event to be satisfied when condition F1-3 or condition F1-4, i.e. at least one of the two, as specified below, is fulfilled;

| | |
|---|---|
| $Mcsi\_s + Hys < Thresh1$ | Inequality F1-1 (Entering condition 1) |
| $Mssb\_s - Hys > Thresh2$ | Inequality F1-2 (Entering condition 2) |
| $Mcsi\_s - Hys > Thresh1$ | Inequality F1-3 (Leaving condition 1) |
| $Mssb\_s + Hys < Thresh2$ | Inequality F1-4 (Leaving condition 2) |

The variables in the formula are defined as follows:

Mcsi_s is the measurement result of the serving CSI-RS.

Mssb_s is the measurement result of the serving SSB.

Hys is the hysteresis parameter for this event (i.e. hysteresis as defined within reportConfigNR for this event).

Thresh1 is the threshold parameter for this event (i.e. f1-Threshold1 as defined within reportConfigNR for this event).

Thresh2 is the threshold parameter for this event (i.e. f1-Threshold2 as defined within reportConfigNR for this event).

Mcsi_s is expressed in dBm in case of RSRP, or in dB in case of RSRQ and SINR.

Mssb_s is expressed in dBm in case of RSRP, or in dB in case of RSRQ and SINR.

Hys is expressed in dB.

Thresh1 is expressed in the same unit as Mcsi_s.

Thresh2 is expressed in the same unit as Mssb_s.

Event F2 (Serving CSI-RS becomes worse than threshold1 AND Neighbor SSB becomes better than threshold2) is described below. The UE shall:
   1> consider the entering condition for this event to be satisfied when both condition F2-1 and condition F2-2, as specified below, are fulfilled;
   1> consider the leaving condition for this event to be satisfied when condition F2-3 or condition F2-4, i.e. at least one of the two, as specified below, is fulfilled;

| | |
|---|---|
| $Mcsi\_s + Hys1 < Thresh1$ | Inequality F2-1 (Entering condition 1) |
| $Mssb\_n - Hys2 > Thresh2$ | Inequality F2-2 (Entering condition 2) |
| $Mcsi\_s - Hys1 > Thresh1$ | Inequality F2-3 (Leaving condition 1) |
| $Mssb\_n + Hys2 < Thresh2$ | Inequality F2-4 (Leaving condition 2) |

The variables in the formula are defined as follows:

Mcsi_s is the measurement result of the serving CSI-RS.

Mssb_n is the measurement result of the neighbor SSB.

Hys1 is the hysteresis parameter for this event for condition 1 (i.e. hysteresis1 as defined within reportConfigNR for this event).

Hys2 is the hysteresis parameter for this event for condition 2 (i.e. hysteresis2 as defined within reportConfigNR for this event).

Thresh1 is the threshold parameter for this event (i.e. f2-Threshold1 as defined within reportConfigNR for this event).

Thresh2 is the threshold parameter for this event (i.e. f2-Threshold2 as defined within reportConfigNR for this event).

Mcsi_s is expressed in dBm in case of RSRP, or in dB in case of RSRQ and SINR.

Mssb_n is expressed in dBm in case of RSRP, or in dB in case of RSRQ and SINR.

Hys1, Hys2 are expressed in dB.

Thresh1 is expressed in the same unit as Mcsi_s.

Thresh2 is expressed in the same unit as Mssb_n.

Event F3 (Serving SSB becomes worse than threshold AND Serving CSI-RS becomes offset better than Serving SSB) is described below. The UE shall:
   1> consider the entering condition for this event to be satisfied when both condition F3-1 and condition F3-2, as specified below, are fulfilled;

1> consider the leaving condition for this event to be satisfied when condition F3-3 or condition F3-4, i.e. at least one of the two, as specified below, is fulfilled;

$Mssb\_s+Hys1<Thresh$    Inequality F3-1 (Entering condition 1)

$Mcsi\_s-Hys2>Mssb\_s+Off$    Inequality F3-2 (Entering condition 2)

$Mssb\_s-Hys1>Thresh$    Inequality F3-3 (Leaving condition 1)

$Mcsi\_s+Hys2<Mssb\_s+Off$    Inequality F3-4 (Leaving condition 2)

The variables in the formula are defined as follows:
Mcsi_s is the measurement result of the serving CSI-RS.
Mssb_s is the measurement result of the serving SSB.
Hys1 is the hysteresis parameter for this event for condition 1 (i.e. hysteresis1 as defined within reportConfigNR for this event).
Hys2 is the hysteresis parameter for this event for condition 2 (i.e. hysteresis2 as defined within reportConfigNR for this event).
Thresh is the threshold parameter for this event (i.e. f3-Threshold as defined within reportConfigNR for this event).
Mcsi_s is expressed in dBm in case of RSRP, or in dB in case of RSRQ and SINR.
Mssb_s is expressed in dBm in case of RSRP, or in dB in case of RSRQ and SINR.
Off is the offset parameter for this event (i.e. f3-Offset as defined within reportConfigNR for this event).
Hys1, Hys2, Offare expressed in dB.
Thresh is expressed in the same unit as Mssb_s.

Event F4 (Neighbor SSB becomes amount of offset better than Serving CSI-RS) is described below. The UE shall:
1> consider the entering condition for this event to be satisfied when condition F4-1, as specified below, is fulfilled;
1> consider the leaving condition for this event to be satisfied when condition F4-2, as specified below, is fulfilled;
1> for this measurement, consider the (secondary) cell corresponding to the measObjectNR associated to this event to be the serving cell.
NOTE: The reference signal(s) of the SSB and the reference signal(s) of the CSI-RS are both indicated in the associated measObjectNR.

$Mssb\_n-Hys>Mcsi\_s+Off$    Inequality F4-1 (Entering condition)

$Mssb\_n+Hys<Mcsi\_s+Off$    Inequality F4-2 (Leaving condition)

The variables in the formula are defined as follows:
Mssb_n is the measurement result of the neighbouring SSB.
Mcsi_s is the measurement result of the serving CSI-RS.
Hys is the hysteresis parameter for this event (i.e. hysteresis as defined within reportConfigNR for this event).
Offis the offset parameter for this event (i.e. f4-Offset as defined within reportConfigNR for this event).
Mn, Ms are expressed in dBm in case of RSRP, or in dB in case of RSRQ and RS-SINR.
Hys, Offare expressed in dB.

Event F5 (Neighbor SSB becomes offset1 better than Serving CSI-RS AND Neighbor SSB becomes offset2 better than Serving SSB) is described below. The UE shall:
1> consider the entering condition for this event to be satisfied when both condition F5-1 and condition F5-2, as specified below, are fulfilled;
1> consider the leaving condition for this event to be satisfied when condition F5-3 or condition F5-4, i.e. at least one of the two, as specified below, is fulfilled;

$Mssb\_n-Hys1>Mcsi\_s+Off1$    Inequality F5-1 (Entering condition 1)

$Mssb\_n-Hys2>Mssb\_s+Off2$    Inequality F5-2 (Entering condition 2)

$Mssb\_n+Hys1<Mcsi\_s+Off1$    Inequality F5-3 (Leaving condition 1)

$Mssb\_n+Hys2<Mssb\_s+Off2$    Inequality F5-4 (Leaving condition 2)

The variables in the formula are defined as follows:
Mssb_s is the measurement result of the serving SSB.
Mssb_n is the measurement result of the neighbouring SSB.
Mcsi_s is the measurement result of the serving CSI-RS.
Hys1 is the hysteresis parameter for this event for condition 1 (i.e. hysteresis1 as defined within reportConfigNR for this event).
Hys2 is the hysteresis parameter for this event for condition 2 (i.e. hysteresis2 as defined within reportConfigNR for this event).
Off1 is the offset parameter for this event for condition 1 (i.e. f5-Offset1 as defined within reportConfigNR for this event).
Off2 is the offset parameter for this event for condition 2 (i.e. f5-Offset2 as defined within reportConfigNR for this event).
Mssb_s, Mssb_n, Mcsi_s are expressed in dBm in case of RSRP, or in dB in case of RSRQ and RS-SINR.
Hys1, Hys2, Off1, Off2 are expressed in dB.

Event F6 (Serving SSB becomes worse than threshold1 and Serving CSI-RS becomes better than threshold2) is described below. The UE shall:
1> consider the entering condition for this event to be satisfied when both condition F6-1 and condition F6-2, as specified below, are fulfilled;
1> consider the leaving condition for this event to be satisfied when condition F6-3 or condition F6-4, i.e. at least one of the two, as specified below, is fulfilled;

$Mssb\_s+Hys1<Thresh1$    Inequality F6-1 (Entering condition 1)

$Mcsi\_s-Hys2>Thresh2$    Inequality F6-2 (Entering condition 2)

$Mssb\_s-Hys1>Thresh1$    Inequality F6-3 (Leaving condition 1)

$Mcsi\_s+Hys2<Thresh2$    Inequality F6-4 (Leaving condition 2)

The variables in the formula are defined as follows:
Mssb_s is the measurement result of the serving SSB.
Mcsi_s is the measurement result of the serving CSI-RS.
Hys1 is the hysteresis parameter for this event for condition 1 (i.e. hysteresis1 as defined within reportConfigNR for this event).
Hys2 is the hysteresis parameter for this event for condition 2 (i.e. hysteresis2 as defined within reportConfigNR for this event).
Thresh1 is the threshold parameter for this event (i.e. f6-Threshold1 as defined within reportConfigNR for this event).
Thresh2 is the threshold parameter for this event (i.e. f6-Threshold2 as defined within reportConfigNR for this event).
Mssb_s, Mcsi_s are expressed in dBm in case of RSRP, or in dB in case of RSRQ and RS-SINR.
Hys1, Hys2 are expressed in dB.
Thresh1 is expressed in the same unit as Mssb_s.
Thresh2 is expressed in the same unit as Mcsi_s.

Event F7 (Serving CSI-RS becomes better than threshold1 AND Serving SSB becomes worse than threshold2 AND Neighbor SSB becomes better than threshold3) is described below. The UE shall:
  1> consider the entering condition for this event to be satisfied when all conditions F7-1, condition F7-2 and condition F7-3, as specified below, are fulfilled;
  1> consider the leaving condition for this event to be satisfied when condition F7-4 or condition F7-5 or condition F7-6, i.e. at least one of the three, as specified below, is fulfilled;

| | |
|---|---|
| $Mcsi\_s - Hys1 > Thresh1$ | Inequality F7-1 (Entering condition 1) |
| $Mssb\_s + Hys2 < Thresh2$ | Inequality F7-2 (Entering condition 2) |
| $Mssb\_n - Hys3 > Thresh3$ | Inequality F7-3 (Entering condition 3) |
| $Mcsi\_s + Hys1 < Thresh1$ | Inequality F7-4 (Leaving condition 1) |
| $Mssb\_s - Hys2 > Thresh2$ | Inequality F7-5 (Leaving condition 2) |
| $Mssb\_n + Hys3 < Thresh3$ | Inequality F7-6 (Leaving condition 2) |

Figure 52:
FIG. 52 is a message diagram illustrating measurement reporting from a communication device UE to a network according to some embodiments of inventive concepts.

The variables in the formula are defined as follows:
Mssb_s is the measurement result of the serving SSB.
Mssb_n is the measurement result of the neighbor SSB.
Mcsi_s is the measurement result of the serving CSI-RS.
Hys1 is the hysteresis parameter for this event for condition 1 (i.e. hysteresis1 as defined within reportConfigNR for this event).
Hys2 is the hysteresis parameter for this event for condition 2 (i.e. hysteresis2 as defined within reportConfigNR for this event).
Hys2 is the hysteresis parameter for this event for condition 3 (i.e. hysteresis3 as defined within reportConfigNR for this event).
Thresh1 is the threshold parameter for this event (i.e. f7-Threshold1 as defined within reportConfigNR for this event).
Thresh2 is the threshold parameter for this event (i.e. f7-Threshold2 as defined within reportConfigNR for this event).
Thresh3 is the threshold parameter for this event (i.e. f7-Threshold3 as defined within reportConfigNR for this event).
Mssb_s, Mssb_n, Mcsi_s are expressed in dBm in case of RSRP, or in dB in case of RSRQ and RS-SINR.
Hys1, Hys2, Hys3 are expressed in dB.
Thresh1 is expressed in the same unit as Mcsi_s.
Thresh2 is expressed in the same unit as Mssb_s.
Thresh2 is expressed in the same unit as Mssb_n.
FIG. 52 is a data flow diagram illustrating an example of measurement reporting procedure. The purpose of this procedure is to transfer measurement results from the UE to the network. The UE shall initiate this procedure only after successful AS security activation.
For the measId for which the measurement reporting procedure was triggered, the UE shall set the measResults within the MeasurementReport message as follows:
  1> set the measId to the measurement identity that triggered the measurement reporting;
  1> for each serving cell configured with servingCellMO:
    2> if the reportConfig associated with the measId that triggered the measurement reporting includes rsType:
      3> if the serving cell measurements based on the rsType included in the reportConfig that triggered the measurement report are available:
        4> set the measResultServingCell within measResultServingMOList to include RSRP, RSRQ and the available SINR of the serving cell, derived based on the rsType included in the reportConfig that triggered the measurement report;
    2> if the reportConfig associated with the measId that triggered the measurement reporting includes rsType-r17:
      3> if the serving beam measurements based on the rsType-r17 included in the reportConfig that triggered the measurement report are available:
        4> set the measResultServSSBBeam to include RSRP, RSRQ and the available SINR of the serving SS/PBCH Block, derived based on the rsType-r17 included in the reportConfig that triggered the measurement report;
    2> else:
      3> if SSB based serving cell measurements are available:
        4> set the measResultServingCell within measResultServingMOList to include RSRP, RSRQ and the available SINR of the serving cell, derived based on SSB;
      3> else if CSI-RS based serving cell measurements are available:
        4> set the measResultServingCell within measResultServingMOList to include RSRP, RSRQ and the available SINR of the serving cell, derived based on CSI-RS;
  1> set the servCellId within measResultServingMOList to include each NR serving cell that is configured with servingCellMO, if any;
  1> if the reportConfig associated with the measId that triggered the measurement reporting includes reportQuantityRS-Indexes and maxNrofRS-IndexesToReport:
    2> for each serving cell configured with servingCellMO, include beam measurement information according to the associated reportConfig as described in 5.5.5.2;
  1> if the reportConfig associated with the measId that triggered the measurement reporting includes reportAddNeighMeas:
    2> for each measObjectId referenced in the measIdList which is also referenced with servingCellMO, other than the measObjectId corresponding with the measId that triggered the measurement reporting:
      3> if the measObjectNR indicated by the servingCellMO includes the RS resource configuration corresponding to the rsType indicated in the reportConfig:
        4> set the measResultBestNeighCell within measResultServingMOList to include the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR;
        4> if the reportConfig associated with the measId that triggered the measurement reporting includes reportQuantityRS-Indexes and maxNrofRS-IndexesToReport:
     5> for each best non-serving cell included in the measurement report:
          6> include beam measurement information according to the associated reportConfig as described in 5.5.5.2;
1> if the reportConfig associated with the measId that triggered the measurement reporting includes reportAddNeighSSBMeas:
  2> for each measObjectId referenced in the measIdList which is also referenced with servingCellMO, other than the measObjectId corresponding with the measId that triggered the measurement reporting:
    3> if the measObjectNR indicated by the servingCellMO includes the RS resource configuration corresponding to the rsType-r17 indicated in the reportConfig:
      4> set the measResultBestNeighSSBBeam to include the physCellId and the available measurement quantities based on the reportQuantityBeam and rsType-r17 indicated in reportConfig of the non-serving SS/PBCH blocks corresponding to the concerned measObjectNR with the highest measured RSRP if RSRP measurement results are available for SS/PBCH block corresponding to this measObjectNR, otherwise with the highest measured RSRQ if RSRQ measurement results are available for SS/PBCH blocks corresponding to this measObjectNR, otherwise with the highest measured SINR;
      4> if the reportConfig associated with the measId that triggered the measurement reporting includes reportQuantityRS-Indexes and maxNrofCSI-RS-IndexesToReport:
        5> for each best non-serving SS/PBCH block included in the measurement report:
          6> include SS/PBCH block measurement information according to the associated reportConfig as described in 5.5.5.2;
1> if the reportConfig associated with the measId that triggered the measurement reporting is set to eventTriggered and eventID is set to eventA3, or eventA4, or eventA5, or eventB1, or eventB2:
  2> if the UE is in NE-DC and the measurement configuration that triggered this measurement report is associated with the MCG:
    3> set the measResultServFreqListEUTRA-SCG to include an entry for each E-UTRA SCG serving frequency with the following:
      4> include carrierFreq of the E-UTRA serving frequency;
      4> set the measResultServingCell to include the available measurement quantities that the UE is configured to measure by the measurement configuration associated with the SCG;
      4> if reportConfig associated with the measId that triggered the measurement reporting includes reportAddNeighMeas:
        5> set the measResultServFreqListEUTRA-SCG to include within measResultBestNeighCell the quantities of the best non-serving cell, based on RSRP, on the concerned serving frequency;

1> if reportConfig associated with the measId that triggered the measurement reporting is set to eventTriggered and eventID is set to eventA3, or eventA4, or eventA5:
  2> if the UE is in NR-DC and the measurement configuration that triggered this measurement report is associated with the MCG:
    3> set the measResultServFreqListNR-SCG to include for each NR SCG serving cell that is configured with servingCellMO, if any, the following:
      4> if the reportConfig associated with the measId that triggered the measurement reporting includes rsType:
        5> if the serving cell measurements based on the rsType included in the reportConfig that triggered the measurement report are available according to the measurement configuration associated with the SCG:
          6> set the measResultServingCell within measResultServFreqListNR-SCG to include RSRP, RSRQ and the available SINR of the serving cell, derived based on the rsType included in the reportConfig that triggered the measurement report;
      4> else:
        5> if SSB based serving cell measurements are available according to the measurement configuration associated with the SCG:
          6> set the measResultServingCell within measResultServFreqListNR-SCG to include RSRP, RSRQ and the available SINR of the serving cell, derived based on SSB;
        5> else if CSI-RS based serving cell measurements are available according to the measurement configuration associated with the SCG:
          6> set the measResultServingCell within measResultServFreqListNR-SCG to include RSRP, RSRQ and the available SINR of the serving cell, derived based on CSI-RS;
      4> if results for the serving cell derived based on SSB are included:
        5> include the ssbFrequency to the value indicated by ssbFrequency as included in the MeasObjectNR of the serving cell;
      4> if results for the serving cell derived based on CSI-RS are included:
        5> include the refFreqCSI-RS to the value indicated by refFreqCSI-RS as included in the MeasObjectNR of the serving cell;
      4> if the reportConfig associated with the measId that triggered the measurement reporting includes reportQuantityRS-Indexes and maxNrofRS-IndexesToReport:
        5> for each serving cell configured with servingCellMO, include beam measurement information according to the associated reportConfig as described in 5.5.5.2, where availability is considered according to the measurement configuration associated with the SCG;
      4> if reportConfig associated with the measId that triggered the measurement reporting includes reportAddNeighMeas:
        5> if the measObjectNR indicated by the servingCellMO includes the RS resource configuration corresponding to the rsType indicated in the reportConfig:

6> set the measResultBestNeighCellListNR within measResultServFreqListNR-SCG to include one entry with the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR, where availability is considered according to the measurement configuration associated with the SCG;
7> if the reportConfig associated with the measId that triggered the measurement reporting includes reportQuantityRS-Indexes and maxNrofRS-IndexesToReport:
8> for each best non-serving cell included in the measurement report:
9> include beam measurement information according to the associated reportConfig as described in 5.5.5.2, where availability is considered according to the measurement configuration associated with the SCG;
1> if the measRSSI-ReportConfig is configured within the corresponding reportConfig for this measId:
2> set the rssi-Result to the average of sample value(s) provided by lower layers in the reportInterval;
2> set the channelOccupancy to the rounded percentage of sample values which are beyond the channelOccupancyThreshold within all the sample values in the reportInterval;
1> if there is at least one applicable neighbouring cell to report:
2> if the reportType is set to eventTriggered or periodical:
3> set the measResultNeighCells to include the best neighbouring cells up to maxReportCells in accordance with the following:
4> if the reportType is set to eventTriggered:
5> include the cells included in the cellsTriggeredList as defined within the VarMeasReportList for this measId;
4> else:
5> include the applicable cells for which the new measurement results became available since the last periodical reporting or since the measurement was initiated or reset;
4> for each cell that is included in the measResultNeighCells, include the physCellId;
4> if the reportType is set to eventTriggered or periodical:
5> for each included cell, include the layer 3 filtered measured results in accordance with the reportConfig for this measId, ordered as follows:
6> if the measObject associated with this measId concerns NR:
7> if rsType in the associated reportConfig is set to ssb:
8> set resultsSSB-Cell within the measResult to include the SS/PBCH block based quantity(ies) indicated in the reportQuantityCell within the concerned reportConfig, in decreasing order of the sorting quantity, determined as specified in 5.5.5.3, i.e. the best cell is included first;
8> if reportQuantityRS-Indexes and maxNrofRS-IndexesToReport are configured, include beam measurement information as described in 5.5.5.2;
7> else if rsType in the associated reportConfig is set to csi-rs:
8> set resultsCSI-RS-Cell within the measResult to include the CSI-RS based quantity(ies) indicated in the reportQuantityCell within the concerned reportConfig, in decreasing order of the sorting quantity, determined as specified in 5.5.5.3, i.e. the best cell is included first;
8> if reportQuantityRS-Indexes and maxNrofRS-IndexesToReport are configured, include beam measurement information as described in 5.5.5.2;
6> if the measObject associated with this measId concerns E-UTRA:
7> set the measResult to include the quantity(ies) indicated in the reportQuantity within the concerned reportConfigInterRAT in decreasing order of the sorting quantity, determined as specified in 5.5.5.3, i.e. the best cell is included first;
6> if the measObject associated with this measId concerns UTRA-FDD and if ReportConfigInterRAT includes the reportQuantityUTRA-FDD:
7> set the measResult to include the quantity(ies) indicated in the reportQuantityUTRA-FDD within the concerned reportConfigInterRAT in decreasing order of the sorting quantity, determined as specified in 5.5.5.3, i.e. the best cell is included first;
2> if the reportType is set to crossBeam-EventTriggered-ri7:
3> set the measResultNeighSSBBeams to include the best neighbouring SS/PBCH block up to maxReportSSBBeam in accordance with the following:
4> include the beams included in the beamsTriggeredList as defined within the VarMeasReportList for this measId;
4> for each SS/PBCH block that is included in the measResultNeighSSBBeams, include the physCellId;
4> for each included SS/PBCH block, include the layer 3 filtered measured results in accordance with the reportConfig for this measId, ordered as follows:
5> set resultsSSB-Beam within the measResultSSBBeam to include the SS/PBCH block based quantity(ies) indicated in the reportQuantityBeam within the concerned reportConfig, in decreasing order of the sorting quantity, determined as specified in 5.5.5.3, i.e. the best beam is included first;
6> if reportQuantityRS-Indexes and maxNrofSSB-RS-IndexesToReport are configured, include SSB beam measurement information as described in 5.5.5.2;
5> set resultsCSIRS-Beam within the measResultCSIRSBeam to include the CSI-RS beam based quantity(ies) indicated in the reportQuantityBeam within the concerned reportConfig, in decreasing order of the sorting quantity, determined as specified in 5.5.5.3, i.e. the best beam is included first;
      6> if reportQuantityRS-Indexes and maxNrofCSI-RS-IndexesToReport are configured, include CSI-RS beam measurement information as described in 5.5.5

Reporting of beam measurement information is described below. For beam measurement information to be included in a measurement report the UE shall:
1> if reportType is set to eventTriggered or crossBeam-EventTriggered-r17:
  2> consider the trigger quantity as the sorting quantity if available, otherwise RSRP as sorting quantity if available, otherwise RSRQ as sorting quantity if available, otherwise SINR as sorting quantity;
1> if reportType is set to periodical:
  2> if a single reporting quantity is set to true in reportQuantityRS-Indexes;
    3> consider the configured single quantity as the sorting quantity;
  2> else:
    3> if rsrp is set to true;
      4> consider RSRP as the sorting quantity;
    3> else:
      4> consider RSRQ as the sorting quantity;
1> set rsIndexResults to include up to maxNrofRS-IndexesToReport SS/PBCH block indexes or CSI-RS indexes in order of decreasing sorting quantity as follows:
  2> if the measurement information to be included is based on SS/PBCH block:
    3> include within resultsSSB-Indexes the index associated to the best beam for that SS/PBCH block sorting quantity and if absThreshSS-Blocks-Consolidation is included in the VarMeasConfig for the measObject associated to the cell for which beams are to be reported, the remaining beams whose sorting quantity is above absThreshSS-BlocksConsolidation;
    3> if includeBeamMeasurements is configured, include the SS/PBCH based measurement results for the quantities in reportQuantityRS-Indexes set to true for each SS/PBCH block index;
  2> else if the beam measurement information to be included is based on CSI-RS:
    3> include within resultsCSI-RS-Indexes the index associated to the best beam for that CSI-RS sorting quantity and, if absThreshCCSI-RS-Consolidation is included in the VarMeasConfig for the measObject associated to the cell for which beams are to be reported, the remaining beams whose sorting quantity is above absThreshCCSI-RS-Consolidation;
    3> if includeBeamMeasurements is configured, include the CSI-RS based measurement results for the quantities in reportQuantityRS-Indexes set to true for each CSI-RS index.

Sorting of cell measurement results is described below. The UE shall determine the sorting quantity according to parameters of the reportConfig associated with the measId that triggered the reporting:
1> if the reportType is set to eventTriggered:
  2> for an NR cell, consider the quantity used in the aN-Threshold (for eventA1, eventA2 and eventA4) or in the a5-Threshold2 (for eventA5) or in the aN-Offset (for eventA3 and eventA6) as the sorting quantity;
  2> for an E-UTRA cell, consider the quantity used in the bN-ThresholdEUTRA as the sorting quantity;
  2> for an UTRA-FDD cell, consider the quantity used in the bN-ThresholdUTRA-FDD as the sorting quantity;
1> if the reportType is set to crossBeam-EventTriggered-r17:
  2> for an SS/PBCH Block or a CSI-RS beam of an NR cell, consider the quantity used in the fN-Threshold1 (for eventF1, eventF2, eventF6 and eventF7) or in the fN-Threshold2 (for eventF1, eventF2, eventF6 and eventF7) or in the f7-Threshold3 for eventF7 or in the fN-Offset (for eventF3 and eventF4) or f5-Offset1 and f5-Offset2 for eventF5 as the sorting quantity;
1> if the reportType is set to periodical:
  2> determine the sorting quantity according to reportQuantityCell for an NR cell, and according to reportQuantity for an E-UTRA cell, as below:
    3> if a single quantity is set to true:
      4> consider this quantity as the sorting quantity;
    3> else:
      4> if rsrp is set to true;
        5> consider RSRP as the sorting quantity;
      4> else:
        5> consider RSRQ as the sorting quantity;
  2> determine the sorting quantity according to reportQuantityUTRA-FDD for UTRA-FDD cell, as below:
    3> if a single quantity is set to true:
      4> consider this quantity as the sorting quantity;
    3> else:
      4> consider RSCP as the sorting quantity.

Radio resource control information elements are described below. FIG. 58 illustrates an example of a MeasConfig information element ("IE"). The IE MeasConfig specifies measurements to be performed by the UE, and covers intra-frequency, inter-frequency and inter-RAT mobility as well as configuration of measurement gaps. FIG. 59 is a table illustrating an example of MeasConfig field descriptions.

FIG. 60 illustrates an example of a MeasResults IE. The IE MeasResults covers measured results for intra-frequency, inter-frequency, and inter-RAT mobility. FIG. 61 is a table illustrating an example of MeasResultNR field descriptions. FIG. 62 is a table illustrating an example of MeasResults field descriptions. FIG. 63 is a table illustrating an example of MeasResultSSBBeam field descriptions. FIG. 64 is a table illustrating an example of MeasResultCSIRSBeam field descriptions.

FIG. 65 illustrates an example of a ReportConfigNR IE. The ReportConfigNR IE specifies criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS.

Event A1: Serving becomes better than absolute threshold.

Event A2: Serving becomes worse than absolute threshold.

Event A3: Neighbour becomes amount of offset better than PCell/PSCell.

Event A4: Neighbour becomes better than absolute threshold.

Event A5: PCell/PSCell becomes worse than absolute threshold1 AND Neighbour/SCell becomes better than another absolute threshold2.

Event A6: Neighbour becomes amount of offset better than SCell.

For event I1, measurement reporting event is based on CLI measurement results, which can either be derived based on SRS-RSRP or CLI-RSSI.

Event I1: Interference becomes higher than absolute threshold.

Event F1: Serving CSI-RS becomes worse than threshold1 AND Serving SSB becomes better than threshold2.

Event F2: Serving CSI-RS becomes worse than threshold1 AND Neighbor SSB becomes better than threshold2.

Event F3: Serving SSB becomes worse than threshold AND Serving CSI-RS becomes offset better than Serving SSB.

Event F4: Neighbor SSB becomes amount of offset better than Serving CSI-RS.

Event F5: Neighbor SSB becomes offset1 better than Serving CSI-RS AND Neighbor SSB becomes offset2 better than Serving SSB.

Event F6: Serving SSB becomes worse than threshold1 and Serving CSI-RS becomes better than threshold2.

Event F7: Serving CSI-RS becomes better than threshold1 AND Serving SSB becomes worse than threshold2 AND Neighbor SSB becomes better than threshold3.

FIG. 65 illustrates a ReportConfigNR IE. FIG. 66 is a table illustrating CrossBeam-EventTriggeredConfig field descriptions. FIG. 67 illustrates an example of maximum indices for reporting.

FIG. 68 illustrates an example of a NR-UE-variables IE. FIG. 69 illustrates an example of a VarMeasConfig IE. The UE variable VarMeasConfig includes the accumulated configuration of the measurements to be performed by the UE, covering intra-frequency, inter-frequency and inter-RAT mobility related measurements. FIG. 70 illustrates an example of a VarMeasReportList IE. The UE variable VarMeasReportList includes information about the measurements for which the triggering conditions have been met.

Operations of the communication device 5300 (implemented using the structure of the block diagram of FIG. 53) will now be discussed with reference to the flow chart of FIG. 56 according to some embodiments of inventive concepts. For example, modules may be stored in memory 5305 of FIG. 53, and these modules may provide instructions so that when the instructions of a module are executed by respective communication device processing circuitry 5303, processing circuitry 5303 performs respective operations of the flow chart.

According to some embodiments at block 5605, processing circuitry 5303 receives (through transceiver 5301) a measurement configuration from the wireless communication network over a radio interface. The measurement configuration defines a measurement report triggering event based on a measurement of a first reference signal and a measurement of a second reference signal. The first and second reference signals are different.

According to some embodiments at block 5609, processing circuitry 5303 detects a measurement report triggering event based on a measurement of the first reference signal received by the communication device and based on a measurement of the second reference signal received by the communication device. Moreover, the measurement report triggering event is detected based on the measurement configuration. The measurements of the first and second reference signals may be performed based on reception of the first and second reference signals through transceiver 301.

According to some embodiments at block 5615, processing circuitry 5303 transmits (through transceiver 5301) a measurement report to the wireless communication network responsive to detecting the measurement report triggering event. The measurement report includes at least one of the measurement of the first reference signal and/or the measurement of the second reference signal.

Figure 56:
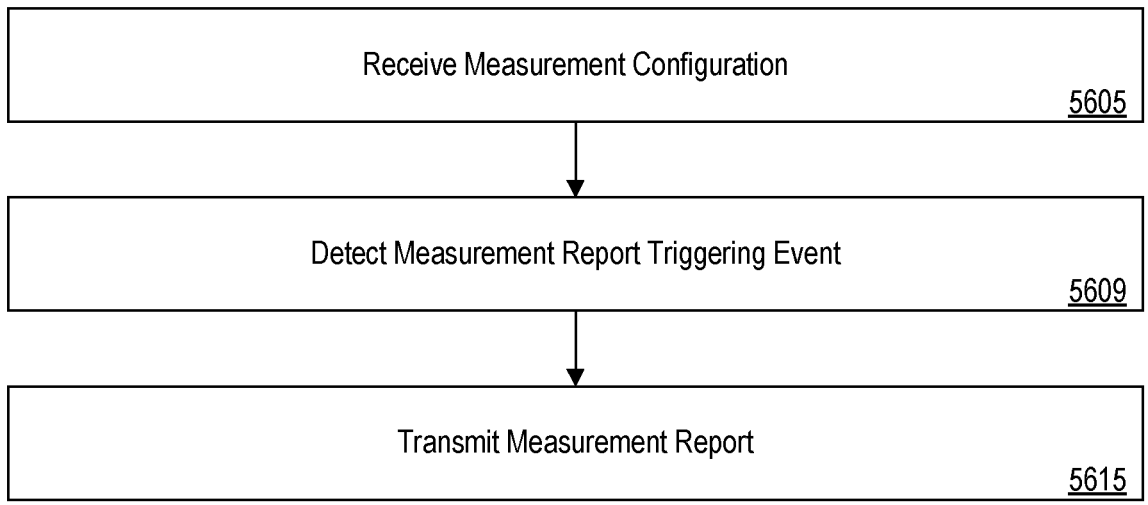
FIG. 56 is a flow chart illustrating operations of a communication device of FIG. 53 according to some embodiments of inventive concepts.

Various operations of FIG. 56 are discussed in greater detail above with respect to events F1 to F13 and below with respect to Example Embodiments 1-39.

Various operations from the flow chart of FIG. 56 may be optional with respect to some embodiments of communication devices and related methods. Regarding methods of example embodiment 1 (set forth below), for example, operations of block 5605 of FIG. 56 may be optional.

Operations of a RAN node 5400 (implemented using the structure of FIG. 54) will now be discussed with reference to the flow chart of FIG. 57 according to some embodiments of inventive concepts. For example, modules may be stored in memory 5405 of FIG. 54, and these modules may provide instructions so that when the instructions of a module are executed by respective RAN node processing circuitry 5403, processing circuitry 5403 performs respective operations of the flow chart.

According to some embodiments at block 5705, processing circuitry 5403 transmits (through transceiver 5401) a measurement configuration over a radio interface to a communication device. The measurement configuration defines a measurement report triggering event based on a measurement of a first reference signal received by the communication device and based on a measurement of a second reference signal received by the communication device. The first and second reference signals are different.

According to some embodiments at block 5709, processing circuitry 5403 receives (through transceiver 5401) a measurement report from the communication device including at least one of the measurement of the first reference signal and/or the measurement of the second reference signal. The measurement report is provided by the communication device based on the measurement configuration.

Figure 57:
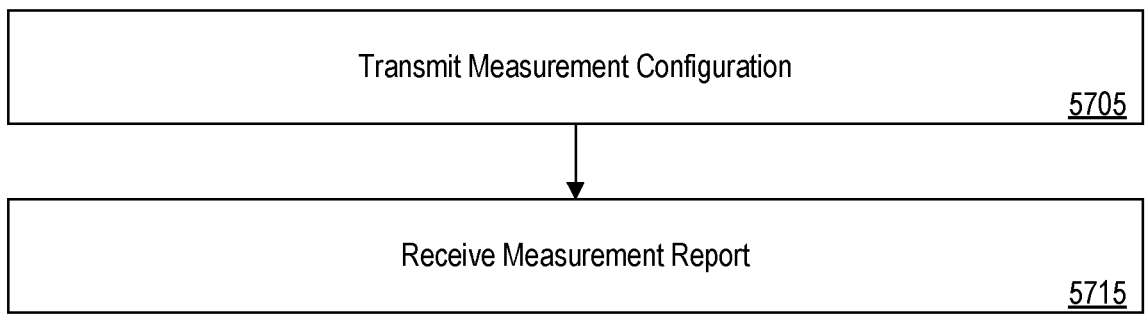
FIG. 57 is a flow chart illustrating operations of a RAN node of FIG. 54 according to some embodiments of inventive concepts.

Various operations of FIG. 57 are discussed in greater detail above with respect to events F1 to F13 and below with respect to Example Embodiments 40-76.

Various operations from the flow chart of FIG. 57 may be optional with respect to some embodiments of RAN nodes and related methods.

Example embodiments are discussed below.

Embodiment 1. A method of operating a communication device in a wireless communication network, the method comprising:

detecting (5609) a measurement report triggering event based on a measurement of a first reference signal received by the communication device and based on a measurement of a second reference signal received by the communication device, wherein the first and second reference signals are different; and transmitting (5615) a measurement report to the wireless communication network responsive to detecting the measurement report triggering event, wherein the measurement report includes at least one of the measurement of the first reference signal and/or the measurement of the second reference signal.

Embodiment 2. The method of Embodiment 1, wherein the measurement report includes the measurement of the first reference signal and the measurement of the second reference signal.

Embodiment 3. The method of any of Embodiments 1-2, wherein the measurement of the first reference signal is a measurement of a received power/quality of the first reference signal and wherein the measurement of the second reference signal is a measurement of a received power/quality of the second reference signal.

Embodiment 4. The method of Embodiment 3, wherein the received power/quality of the first reference signal comprises at least one of a reference signal received power, RSRP, of the first reference signal, a reference signal received quality, RSRQ, of the first reference signal, and/or a signal to interference and noise ratio, SINR, of the first reference signal, and wherein the received power/quality of the second reference signal comprises at least one of an RSRP of the second reference signal, an RSRQ of the second reference signal, and/or an SINR of the second reference signal.

Embodiment 5. The method of any of Embodiments 1-4, wherein the measurement report triggering event is detected based on comparing the measurement of the first reference signal and the measurement of the second reference signal.

Embodiment 6. The method of any of Embodiments 1-5, wherein the measurement report triggering event is detected based on comparing the measurement of the first reference signal with a threshold.

Embodiment 7. The method of any of Embodiments 1-5, wherein the measurement report triggering event is detected based on comparing the measurement of the second reference signal with a threshold.

Embodiment 8. The method of any of Embodiments 1-5, wherein the measurement report triggering event is detected based on comparing the measurement of the first reference signal with a first threshold and based on comparing the measurement of the second reference signal with a second threshold.

Embodiment 9. The method of any of Embodiments 1-8, wherein the first reference signal is a channel state information reference signal, CSI-RS, and the second reference signal is a synchronization signal block, SSB, reference signal.

Embodiment 10. The method of any of Embodiments 1-8, wherein the first reference signal is a synchronization signal block, SSB, reference signal, and the second reference signal is a radio link monitoring, RLM, reference signal.

Embodiment 11. The method of any of Embodiments 1-8, wherein the first reference signal is a channel state information reference signal, CSI-RS, and the second reference signal is a radio link monitoring, RLM, reference signal.

Embodiment 12. The method of any of Embodiments 10-11, wherein the RLM reference signal comprises one of a synchronization signal block, SSB, reference signal, a channel state information reference signal, CSI-RS, and a Tracking Reference Signal.

Embodiment 13. The method of any of Embodiments 1-2, wherein the measurement report triggering event is detected based on the measurement of the first reference signal, based on the measurement of the second reference signal, and based on a measurement of a third reference signal received by the communication device, wherein the first and third reference signals are different, and wherein the second and third reference signals are different.

Embodiment 14. The method of Embodiment 13, wherein the measurement of the first reference signal is a measurement of a received power/quality of the first reference signal, wherein the measurement of the second reference signal is a measurement of a received power/quality of the second reference signal, and wherein the measurement of the third reference signal is a measurement of a received power/quality of the third reference signal.

Embodiment 15. The method of Embodiment 14, wherein the received power/quality of the first reference signal comprises at least one of a reference signal received power, RSRP, of the first reference signal, a reference signal received quality, RSRQ, of the first reference signal, and/or a signal to interference and noise ratio, SINR, of the first reference signal, wherein the received power/quality of the second reference signal comprises at least one of an RSRP of the second reference signal, an RSRQ of the second reference signal, and/or an SINR of the second reference signal, and wherein the received power/quality of the third reference signal comprises at least one of an RSRP of the third reference signal, an RSRQ of the third reference signal, and/or an SINR of the third reference signal.

Embodiment 16. The method of any of Embodiments 14-15, wherein the measurement report triggering event is detected based on the measurement of the received power/quality of the first reference signal being greater than a first threshold, based on the measurement of the received power/quality of the second reference signal being less than a second threshold, and based on the measurement of the received power/quality of the third reference signal being greater than a third threshold.

Embodiment 17. The method of any of Embodiments 14-16, wherein the first reference signal is a serving channel state information reference signal, CSI-RS, wherein the second reference signal is a serving synchronization signal block, SSB, reference signal, and wherein the third reference signal is a neighbor SSB reference signal.

Embodiment 18. The method of any of Embodiment 14-15, wherein the measurement report triggering event is detected based on the measurement of the received power/quality of the first reference signal being greater than the measurement of the received power/quality of the second reference signal by a first offset, and based on the measurement of the received power/quality of the first reference signal being greater than the measurement of the received power/quality of the third reference signal by a second offset.

Embodiment 19. The method of any of Embodiment 14, 15, or 18, wherein the first reference signal is a neighbor synchronization signal block, SSB, reference signal, wherein the second reference signal is a serving channel state information reference signal, CSI-RS, and wherein the third reference signal is a serving synchronization signal block, SSB, reference signal.

Embodiment 20. The method of any of Embodiments 3-4, wherein the measurement report triggering event is detected based on the measurement of the received power/quality of the first reference signal being less than a first threshold and based on the measurement of the received power/quality of the second reference signal being greater than a second threshold.

Embodiment 21. The method of Embodiment 20, wherein the first reference signal is a serving channel state information reference signal, CSI-RS, and wherein the second reference signal is a serving synchronization block, SSB, reference signal.

Embodiment 22. The method of Embodiment 20, wherein the first reference signal is a serving channel state information reference signal, CSI-RS, and wherein the second reference signal is a neighbor synchronization block, SSB, reference signal.

Embodiment 23. The method of Embodiment 20, wherein the first reference signal is a serving channel state information reference signal, CSI-RS, and wherein the second reference signal is a serving channel state information reference signal, CSI-RS.

Embodiment 24. The method of any of Embodiments 3-4, wherein the measurement report triggering event is detected based on the measurement of the received power/quality of the first reference signal being less than a threshold and based on the measurement of the received power/quality of the second reference signal being greater than the measurement of the received power/quality of the first reference signal by an offset.

Embodiment 25. The method of Embodiment 24, wherein the first reference signal is a serving synchronization signal block, SSB, reference signal, and wherein the second reference signal is a serving channel state information reference signal, CSI-RS.

Embodiment 26. The method of any of Embodiments 3-4, wherein the measurement report triggering event is detected based on the measurement of the received power/quality of the first reference signal being greater than the measurement of the received power/quality of the second reference signal by an offset.

Embodiment 27. The method of Embodiment 26, wherein the first reference signal is a neighbor synchronization signal block, SSB, reference signal, and wherein the second reference signal is a serving channel state information reference signal, CSI-RS.

Embodiment 28. The method of Embodiment 26, wherein the first reference signal is a serving channel state information reference signal, CSI-RS, and wherein the second reference signal is a neighbor synchronization signal block, SSB, reference signal.

Embodiment 29. The method of Embodiment 26, wherein the first reference signal is a serving synchronization signal block, SSB, reference signal, and wherein the second reference signal is a serving channel state information reference signal, CSI-RS.

Embodiment 30. The method of any of Embodiments 3-4, wherein the measurement report triggering event is detected based on the measurement of the received power/quality of the first reference signal being greater than a first threshold and based on the measurement of the received power/quality of the second reference signal being less than a second threshold.

Embodiment 31. The method of Embodiment 30, wherein the first reference signal is a serving channel state information reference signal, CSI-RS, and wherein the second reference signal is a neighbor synchronization signal block, SSB, reference signal.

Embodiment 32. The method of Embodiment 30, wherein the first reference signal is a serving synchronization signal block, SSB, reference signal, and wherein the second reference signal is a serving channel state information reference signal, CSI-RS.

Embodiment 33. The method of any of Embodiments 3-4, wherein the measurement report triggering event is detected based on the measurement of the received power/quality of the first reference signal being greater than a threshold, and based on the measurement of the received power/quality of the second reference signal being sufficient to avoid triggering of a T310 timer.

Embodiment 34. The method of Embodiment 33, wherein the first reference signal is a serving synchronization signal block, SSB, reference signal, and wherein the second reference signal comprises a radio link monitoring, RLM, reference signal.

Embodiment 35. The method of Embodiment 33, wherein the first reference signal is a serving channel state information reference signal, CSI-RS, and wherein the second reference signal comprises a radio link monitoring, RLM, reference signal.

Embodiment 36. The method of any of Embodiments 34-35, wherein the RLM reference signal comprises one of a synchronization signal block, SSB, reference signal, a channel state information reference signal, CSI-RS, and a Tracking Reference Signal.

Embodiment 37. The method of any of Embodiments 1-36 further comprising:
  initiating a triggering timer responsive to detecting the measurement report triggering event;
  wherein the measurement report is transmitted responsive to detecting the measurement report triggering event and responsive to expiration of the triggering timer.

Embodiment 38. The method of any of Embodiments 1-37 further comprising:
  receiving (2105) a measurement configuration from the wireless communication network over a radio interface, wherein the measurement configuration defines the measurement report triggering event based on the measurement of the first reference signal and the measurement of the second reference signal;
  wherein the measurement report triggering event is detected based on the measurement configuration.

Embodiment 39. The method of any of Embodiments 13-19 further comprising:
  receiving (5605) a measurement configuration from the wireless communication network over a radio interface, wherein the measurement configuration defines the measurement report triggering event based on the measurement of the first reference signal, the measurement of the second reference signal, and based on the measurement of the third reference signal;
  wherein the measurement report triggering event is detected based on the measurement configuration.

Embodiment 40. A method of operating a network node, the method comprising:
  transmitting (5705) a measurement configuration over a radio interface to a communication device, wherein the measurement configuration defines a measurement report triggering event based on a measurement of a first reference signal received by the communication device and based on a measurement of a second reference signal received by the communication device, wherein the first and second reference signals are different; and
  receiving (5709) a measurement report from the communication device including at least one of the measurement of the first reference signal and/or the measurement of the second reference signal, wherein the measurement report is provided by the communication device based on the measurement configuration.

Embodiment 41. The method of Embodiment 40, wherein the measurement report includes the measurement of the first reference signal and the measurement of the second reference signal.

Embodiment 42. The method of any of Embodiments 40-41, wherein the measurement of the first reference signal is a measurement of a received power/quality of the first reference signal and wherein the measurement of the second reference signal is a measurement of a received power/quality of the second reference signal.

Embodiment 43. The method of Embodiment 42, wherein the received power/quality of the first reference signal comprises at least one of a reference signal received power, RSRP, of the first reference signal, a reference signal received quality, RSRQ, of the first reference signal, and/or a signal to interference and noise ratio, SINR, of the first reference signal, and wherein the received power/quality of the second reference signal comprises at least one of an RSRP of the second reference signal, an RSRQ of the second reference signal, and/or an SINR of the second reference signal.

Embodiment 44. The method of Embodiment 40-43, wherein the measurement configuration defines the measurement report triggering event as being detected based on comparing the measurement of the first reference signal and the measurement of the second reference signal.

Embodiment 45. The method of any of Embodiments 40-44, wherein the measurement configuration defines the measurement report triggering event as being detected based on comparing the measurement of the first reference signal with a threshold.

Embodiment 46. The method of any of Embodiments 40-44, wherein the measurement configuration defines the measurement report triggering event as being detected based on comparing the measurement of the second reference signal with a threshold.

Embodiment 47. The method of any of Embodiments 40-44, wherein the measurement configuration defines the measurement report triggering event as being detected based on comparing the measurement of the first reference signal with a first threshold and based on comparing the measurement of the second reference signal with a second threshold.

Embodiment 48. The method of any of Embodiments 40-47, wherein the first reference signal is a channel state information reference signal, CSI-RS, and the second reference signal is a synchronization signal block, SSB, reference signal.

Embodiment 49. The method of any of Embodiments 40-47, wherein the first reference signal is a synchronization signal block, SSB, reference signal, and the second reference signal is a radio link monitoring, RLM, reference signal.

Embodiment 50. The method of any of Embodiments 40-47, wherein the first reference signal is a channel state information reference signal, CSI-RS, and the second reference signal is a radio link monitoring, RLM, reference signal.

Embodiment 51. The method of any of Embodiments 49-50, wherein the RLM reference signal comprises one of a synchronization signal block, SSB, reference signal, a channel state information reference signal, CSI-RS, and a Tracking Reference Signal.

Embodiment 52. The method of any of Embodiments 40-41, wherein the measurement configuration defines the measurement report triggering event as being detected based on the measurement of the first reference signal, based on the measurement of the second reference signal, and based on a measurement of a third reference signal received by the communication device, wherein the first and third reference signals are different, and wherein the second and third reference signals are different.

Embodiment 53. The method of Embodiment 52, wherein the measurement of the first reference signal is a measurement of a received power/quality of the first reference signal, wherein the measurement of the second reference signal is a measurement of a received power/quality of the second reference signal, and wherein the measurement of the third reference signal is a measurement of a received power/quality of the third reference signal.

Embodiment 54. The method of Embodiment 53, wherein the received power/quality of the first reference signal comprises at least one of a reference signal received power, RSRP, of the first reference signal, a reference signal received quality, RSRQ, of the first reference signal, and/or a signal to interference and noise ratio, SINR, of the first reference signal, wherein the received power/quality of the second reference signal comprises at least one of an RSRP of the second reference signal, an RSRQ of the second reference signal, and/or an SINR of the second reference signal, and wherein the received power/quality of the third reference signal comprises at least one of an RSRP of the third reference signal, an RSRQ of the third reference signal, and/or an SINR of the third reference signal.

Embodiment 55. The method of any of Embodiments 53-54, wherein the measurement configuration defines the measurement report triggering event as being detected based on the measurement of the received power/quality of the first reference signal being greater than a first threshold, based on the measurement of the received power/quality of the second reference signal being less than a second threshold, and based on the measurement of the received power/quality of the third reference signal being greater than a third threshold.

Embodiment 56. The method of any of Embodiments 53-55, wherein the first reference signal is a serving channel state information reference signal, CSI-RS, wherein the second reference signal is a serving synchronization signal block, SSB, reference signal, and wherein the third reference signal is a neighbor SSB reference signal.

Embodiment 57. The method of Embodiment 53-54, wherein the measurement configuration defines the measurement report triggering event as being detected based on the measurement of the received power/quality of the first reference signal being greater than the measurement of the received power/quality of the second reference signal by a first offset, and based on the measurement of the received power/quality of the first reference signal being greater than the measurement of the received power/quality of the third reference signal by a second offset.

Embodiment 58. The method of any of Embodiment 53, 54, or 57, wherein the first reference signal is a neighbor synchronization signal block, SSB, reference signal, wherein the second reference signal is a serving channel state information reference signal, CSI-RS, and wherein the third reference signal is a serving synchronization signal block, SSB, reference signal.

Embodiment 59. The method of any of Embodiments 42-43, wherein the measurement configuration defines the measurement report triggering event as being detected based on the measurement of the received power/quality of the first reference signal being less than a first threshold and based on the measurement of the received power/quality of the second reference signal being greater than a second threshold.

Embodiment 60. The method of Embodiment 59, wherein the first reference signal is a serving channel state information reference signal, CSI-RS, and wherein the second reference signal is a serving synchronization block, SSB, reference signal.

Embodiment 61. The method of Embodiment 59, wherein the first reference signal is a serving channel state information reference signal, CSI-RS, and wherein the second reference signal is a neighbor synchronization block, SSB, reference signal.

Embodiment 62. The method of Embodiment 59, wherein the first reference signal is a serving channel state information reference signal, CSI-RS, and wherein the second reference signal is a serving channel state information reference signal, CSI-RS.

Embodiment 63. The method of any of Embodiments 42-43, wherein the measurement configuration defines the measurement report triggering event as being detected based on the measurement of the received power/quality of the first reference signal being less than a threshold and based on the measurement of the received power/quality of the second reference signal being greater than the measurement of the received power/quality of the first reference signal by an offset.

Embodiment 64. The method of Embodiment 63, wherein the first reference signal is a serving synchronization signal block, SSB, reference signal, and wherein the second reference signal is a serving channel state information reference signal, CSI-RS.

Embodiment 65. The method of any of Embodiments 42-43, wherein the measurement configuration defines the measurement report triggering event as being detected based on the measurement of the received power/quality of the first reference signal being greater than the measurement of the received power/quality of the second reference signal by an offset.

Embodiment 66. The method of Embodiment 65, wherein the first reference signal is a neighbor synchronization signal block, SSB, reference signal, and wherein the second reference signal is a serving channel state information reference signal, CSI-RS.

Embodiment 67. The method of Embodiment 65, wherein the first reference signal is a serving channel state information reference signal, CSI-RS, and wherein the second reference signal is a neighbor synchronization signal block, SSB, reference signal.

Embodiment 68. The method of Embodiment 65, wherein the first reference signal is a serving synchronization signal block, SSB, reference signal, and wherein the second reference signal is a serving channel state information reference signal, CSI-RS.

Embodiment 69. The method of any of Embodiments 42-43, wherein the measurement configuration defines the measurement report triggering event as being detected based on the measurement of the received power/quality of the first reference signal being greater than a first threshold and based on the measurement of the received power/quality of the second reference signal being less than a second threshold.

Embodiment 70. The method of Embodiment 69, wherein the first reference signal is a serving channel state information reference signal, CSI-RS, and wherein the second reference signal is a neighbor synchronization signal block, SSB, reference signal.

Embodiment 71. The method of Embodiment 69, wherein the first reference signal is a serving synchronization signal block, SSB, reference signal, and wherein the second reference signal is a serving channel state information reference signal, CSI-RS.

Embodiment 72. The method of any of Embodiments 42-43, wherein the measurement configuration defines the measurement report triggering event as being detected based on the measurement of the received power/quality of the first reference signal being greater than a threshold, and based on the measurement of the received power/quality of the second reference signal being sufficient to avoid triggering of a T310 timer.

Embodiment 73. The method of Embodiment 72, wherein the first reference signal is a serving synchronization signal block, SSB, reference signal, and wherein the second reference signal comprises a radio link monitoring, RLM, reference signal.

Embodiment 74. The method of Embodiment 72, wherein the first reference signal is a serving channel state information reference signal, CSI-RS, and wherein the second reference signal comprises a radio link monitoring, RLM, reference signal.

Embodiment 75. The method of any of Embodiments 73-74, wherein the RLM reference signal comprises one of a synchronization signal block, SSB, reference signal, a channel state information reference signal, CSI-RS, and a Tracking Reference Signal.

Embodiment 76. The method of any of Embodiments 40-75, wherein the network node is a radio access network, RAN, node.

Embodiment 77. A communication device (5300) comprising:
processing circuitry (5303); and
memory (5305) coupled with the processing circuitry, wherein the memory includes instructions that when executed by the processing circuitry causes the communication device to perform operations according to any of Embodiments 1-39.

Embodiment 78. A communication device (300) adapted to perform according to any of Embodiments 1-39.

Embodiment 79. A computer program comprising program code to be executed by processing circuitry (5303) of a communication device (5300), whereby execution of the program code causes the communication device (5300) to perform operations according to any of embodiments 1-39.

Embodiment 80. A computer program product comprising a non-transitory storage medium including program code to be executed by processing circuitry (5303) of a communication device (5300), whereby execution of the program code causes the communication device (5300) to perform operations according to any of embodiments 1-39.

Embodiment 81. A network node (5400) comprising:
processing circuitry (5403); and
memory (5405) coupled with the processing circuitry, wherein the memory includes instructions that when executed by the processing circuitry causes the network node to perform operations according to any of Embodiments 40-76.

Embodiment 82. A network node (5400) adapted to perform according to any of Embodiments 40-76.

Embodiment 83. A computer program comprising program code to be executed by processing circuitry (5403) of a network node (5400), whereby execution of the program code causes the network node (5400) to perform operations according to any of embodiments 40-76.

Embodiment 84. A computer program product comprising a non-transitory storage medium including program code to be executed by processing circuitry (5403) of a network node (5400), whereby execution of the program code causes the network node (5400) to perform operations according to any of embodiments 40-76.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 71:
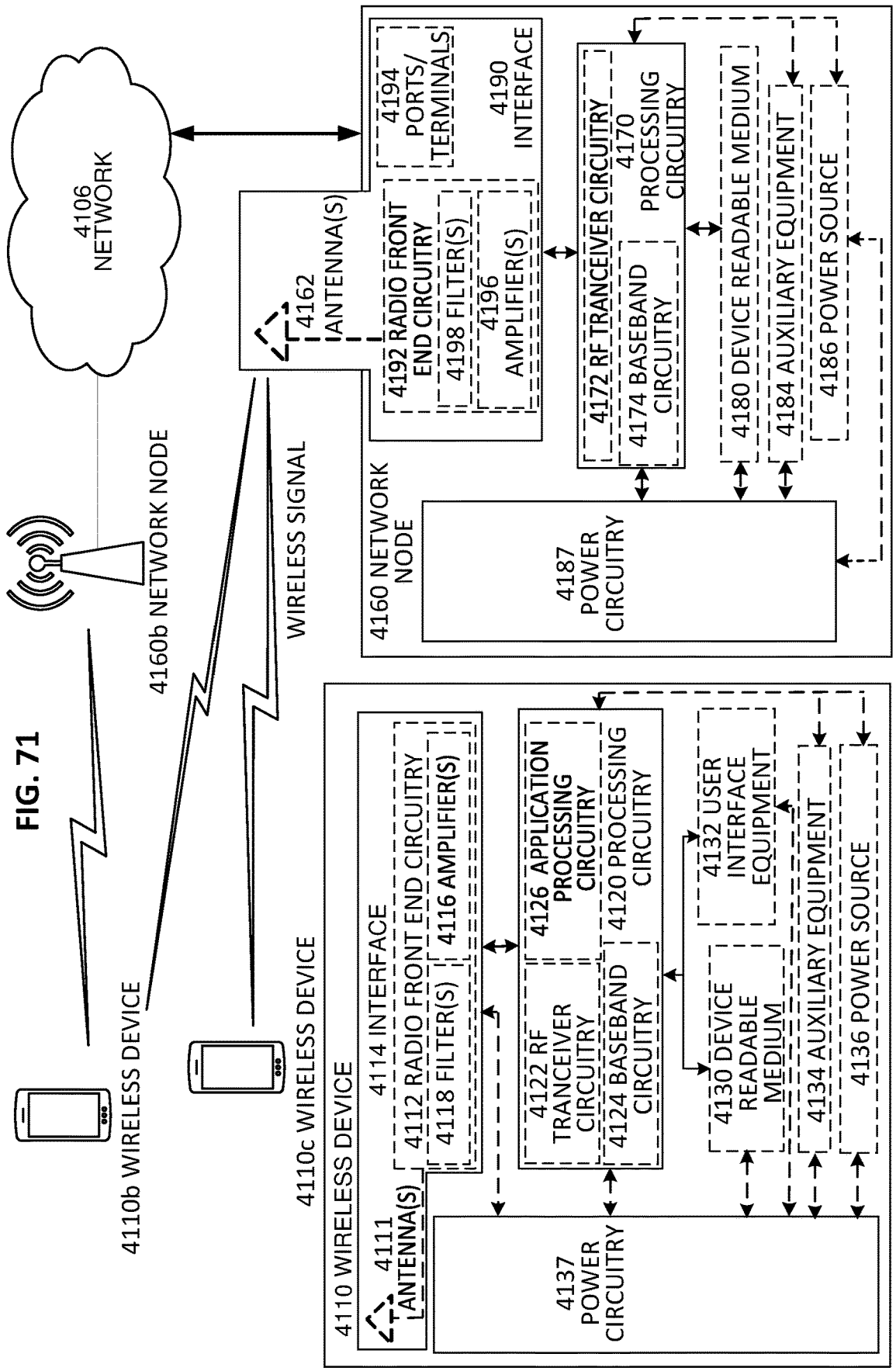
FIG. 71 is a block diagram of a wireless network in accordance with some embodiments.

FIG. 71 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 71. For simplicity, the wireless network of FIG. 71 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 71, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 71 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 71 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 72:
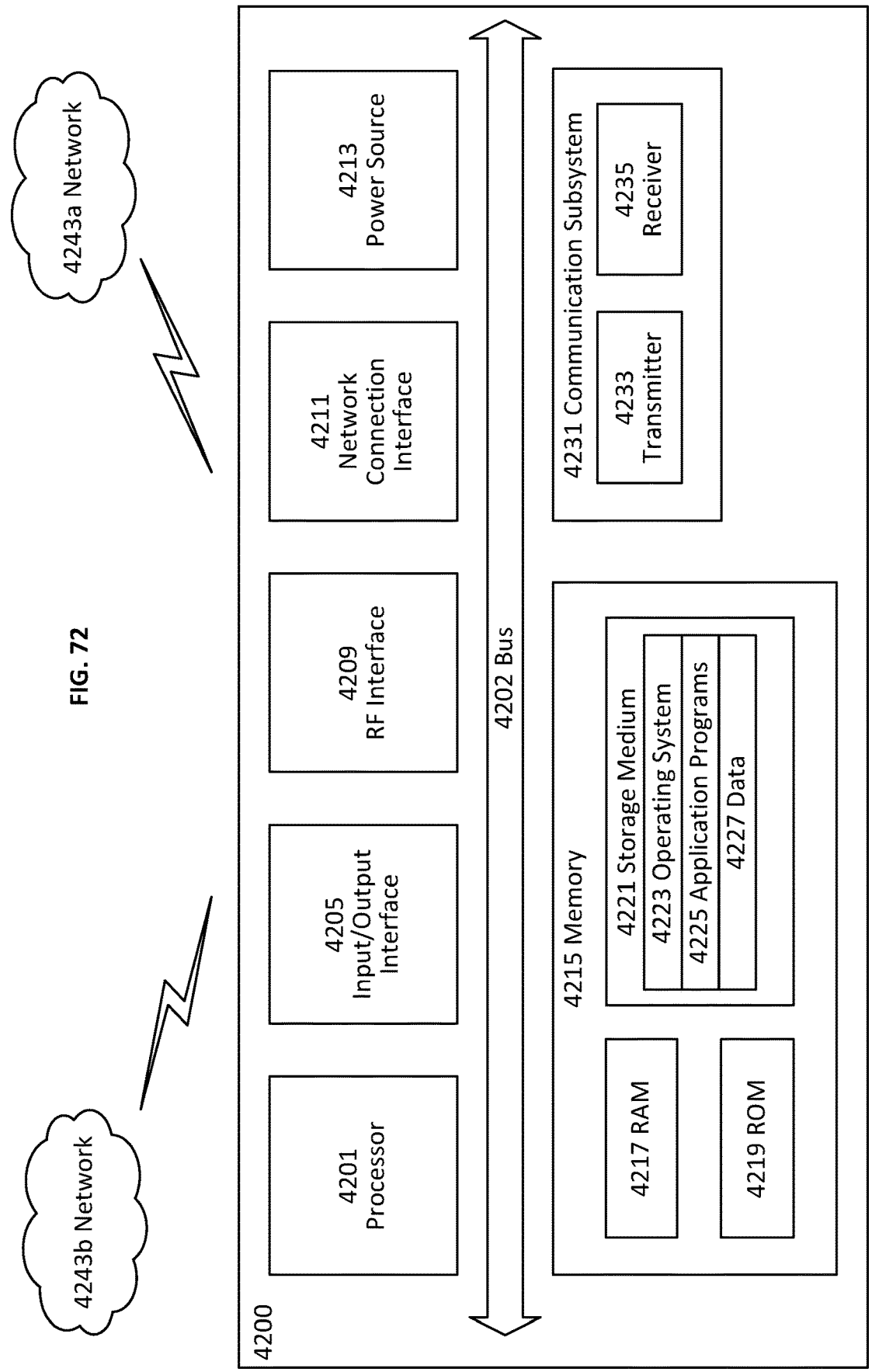
FIG. 72 is a block diagram of a user equipment in accordance with some embodiments

FIG. 72 illustrates a user Equipment in accordance with some embodiments.

FIG. 72 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 72, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 72 is a UE, the components discussed herein are equally applicable to a WD, and vice-versa.

In FIG. 72, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 72, or only a subset of the components. The level of integration between the components may vary from one UE to another UE. Further, certain UEs may contain multiple instances of a component, such as multiple processors, memories, transceivers, transmitters, receivers, etc.

In FIG. 72, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 72, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 72, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 73:
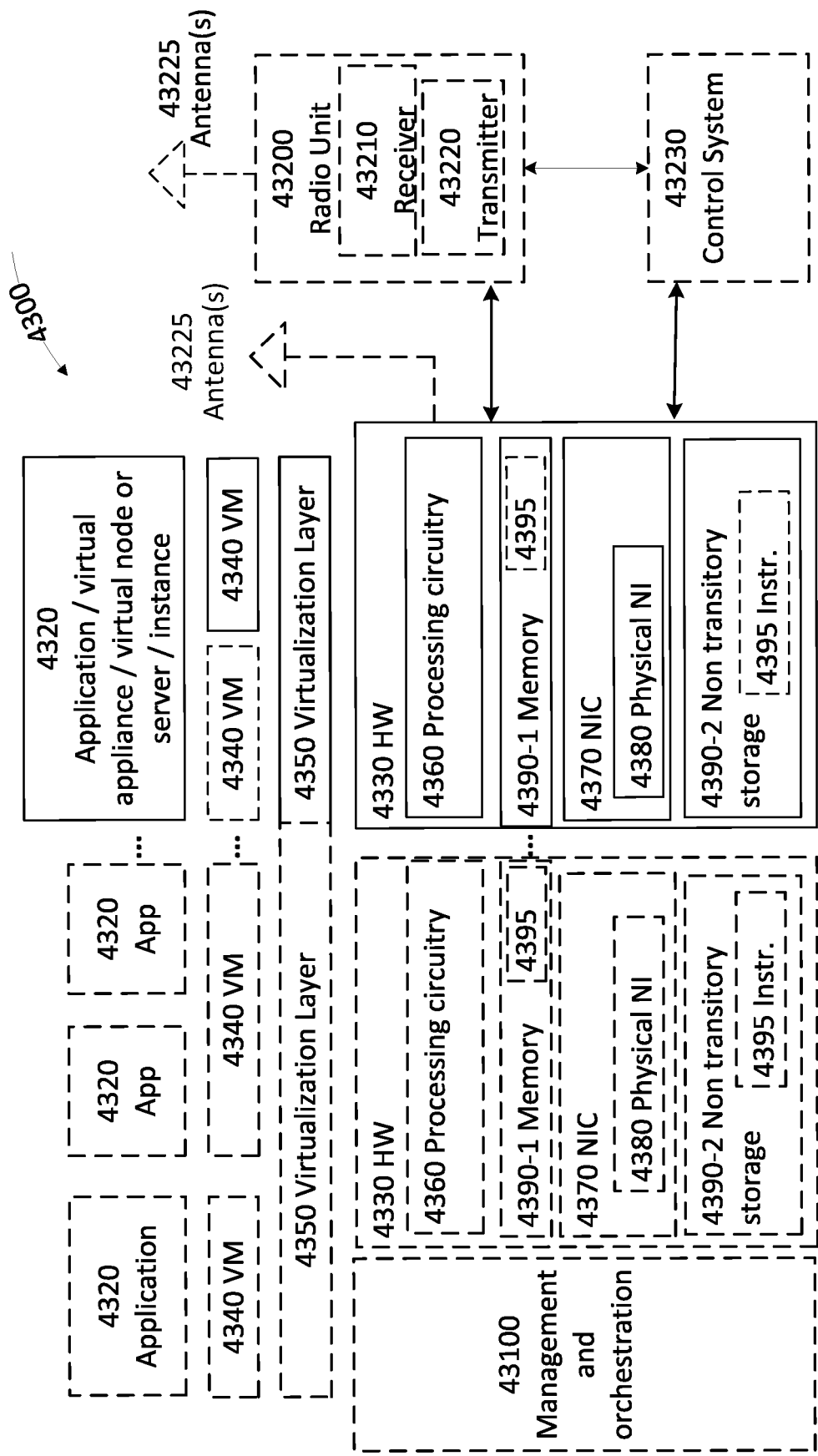
FIG. 73 is a block diagram of a virtualization environment in accordance with some embodiments.

FIG. 73 illustrates a virtualization environment in accordance with some embodiments.

FIG. 73 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 73, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 73.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 74:
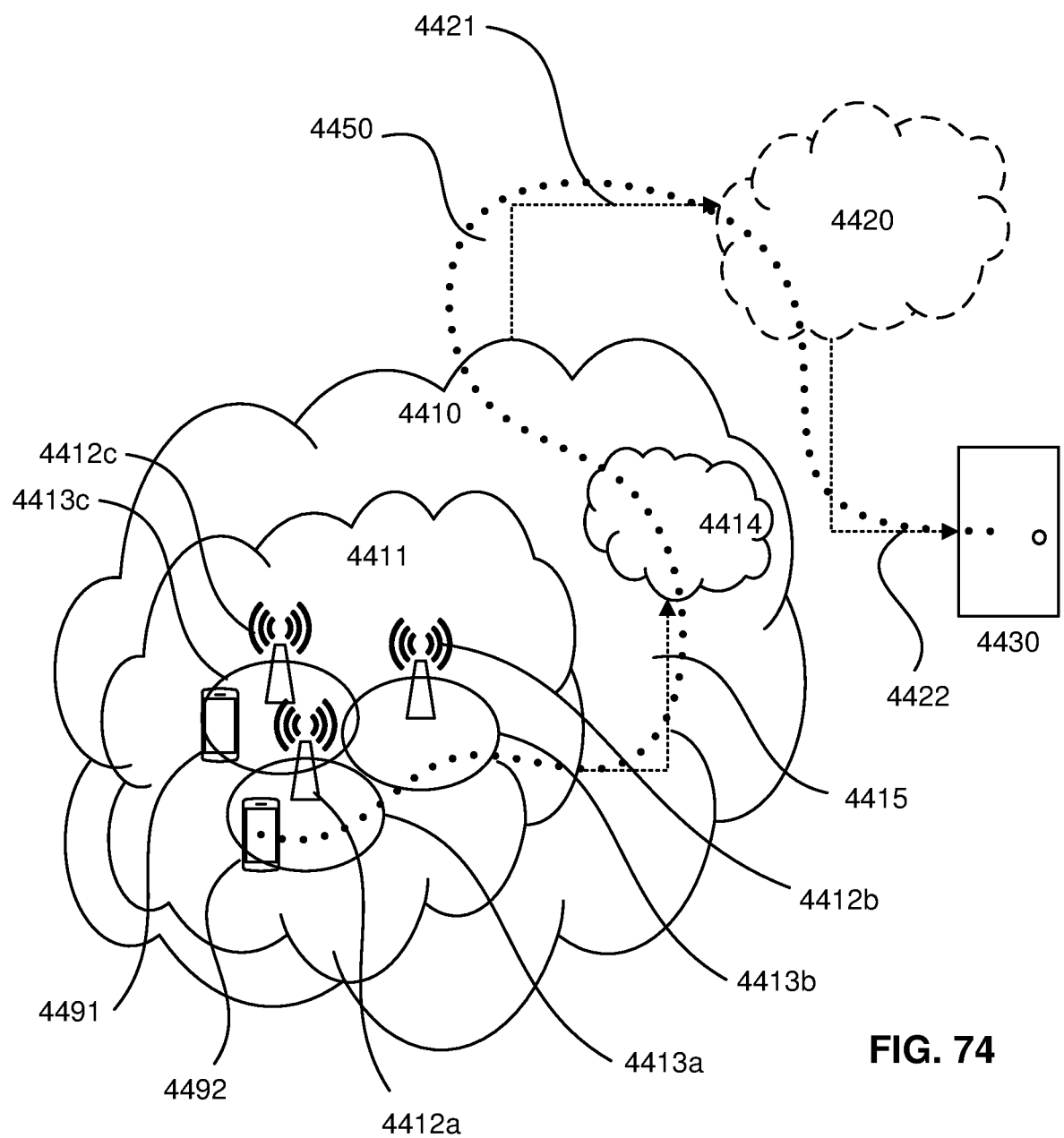
FIG. 74 is a block diagram of a telecommunication network connected via an intermediate network to a host computer in accordance with some embodiments.

FIG. 74 illustrates a telecommunication network connected via an intermediate network to a host computer in accordance with some embodiments.

With reference to FIG. 74, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 74 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 75:
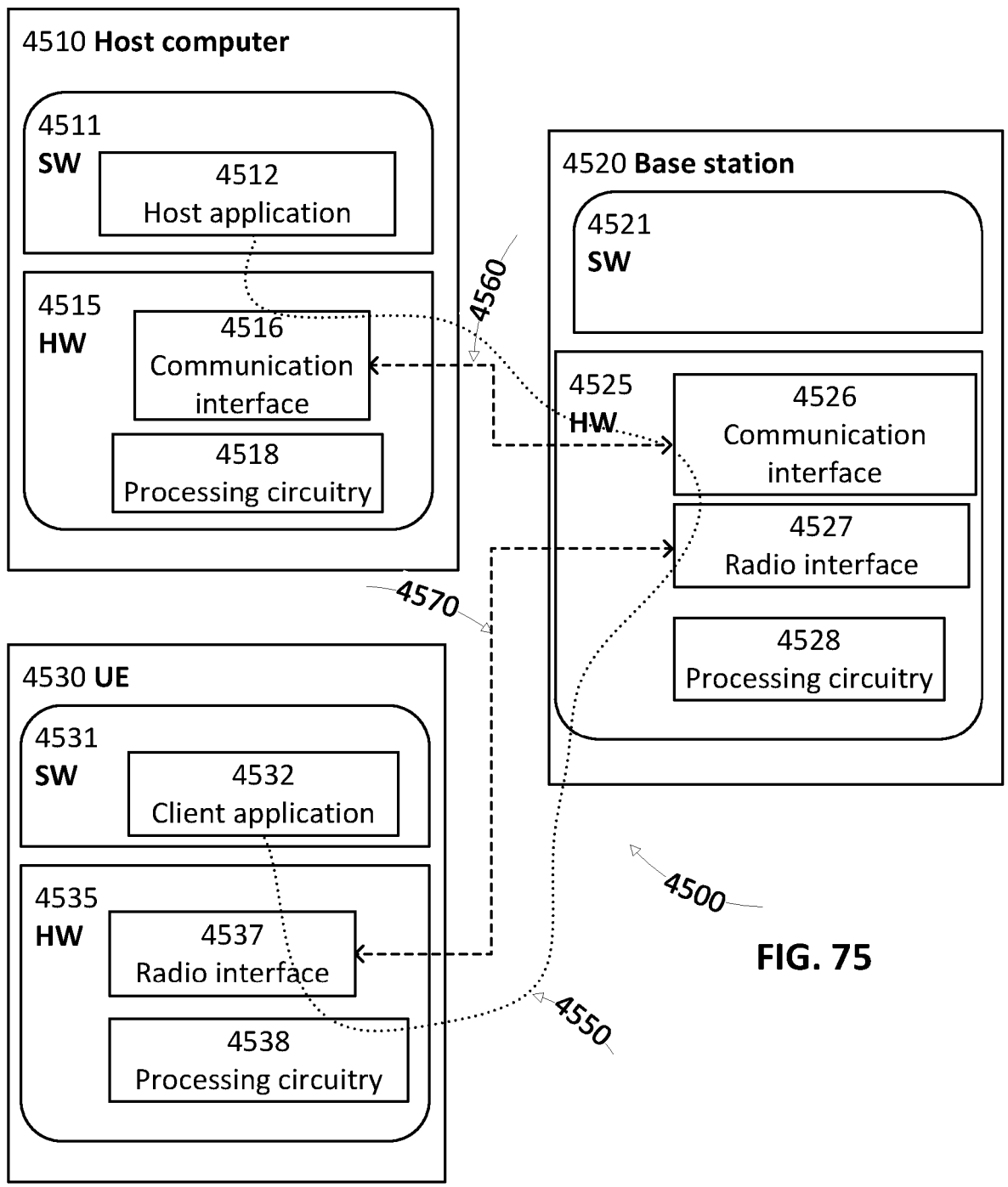
FIG. 75 is a block diagram of a host computer communicating via a base station with a user equipment over a partially wireless connection in accordance with some embodiments.

FIG. 75 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 75. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 75) served by base station 4520. Communication interface 4526 may be configured to facilitate connection 4560 to host computer 4510. Connection 4560 may be direct or it may pass through a core network (not shown in FIG. 75) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 75 may be similar or identical to host computer 4430, one of base stations 4412*a*, 4412*b*, 4412*c* and one of UEs 4491, 4492 of FIG. 74, respectively. This is to say, the inner workings of these entities may be as shown in FIG. 75 and independently, the surrounding network topology may be that of FIG. 74.

In FIG. 75, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 76:
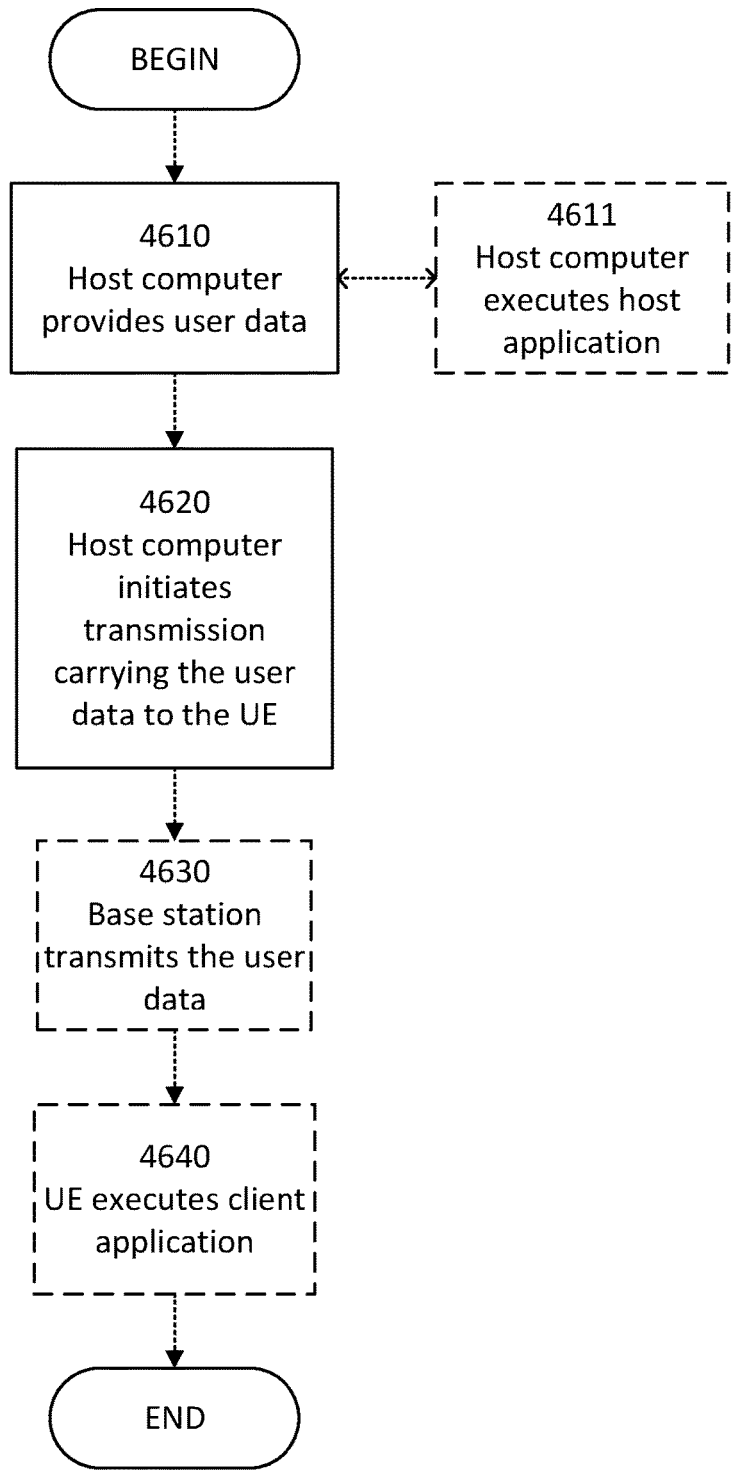
FIG. 76 is a block diagram of methods implemented in a communication system including a host computer, a base station and a user equipment in accordance with some embodiments.

FIG. 76 illustrates methods implemented in a communication system including a host computer, a base station and a user equipment in accordance with some embodiments.

FIG. 76 is a flowchart illustrating a method implemented in a communication system, in accordance with one embodiment. The communication system includes a host computer, a base station and a UE which may be those described with reference to FIGS. 74-75. For simplicity of the present disclosure, only drawing references to FIG. 76 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 77:
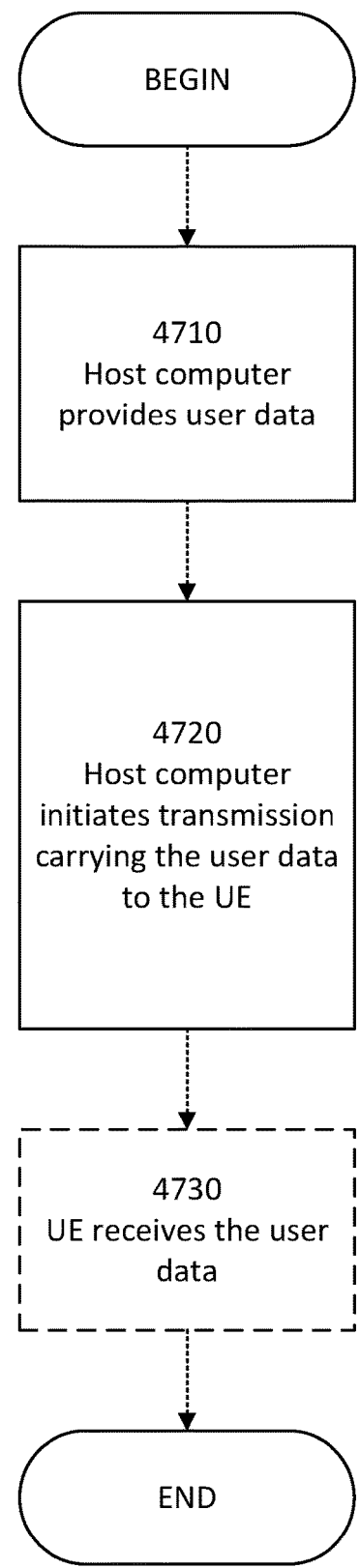
FIG. 77 is a block diagram of methods implemented in a communication system including a host computer, a base station and a user equipment in accordance with some embodiments.

FIG. 77 illustrates methods implemented in a communication system including a host computer, a base station and a user equipment in accordance with some embodiments.

FIG. 77 is a flowchart illustrating a method implemented in a communication system, in accordance with one embodiment. The communication system includes a host computer, a base station and a UE which may be those described with reference to FIGS. 74-75. For simplicity of the present disclosure, only drawing references to FIG. 77 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 78 illustrates methods implemented in a communication system including a host computer, a base station and a user equipment in accordance with some embodiments FIG. 78 is a flowchart illustrating a method implemented in a communication system, in accordance with one embodiment. The communication system includes a host computer, a base station and a UE which may be those described with reference to FIGS. 74-75. For simplicity of the present disclosure, only drawing references to FIG. 78 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 79 illustrates methods implemented in a communication system including a host computer, a base station and a user equipment in accordance with some embodiments FIG. 79 is a flowchart illustrating a method implemented in a communication system, in accordance with one embodiment. The communication system includes a host computer, a base station and a UE which may be those described with reference to FIGS. 74-75. For simplicity of the present disclosure, only drawing references to FIG. 79 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in a wireless communication network, the method comprising:
   detecting a measurement report triggering event based on a measurement of a first reference signal received by the communication device and based on a measurement of a second reference signal received by the communication device, wherein the first and second reference signals are different, wherein the first reference signal is a channel state information reference signal (CSI-RS) and the second reference signal is a synchronization signal block (SSB) reference signal; and transmitting a measurement report to the wireless communication network responsive to detecting the measurement report triggering event, wherein the measurement report includes the measurement of the first reference signal and/or the measurement of the second reference signal.

2. The method of claim 1, wherein the measurement report includes the measurement of the first reference signal and the measurement of the second reference signal.

3. The method of claim 1, wherein the measurement of the first reference signal is a measurement of a received power/quality of the first reference signal and wherein the measurement of the second reference signal is a measurement of a received power/quality of the second reference signal.

4. The method of claim 3, wherein the received power/quality of the first reference signal comprises at least one of a reference signal received power (RSRP) of the first reference signal, a reference signal received quality (RSRQ) of the first reference signal, and/or a signal to interference and noise ratio (SINR) of the first reference signal, and wherein the received power/quality of the second reference signal comprises at least one of an RSRP of the second reference signal, an RSRQ of the second reference signal, and/or an SINR of the second reference signal.

5. The method of claim 3, wherein the measurement report triggering event is detected based on at least one of:
the measurement of the received power/quality of the first reference signal being less than a first threshold and based on the measurement of the received power/quality of the second reference signal being greater than a second threshold;
the measurement of the received power/quality of the first reference signal being less than a threshold and based on the measurement of the received power/quality of the second reference signal being greater than the measurement of the received power/quality of the first reference signal by an offset;
the measurement of the received power/quality of the first reference signal being greater than the measurement of the received power/quality of the second reference signal by an offset;
the measurement of the received power/quality of the first reference signal being greater than a first threshold and based on the measurement of the received power/quality of the second reference signal being less than a second threshold; or
the measurement of the received power/quality of the first reference signal being greater than a threshold, and based on the measurement of the received power/quality of the second reference signal being sufficient to avoid triggering of a T310 timer.

6. The method of claim 1, wherein the measurement report triggering event is detected based on at least one of:
comparing the measurement of the first reference signal and the measurement of the second reference signal;
comparing the measurement of the first reference signal with a first threshold; or comparing the measurement of the second reference signal with a second threshold.

7. The method of claim 1, wherein the measurement report triggering event is detected based on the measurement of the first reference signal, based on the measurement of the second reference signal, and based on a measurement of a third reference signal received by the communication device, wherein the first and third reference signals are different, and wherein the second and third reference signals are different.

8. The method of claim 7, wherein the measurement of the first reference signal is a measurement of a received power/quality of the first reference signal, wherein the measurement of the second reference signal is a measurement of a received power/quality of the second reference signal, and wherein the measurement of the third reference signal is a measurement of a received power/quality of the third reference signal.

9. The method of claim 8, wherein the received power/quality of the first reference signal comprises at least one of a reference signal received power (RSRP) of the first reference signal, a reference signal received quality (RSRQ) of the first reference signal, and/or a signal to interference and noise ratio (SINR) of the first reference signal, wherein the received power/quality of the second reference signal comprises at least one of an RSRP of the second reference signal, an RSRQ of the second reference signal, and/or an SINR of the second reference signal, and wherein the received power/quality of the third reference signal comprises at least one of an RSRP of the third reference signal, an RSRQ of the third reference signal, and/or an SINR of the third reference signal.

10. The method of claim 8, wherein the measurement report triggering event is detected based on at least one of:
the measurement of the received power/quality of the first reference signal being greater than a first threshold, based on the measurement of the received power/quality of the second reference signal being less than a second threshold, and based on the measurement of the received power/quality of the third reference signal being greater than a third threshold; or
the measurement of the received power/quality of the first reference signal being greater than the measurement of the received power/quality of the second reference signal by a first offset, and based on the measurement of the received power/quality of the first reference signal being greater than the measurement of the received power/quality of the third reference signal by a second offset.

* * * * *